(12) United States Patent
Vette

(10) Patent No.: US 10,675,829 B2
(45) Date of Patent: Jun. 9, 2020

(54) DYNAMIC SEPARATION AND FILTRATION

(71) Applicant: VTech Innovative Solutions, LLC, Ocala, FL (US)

(72) Inventor: Paul Vette, Ocala, FL (US)

(73) Assignee: VTECH INNOVATIVE SOLUTIONS, LLC, Ocala, FL (US)

(*) Notice: Subject to any disclaimer, the term of this patent is extended or adjusted under 35 U.S.C. 154(b) by 0 days.

(21) Appl. No.: 15/636,830

(22) Filed: Jun. 29, 2017

(65) Prior Publication Data
US 2017/0296946 A1 Oct. 19, 2017

Related U.S. Application Data

(63) Continuation-in-part of application No. 15/452,939, filed on Mar. 8, 2017.
(Continued)

(51) Int. Cl.
*B30B 9/22* (2006.01)
*B01D 29/66* (2006.01)
(Continued)

(52) U.S. Cl.
CPC .......... *B30B 9/225* (2013.01); *B01D 25/127* (2013.01); *B01D 25/164* (2013.01);
(Continued)

(58) Field of Classification Search
CPC ...... B01D 25/00; B01D 25/007; B01D 25/12; B01D 25/127; B01D 25/164; B01D 25/26;
(Continued)

(56) References Cited

U.S. PATENT DOCUMENTS 2,612,100 A * 9/1952 Bates ............... A47J 19/02
100/122
2,647,636 A 8/1953 Rafferty
(Continued)

FOREIGN PATENT DOCUMENTS

CN 104860504 A 8/2015
GB 907485 A * 10/1962 ............. B01D 29/15
(Continued)

OTHER PUBLICATIONS

International Search Report and Written Opinion for PCT Application No. PCT/US2017/021287, dated Jun. 28, 2017.
(Continued)

*Primary Examiner* — Liam Royce
(74) *Attorney, Agent, or Firm* — Schmeiser, Olsen & Watts, LLP

(57) ABSTRACT

A modular, compact, mobile, dewatering and liquid-liquid separation and filtration system. The system processes incoming influents of slurries, solids and liquids at a high speed of operation and in large volumes. System is capable of being modularly scaled, allowing for a continuous steady state operation accommodating any slurry flow rate in a synchronous dynamic equilibrium process. Components and modules integrated into the system include a dynamic filtration clarifier 101 (DFC), a nested-filter dewatering cell 115 (NDC) and/or a compression filter press 125 (CFP). The DFC performs the primary dewatering phase of separating the primary water from the solids creating sludge. The NDC further breaks apart the solids of the sludge, removing interstitial water in a secondary dewatering phase, further lowering the moisture content of the sludge, while the CFP removes the tertiary water from the remaining solid particles by pressing the particles into a solid cake.

11 Claims, 21 Drawing Sheets

Related U.S. Application Data

(60) Provisional application No. 62/305,025, filed on Mar. 8, 2016.

(51) Int. Cl.

| | | |
|---|---|---|
| *B01D 29/72* | (2006.01) | |
| *B01D 29/82* | (2006.01) | |
| *C02F 11/122* | (2019.01) | |
| *B30B 9/04* | (2006.01) | |
| *B01D 25/127* | (2006.01) | |
| *B01D 25/164* | (2006.01) | |
| *B01D 61/18* | (2006.01) | |
| *B01D 29/96* | (2006.01) | |
| *B01D 25/00* | (2006.01) | |
| *B01D 61/00* | (2006.01) | |

(52) U.S. Cl.
CPC .......... *B01D 29/661* (2013.01); *B01D 29/72* (2013.01); *B01D 29/822* (2013.01); *B01D 61/18* (2013.01); *B30B 9/045* (2013.01); *B30B 9/22* (2013.01); *C02F 11/122* (2013.01); *B01D 25/00* (2013.01); *B01D 29/96* (2013.01); *B01D 61/00* (2013.01); *C02F 2201/007* (2013.01); *C02F 2201/008* (2013.01)

(58) Field of Classification Search
CPC ...... B01D 25/21; B01D 25/215; B01D 25/22; B01D 25/30; B01D 25/302; B01D 25/332; B01D 36/02; B01D 24/40; B01D 24/14; B01D 24/4621; B01D 29/23; B01D 29/52; B01D 29/6438; B01D 29/96; B01D 29/27; C02F 1/004; C02F 11/121; C02F 11/122; B30B 9/045; B30B 9/22; B30B 9/225
See application file for complete search history.

(56) References Cited

U.S. PATENT DOCUMENTS

| | | | |
|---|---|---|---|
| 4,186,098 A | 6/1980 | Morris | |
| 4,367,145 A | 1/1983 | Simpson et al. | |
| 4,681,682 A | 7/1987 | White et al. | |
| 5,160,440 A | 11/1992 | Mérai | |
| 5,213,687 A * | 5/1993 | Ginn | B01D 39/2068 |
| | | | 210/388 |
| 5,403,481 A | 4/1995 | Kupka | |
| 5,824,232 A | 10/1998 | Asher et al. | |
| 6,180,002 B1 | 1/2001 | Higgins | |
| 6,250,476 B1 | 6/2001 | Kroon et al. | |
| 7,311,827 B2 | 12/2007 | Clark et al. | |
| 8,871,089 B2 | 10/2014 | Early et al. | |
| 8,951,411 B2 * | 2/2015 | Sharir | B01D 29/23 |
| | | | 210/108 |
| 9,108,864 B2 | 8/2015 | Hannemann et al. | |
| 9,149,741 B2 | 10/2015 | McPhee | |
| 9,155,985 B2 | 10/2015 | Yanda | |
| 2003/0213756 A1* | 11/2003 | Duby | B01D 25/26 |
| | | | 210/791 |
| 2007/0029238 A1 | 2/2007 | Duby | |
| 2007/0193930 A1 | 8/2007 | Marsh et al. | |
| 2008/0230461 A1 | 9/2008 | Schulte et al. | |
| 2009/0293742 A1* | 12/2009 | Murphy | B01D 29/27 |
| | | | 100/215 |
| 2011/0186417 A1 | 8/2011 | Simpson et al. | |
| 2012/0055861 A1* | 3/2012 | Conwell | B01D 29/114 |
| | | | 210/241 |
| 2012/0312755 A1 | 12/2012 | Ryan et al. | |
| 2015/0108055 A1 | 4/2015 | Kang | |
| 2016/0075584 A1* | 3/2016 | Vette | B01D 29/114 |
| | | | 210/770 |
| 2017/0259197 A1 | 9/2017 | Vette | |

FOREIGN PATENT DOCUMENTS

| | | | |
|---|---|---|---|
| WO | 2014145282 A1 | 9/2014 | |
| WO | 2014176057 A2 | 10/2014 | |
| WO | WO-2014176057 A2 * | 10/2014 | ........... B01D 29/114 |
| WO | 2017156073 A1 | 9/2017 | |

OTHER PUBLICATIONS

Restriction Requirement (dated Jan. 16, 2018) for U.S. Appl. No. 15/452,939, filed Mar. 8, 2017.
Office Action (dated Apr. 12, 2018) for U.S. Appl. No. 15/452,939, filed Mar. 8, 2017.
Definition of Nested by Merriam-Webster. https://www.merriam-webster.com/dictionary/nested No Date.
Final Office Action (dated Sep. 20, 2018) for U.S. Appl. No. 15/452,939, filed Mar. 8, 2017.
U.S. Department of Energy, Office of Energy Efficiency and Renewable Energy, "Just the Basics: Diesel Energy," Aug. 2003. 2 pages.
Tonsperhourinc "How a Filter Press Works—Animation" Mar. 2, 2015 (Mar. 2, 2015) 2-5 Time[0:19]-[0:22], [0:44]-[0:53], [0:57]-[1:00], [1:04]-[1:05], [1:10]-[1:18], [1:23]-[1:29], [1:33]-[1:40]; Retrieved from: https://www.youtube.com/watch?v=M4wBd1_CvNw on Sep. 4, 2018 (Sep. 4, 2018).
International Search Report and Written Opinion for PCT Application No. PCT/US2018/040398, dated Nov. 9, 2018.
Office Action (dated Feb. 4, 2019) for U.S. Appl. No. 15/452,939, filed Mar. 8, 2017.
Notice of Allowance (dated Jul. 8, 2019) for U.S. Appl. No. 15/452,939, filed Mar. 8, 2017.
Ex Parte Quayle Action (Mail Date May 1, 2019) for U.S. Appl. No. 15/452,939, filed Mar. 8, 2017.

* cited by examiner

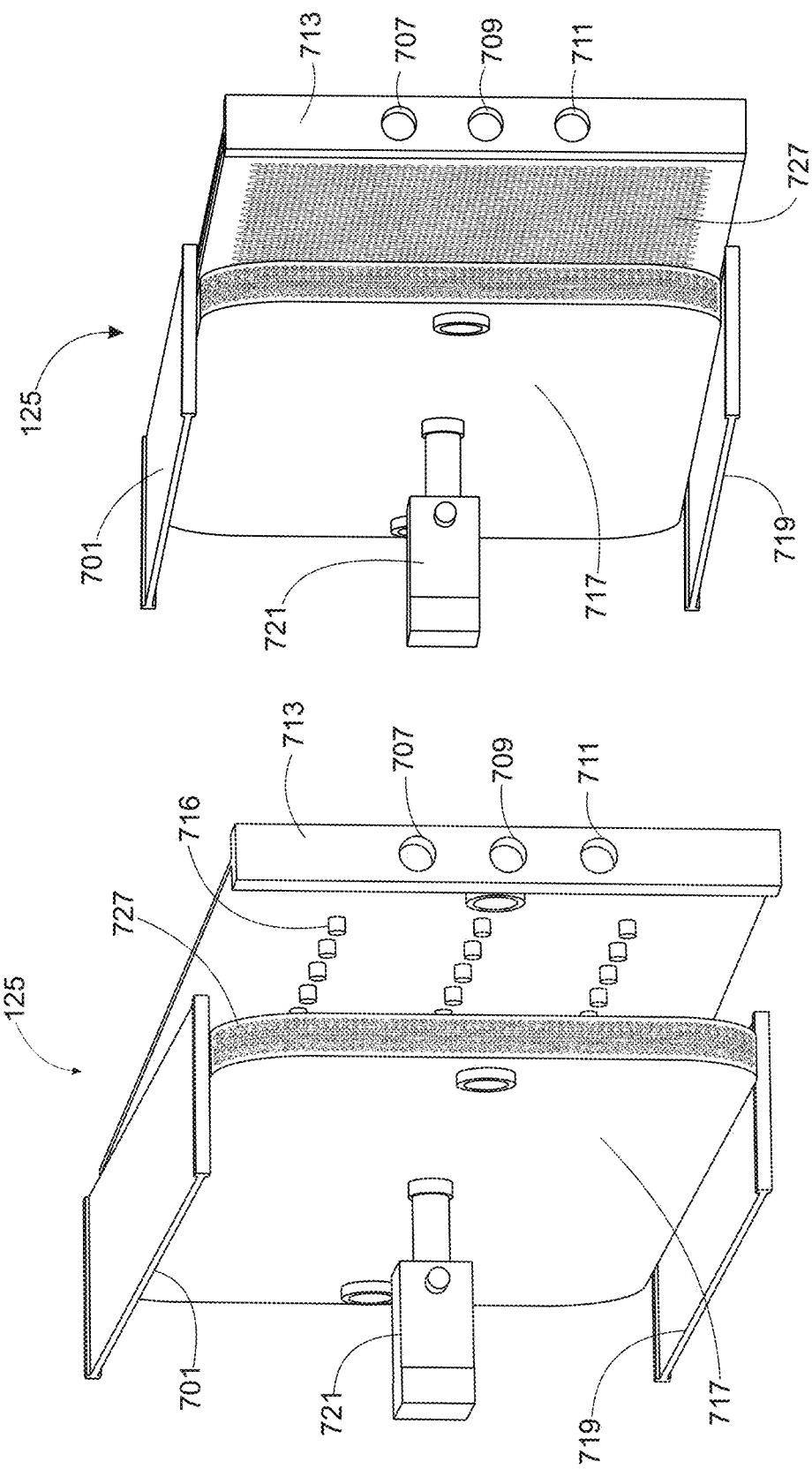

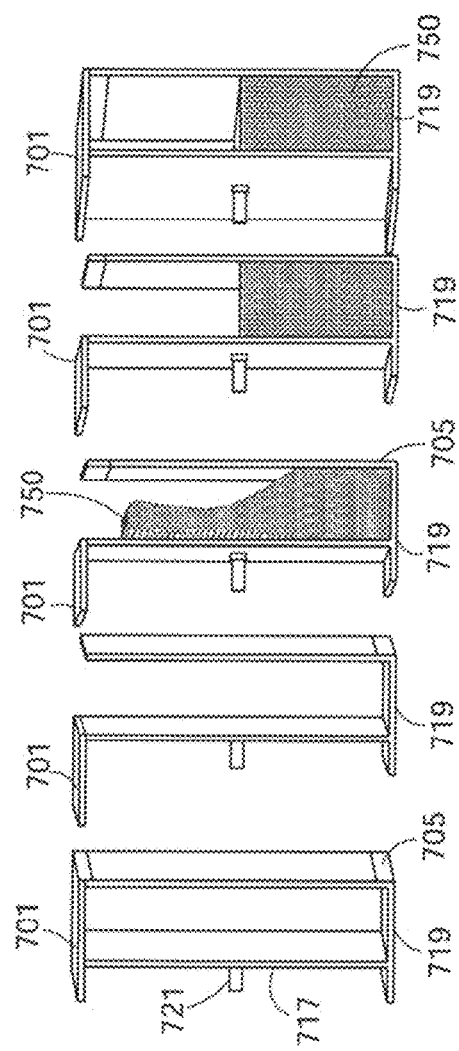
FIG. 8a
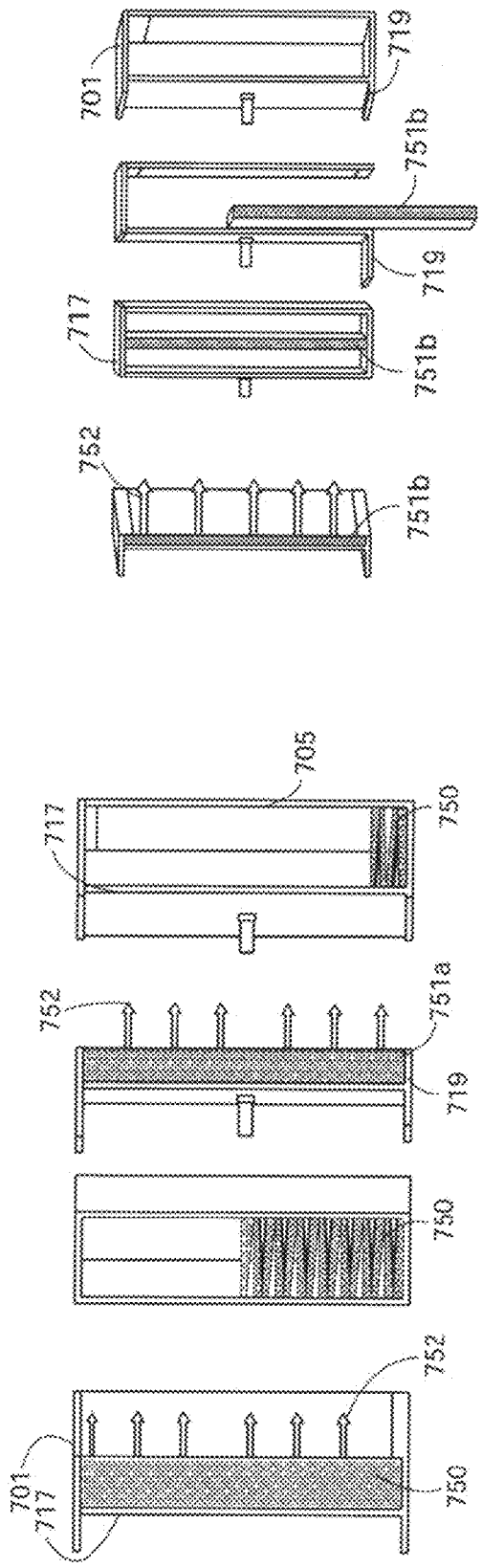
FIG. 8b
FIG. 8c

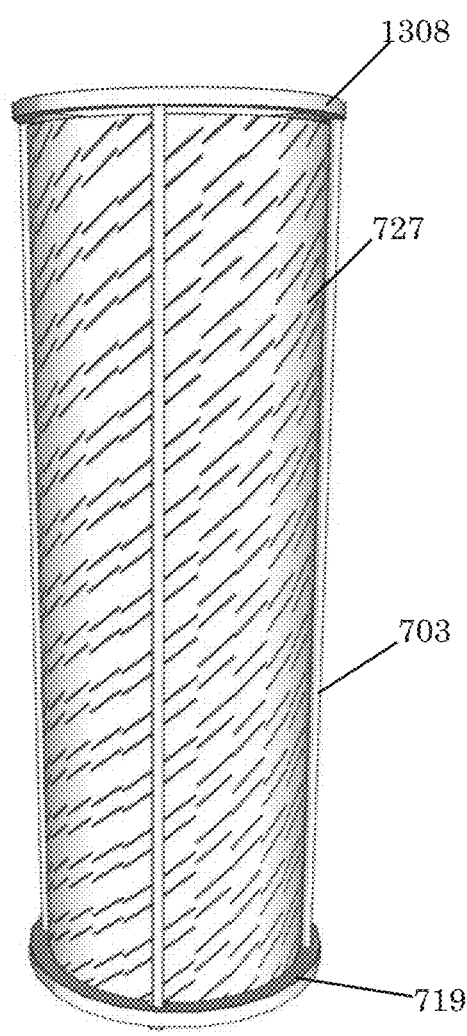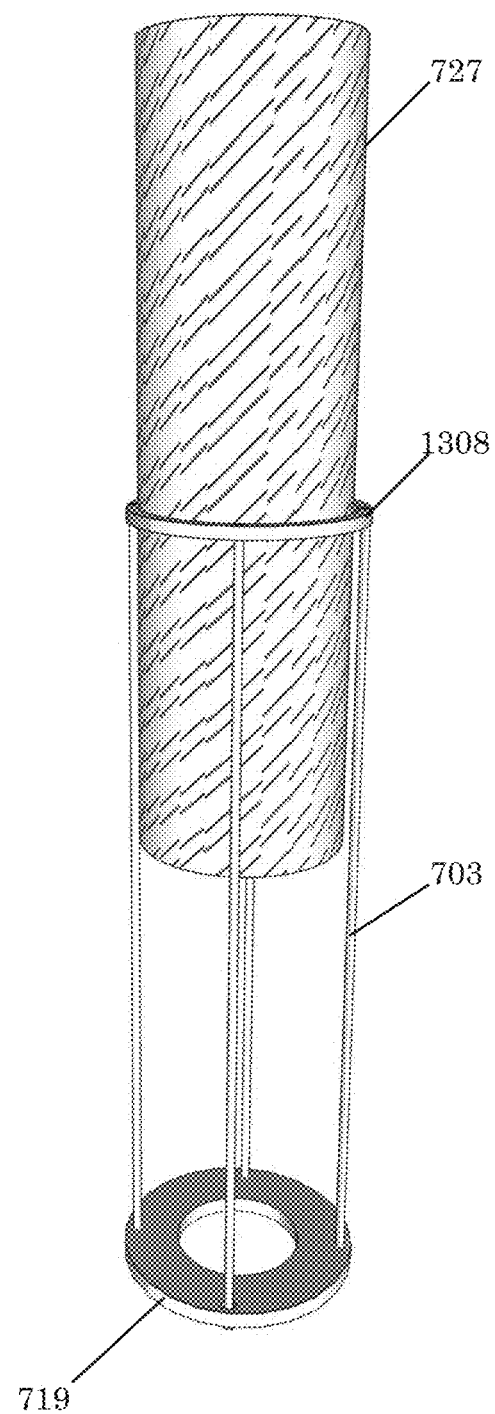
FIG 14a
FIG 14b

DYNAMIC SEPARATION AND FILTRATION

CROSS REFERENCE TO RELATED APPLICATIONS

This application is a Continuation-in-Part of U.S. patent application Ser. No. 15/452,939 filed Mar. 8, 2017, entitled DYNAMIC SEPARATION AND FILTRATION, now U.S. Pat. No. 10,526,229 issued Jan. 7, 2020, which claims priority and benefit of U.S. Patent Application No. 62/305,025 filed Mar. 8, 2016, entitled "DYNAMIC SEPARATION AND FILTRATION", the content of which are both hereby incorporated by reference.

FIELD OF TECHNOLOGY

The following disclosure relates generally to apparatuses, systems and methods for separating and filtering solid and/or liquid mixtures of material and more specifically to mobile apparatuses, systems and methods of solid-liquid separation and liquid-liquid separation of mixtures.

BACKGROUND

Access to clean water is essential to the ability of mankind and the environment to survive and thrive. The initial step to cleaning contaminated and non-contaminated water is the separation and removal of suspended solids from water, a method referred to as dewatering.

Currently, there is a need to separate solids from liquids and separate liquids from other liquids more efficiently, effectively and economically, in large volumes, at higher speeds, and with a more compact environmental footprint. At the same time it is desired for separation techniques to have less equipment, reduced energy requirements and reduced pollution; reduced manpower as well as a reduced disruption to commerce and the community.

There are numerous examples during recent history where current separation methods were incapable of responding or preventing emergency situations and disasters. The emergencies and disasters resulted in a severe impact on waterways, the environment and the local economies surrounding the events. Examples of such devastating events include oil spills, such as the 2010B P Gulf oil spill; pipeline breaches, and the 2010 Kalamazoo River oil spill; tailing ponds and sludge lagoon breaches, such as 2014 Duke Energy fly ash spill and the 2008 TVA Kingston coal ash spill; Flooding, such as the 2015 Mississippi River flooding and 2015 Oregon flooding; and unintended releases, such as the 2015 EPA Colorado River Gold King.

Currently, operations requiring slurry dewatering or liquid-liquid separation employ a series of mechanical systems, technologies, pumps and conveying mechanisms for primary dewatering and liquid-liquid separation followed by the conveyance of any resulting sludge to downstream mechanisms in order to sufficiently perform secondary or tertiary dewatering and dehydration of the resulting sludge. Such secondary and tertiary methods in the current state of the art are needed to provide economical transport, disposal, asset recovery or beneficial reuse. Examples of these operations include: dredging operations, mining operations, paper mills, gas and oil operations, including fracking and oil sands, oil spill cleanups, tailing ponds and sludge lagoons, sewage, septage and wastewater treatment, confined animal feeding operations (CAFO), food processing, soil and cake washing, nutrient removal and reduction and desalination.

The most widely employed technologies and methodologies for primary dewatering are settling clarifiers and detention settling ponds or lagoons. Secondary and tertiary dewatering and sludge dehydration typically employ belt filter presses, plate and frame filter presses, centrifuges, rotary presses, dewatering cells or boxes, or geo-textile bags. All of these technologies and methodologies are bulky and heavy, requiring a significant energy footprint to support operations, including time and energy. Moreover, widely employed technologies are manpower intensive. Due to the weight and footprint requirements, it is impractical to combine or stack multiple technologies onto a single compact vertical footprint.

The previously employed systems, technologies, processes and equipment, which usually operate and function separately and independently, are not easily transportable due to being large and heavy. Conveying slurry and sludge between available systems typically requires pumps, piping, fittings, spill containment, fuel or other energy resources, manpower and operator attention. In order to be transported, setup and teardown the equipment, a substantial operational footprint and related support structures are also required, as well as significant time, manpower, heavy equipment, and extensive resources to prepare and remediate the operating site.

For centuries, the settling of suspended solids, and then decanting the supernatant in confined vessels or basins, has been employed to separate solids and water, commonly referred to as settling clarification. Settling basins are sized according to slurry flow rates and the suspended solids settling or hydraulic retention time (HRT) required on a direct correlation basis. As an example, for each 500 gallons of water requiring 15 minutes of settling or HRT, a vessel capable of containing 7,500 gallons (500 gallons times 15 minutes) and sturdy enough to hold at least 62,550 pounds (7,500 gallons of water weighing 8.34 pounds per gallon) in addition to the volume and weight of the sedimented solids would be required. At some point, either the buildup of sediment must be removed or additional vessels employed.

Dewatering is accomplished in nature through the gravity settling of suspended solids in a water column. Then, as water flows through and around natural filter medias, such as gravel, sand and vegetation, additional suspended solids are separated and removed. This process, though often quite effective, takes considerable time, often months, years, decades or longer. As the world's population grows, the need to effectively shorten this natural process has become increasingly important. Man's pollution of water due to farming and industrial operations, has greatly impacted and complicated clean water issues.

The advent of slurry conditioning substances, such as alum, ferric and polymeric reagents, which encourage suspended solids to agglomerate into larger and heavier masses, commonly referred to as "flocs" in order to enhance settling, provided a solution to shorten settling time. However, slurry conditioning often created additional volume of settled solids, and did not adequately address floating, indefinitely suspended solids or re-suspended solids in a water column. As the basins filled with sediment, they were either abandoned and new basins were employed, or the sediment was removed. Both of these options resulted in significant amounts of saturated, high moisture content and low viscosity sediment, which was not easily transportable.

Several types of clarifiers have been employed. The principal is simple. Influent slurry is pumped into a vessel or confined area, allowing the suspended solids to gravitationally settle or fall out of the water column and then sediment over time. Lamella clarifiers employ inclined plates, often in a parallel fashion. Slurries are normally conditioned, pumped or forced up the plates. The settling sludge comprised of flocs and suspended solids, may sediment onto the inclined plates. When sufficient aggregation of sludge on the plates occurs, a laminar flow forms, allowing the settling sludge mass to more easily gravitationally flow down the plates.

The rate of settling is directly dependent and correlated to the weight and mass of the suspended solids, as expressed by Stoke's Law and the Ferguson and Church Equation.

However, both Stoke's Law and the Ferguson and Church Equation are based on uniform spherical shaped material, which is rarely, if ever, the case. Even with the introduction of conditioning reagents, many ultra-fine solids or substances that are difficult to settle may remain in a water column and require extended HRT and therefore may require additional clarifiers to handle slurry flow rate requirements. There are several substances or particles with a low specific gravity, but with a significant mass, that may creating additional interstitial or capillary water in the sedimented sludge, rendering the sedimented sludge difficult to handle, due to lower viscosity, and typically must be pumped from the bottom of the settling clarifier. The sedimented sludge is then conveyed, typically by pumps, to downstream mechanisms for additional dewatering or dehydration. Due to HRT requirements for processing, settling clarifiers typically require a large footprint and are very heavy, as they must be rigidly constructed out of strong materials to not only support the volume of slurry, but also the accumulation of settled or sedimented solids. Consequently, due to size and weight, settling clarifiers capable of processing slurry flow rates exceeding 400 GPM are not easily transportable, as they usually exceed the road height and width restrictions. Clarifiers capable of handling slurry flow rates exceeding 400 GPM typically take extended time, manpower and heavy equipment, such as cranes, and other resources to disassemble, transport and then reassemble. These clarifiers typically require setup and placement on a reinforced and supported footprint.

TABLE 1

| Technology Required to Process Slurry with 10% TSS by Volume and 1.5 Specific Gravity | Quantity | | Width | Height | Length | Footprint Square Feet | Footprint Cubic Feet | Empty Weight | Operational Weight |
|---|---|---|---|---|---|---|---|---|---|
| Rotary Press | 10 | Feet/Pounds | 15.6 | 6.3 | 24.5 | 382.2 | 2,388.8 | 29,162 | 41,662 |
| Channels | | Meters/Kilograms | 4.8 | 1.9 | 7.5 | 35.5 | 67.6 | 13,228 | 18,898 |
| Belt Filter Press | 2 | Feet/Pounds | 13.0 | 7.0 | 22.4 | 291.2 | 2,038.4 | 22,046 | 27,756 |
| 3 Meter Belt | | Meters/Kilograms | 4.0 | 2.1 | 6.8 | 27.1 | 57.7 | 10,000 | 12,590 |
| Plate & Frame Filter Press | 349 | Feet/Pounds | 8.5 | 6.0 | 119.5 | 1,015.8 | 6,094.5 | 313,518 | 362,906 |
| 2000 mm Plates | | Meters/Kilograms | 2.6 | 1.8 | 36.4 | 94.4 | 172.6 | 142,209 | 164,611 |
| Dewatering Cells | 12 | | 51.0 | 6.3 | 40.0 | 2,040.0 | 12,750.0 | 81,120 | 909,727 |
| 30 Cubic Yard @ 24 Hour HRT | | | 15.5 | 1.9 | 12.2 | 189.5 | 361.0 | 24,725 | 412,645 |
| Geo-Textile Bags | 1 | | 22.5 | 6.0 | 95.0 | 2,137.5 | 12,825.0 | 6,413 | 900,251 |
| HRT | | | 6.9 | 1.8 | 29.0 | 198.6 | 363.2 | 2,909 | 408,347 |
| Lamella Settling Clarifier | 1 | Feet/Pounds | 11.9 | 12.3 | 19.2 | 228.5 | 2,810.3 | 37,000 | 102,678 |
| 15 Minutes HRT | | Meters/Kilograms | 3.6 | 3.7 | 5.9 | 21.2 | 79.6 | 16,783 | 46,574 |
| Dynamic Filtration Clarifier (DFC) & | 1 | Feet/Pounds | 4.0 | 6.0 | 6.0 | 24.0 | 144.0 | 1,331 | 2,874 |
| Nested-filter Dewatering Cell (NDC) | | Meters/Kilograms | 1.2 | 1.8 | 1.8 | 2.2 | 4.1 | 604 | 1,304 |
| Compaction Filter Press (CFP) | 1 | Feet/Pounds | 4.0 | 6.0 | 6.0 | 24.0 | 144.0 | 1,880 | 2,565 |
| | | Meters/Kilograms | 1.2 | 1.8 | 1.8 | 2.2 | 4.1 | 853 | 1,163 |
| DFC-NDC-CFP System Combined | 1 | Feet/Pounds | 4.0 | 12.0 | 6.0 | 24.0 | 288.0 | 3,211 | 5,439 |
| | | Meters/Kilograms | 1.2 | 3.6 | 1.8 | 2.2 | 8.2 | 1,456 | 2,467 | take many seconds, minutes, hours, days or longer to settle. Many substances even when conditioned, such as ultra-fine solids and colloids, may remain indefinitely suspended, may float or may become suspended again with minimal turbulence. Under conventional methods, if a slurry requires a prolonged HRT, either the throughput rate of the system may be lowered or the employment of additional clarifiers are required.

Once the suspended solids have sufficiently settled, the top layer of the water column, or supernatant, is then available to be decanted over a weir and discharged as effluent. The discharged effluent is often referred to as "free water" or "primary water" separation, or primary dewatering. Suspended solids or flocs that do not settle, such as those that remain indefinitely suspended, re-suspended or float, will typically remain in the supernatant and be discharged along with the decanted effluent.

Due to sedimentation and HRT, the suspended solids which do sediment at the bottom of the clarifier may benefit somewhat from compaction, but are typically a saturated or water laden mass having low viscosity. This is typically due to the formation of "sludge blankets" where layers of settling suspended solids loosely bond, then settle as a blanket. Water then becomes trapped between blanket layers Sludge dewatering and dehydration technologies, such as plate and frame filter presses and belt filter presses apply continuous and increasing pressure to dewater and dehydrate sludge. Belt filter presses position sludge, which has typically thickened, between two filter belts that compress the sludge. Care must be taken not to place an excess amount of sludge between belts or excess pressure on the sludge, as the sludge will be squeezed out the sides of the belts, which cannot be sufficiently enclosed, and therefore reduced or minimal dewatering results will be realized. The belts pass through a path of several sets of paired rollers, with each consecutive set having a reduced spacing between the rollers, thereby each set of rollers exert increased pressure on the sludge between the filter belts. Plate and frame filter presses receive a slurry, (typically conditioned), that is pumped into multiple filter media covered cavities enclosed between opposing plates. Pumping pressure is increased in order to force the suspended solids or "flocs" to the filter and the water to filtrate through filter media.

Plate and frame presses operate in a batch fashion, with each batch cycle requiring multiple hours. Due to the static confinement between two belts or within an enclosed cavity, sludge dehydrates from the exterior to the interior of the sludge mass, trapping or confining interstitial water within the core of the sludge mass. As pressure is increased, interstitial water attempting to escape through capillaries in the sludge mass pushes finer particles, in turn causing a buildup of particles either within the capillaries or into the pores of the filter media. This buildup results in the clogging or collapsing of capillaries or blinding of the filter media.

Applying additional pressure on the sludge mass in an effort to extract additional interstitial water may lead to results with diminishing returns as additional or prolonged pressure eventually clogs or collapses capillaries, or blinds filter media, either inhibiting or blocking the interstitial water's discharge or filtrate path.

Dewatering cells are comprised of a vessel having walls and floors covered with filter media placed over sub-walls and sub-floors that facilitate the discharge of filtrated water. Geo-textile bags are tube shaped vessels enclosed with geo-textile filter media and having fill portals. Partitions or interior walls covered with filter media have also been employed in cells and bags to enhance dewatering by shortening the distance that interstitial water must travel for filtration. A slurry, typically conditioned, is pumped into the cells or bags through fill portals. Natural attenuation, compaction and consolidation of the sludge eventually breach the pore water pressure or tension, forcing interstitial water through capillaries in the sludge and towards filter media for filtration. In cells and bags, aside from contraction of the sludge mass due to water release and discharge, the sludge remains in a static position and is constrained within the boundaries of the cells, partitions or bags, thus restricting sludge movement, repositioning or reconsolidation. This lack of movement and repositioning may lead to capillary collapse as well as clogging and blinding of the filter media. Due to the somewhat static state, cells and bags tend to dewater from the exterior to the interior of the sludge mass, creating a crust or shell of dehydrated sludge on the perimeter of the sludge mass. Crusting impedes interstitial water release through capillaries in the sludge, leaving a saturated, higher moisture content area in the core of the sludge mass, and therefore the sludge is not uniformly dewatered or dehydrated.

Vacuum is sometimes employed to enhance sludge dehydration. However, cracks or cavities formed in the sludge resulting from dewatering and the expression of vacuum eventually creates voids.

As water evacuates sludge, the mass contracts away from the filter media and sources of vacuum, causing cracks and voids to form. Cracking leads to loss of vacuum as the voids fill with air. Sufficient dewatering time is typically many hours or days in the case of cells, or many days, weeks or months in the case of geo-textile bags. Once the sludge has sufficiently dewatered, the resulting cake is evacuated from the cells by opening one of the end or side walls and tipping the cell to evacuate the cake, or by using a mechanism, such as an excavator to extract the cake. Since cells typically employ sub-floors for filtrate plumbing, gravity evacuation of sludge or cake through the floor or bottom of the cell is not practical or possible. Should multi-sided or other irregularly shaped partitions be positioned in the cell, the partitions must be removed from the cell prior to tipping or excavation of the cake. In the case of geo-textile bags, the bags are cut open, the cake is excavated, and the bags are then discarded, as they are not normally reusable.

SUMMARY

A first aspect of the following disclosure relates generally to compression filter press (CFP) comprising a housing having a plurality of layers; a first layer of the plurality of layers comprising an expandable bladder; a second layer of the plurality of layers comprising a filtered media layer; and a closable inlet proximate to each of the plurality of layers positioned in the concentric ring.

A second aspect of the following disclosure relates generally to a filtration and separation system comprising: a CFP having a housing with a plurality of layers within an interior cavity of the housing, a first layer of the plurality of layers comprising an expandable bladder, a second layer of the plurality of layers comprising a filtered media layer and a manifold connected to one or more injection nozzles; and a hydraulic system connected to the manifold of the CFP.

A third aspect of the following disclosure relates generally to a fluid separation method comprising the steps of: receiving, by an inlet of a compression filter press (CFP) a sludge comprising a mixture of solid particles and a liquid; dispersing the sludge inside the CFP between a filtered media layer and an expandable bladder layer; expanding the expandable bladder layer, pressing the sludge against the filtered media layer; filtering the liquid from the solid particles by passing the liquid through the filtered media layer, leaving behind the solid particles that are too large to pass through the filtered media layer, as a solid cake; draining the liquid from the CFP; and unsealing an outlet of the CFP, releasing the solid cake from the CFP.

BRIEF DESCRIPTION OF THE DRAWINGS

FIG. 3b depicts an exploded view of the uniform laminar flow device embodiment of FIG. 3a;

FIG. 4b depicts a partially exploded view of the multi-layer self-cleaning filter of FIG. 4a;

FIG. 5b depicts a partial cut away view of the embodiment of the nested-filter dewatering cell of FIG. 5a;

FIG. 7b depicts an exploded view of the embodiment of the compression filter press of FIG. 7a;

FIG. 7c depicts a partial cutaway view of one or more components of the compression filter press of FIG. 7a;

FIG. 7d depicts an alternative partial cutaway view of one or more components of the compression filter press of FIG. 7a;

FIG. 8a-FIG. 8c depict a visual representation of an embodiment of a compression method of a compression filter press;

FIG. 14a depicts an embodiment of a filter media positioned within a guide assembly of a compression filter press in a closed configuration.

FIG. 14b depicts the filter media and guide assembly of FIG. 14a in a released configuration.

DETAILED DESCRIPTION

Figure 1:
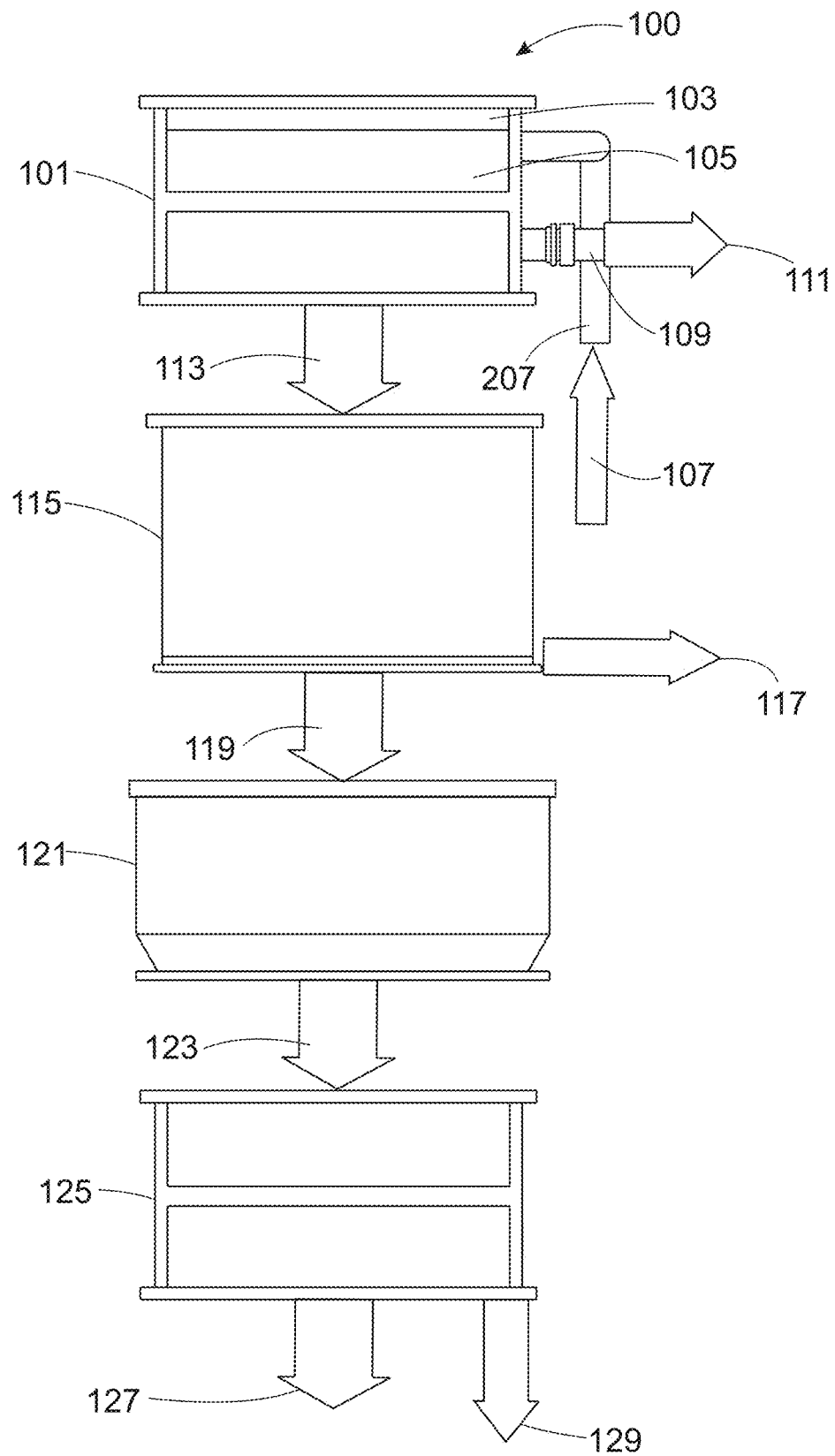
FIG. 1 depicts a flow diagram of an embodiment of a solid-liquid and liquid-liquid separation and filtration system (hereinafter "separation system")

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Definitions

Certain embodiments are described in detail below. Terms used herein may be defined as follows:

"Air" may refer to a gaseous substance comprising oxygen and nitrogen or it may be inclusive of any other gas that may be substituted for air.

A "cake" may refer to sludge which has been dehydrated, dewatered or has had the moisture content of the sludge reduced and/or removed.

A "conditioned slurry" may refer to a slurry influent that has been treated with coagulants, polymers or other substances. A conditioned slurry may be used or prepared for solid-liquid separation (dewatering).

"Dewatering" may refer to solid-liquid separation of a mixture of solid particles in a liquid.

"Effluent" may refer to the flow, stream of movement of a substance exiting a piece of equipment, component or module of a solid-solid or solid-liquid separation and filtration system.

"Flocs" may refer to a plurality or mass of suspended solids agglomerated together by coagulants, polymers or other substances.

"Hydraulic Retention Time" (HRT) may refer to the residence time or the average length of time that a compound may remain in a storage unit or piece of equipment receiving the compound. HRT may be measured by the following equation:

$$HRT = \frac{\text{Volume of acration tank}}{\text{influent flowrate}}$$

"Influent" may refer to flow or stream of movement of a substance into a piece of equipment, component or module of a solid-solid or solid-liquid separation and filtration system.

"Lift" may refer to an accumulated mass of sludge, flocs or other solids.

"Liquid" may refer to an amorphous (non-crystalline) form of matter between a gaseous and solid state. A liquid may have a definite volume, but may not have a definite shape. An example of a liquid may include water, where mentioned in this disclosure, unless otherwise noted.

"Sludge" may refer to a resulting or remaining product after the occurrence of at least some amount of liquid separation from solids (i.e. removal of water), resulting in an increasing viscosity.

"Slurry" may refer to a fluid stream of contaminated or non-contaminated liquid, such as water, containing suspended solids or other substances such as oil.

"Specific Gravity" (SG) may refer to a ratio of the density of a substance to the density of water. For example, the specific gravity of water at 4° C. is 1.

A "suspended solid" may refer to one or more solid particles which may remain in a suspension of water or other liquids. A suspended solid may include fine suspended solids, ultra-fine suspended solids such as silts, clays, organics, colloids, indefinitely suspended solids, solids re-suspended due to turbulence, floating suspended solids and sedimented suspended solids.

Separation System Overview

Referring to the drawings, FIG. 1 illustrates a compact, mobile, solid-liquid separation (dewatering) and/or liquid-liquid separation and filtration system 100. The system 100, as shown by the separated depiction in FIG. 1, may be modular and customizable based on the needs of the user. The system 100 may be comprised of modules and/or components that achieve solid-liquid separation (i.e. suspended solids from water) and/or liquid-liquid separation (i.e. oil and water). Embodiments of system 100 may achieve primary dewatering, secondary dewatering, and then compress the resulting sludge after dewatering into a thin low moisture content cake for tertiary dewatering in a dynamic equilibrium, while maintaining a singular compact footprint. The system 100 depicted in FIG. 1 may be suitable for eliminating and/or reducing hydraulic retention time (HRT), which may result in the enablement of mobility, reduced fabrication and operational expenses of solid-liquid or liquid-liquid separation by reducing the empty weight, operating weight and footprint size requirements compared with existing systems described above.

The system 100 may process incoming influents of slurries, solids and liquids at a high speed of operation and in large volumes. System 100 may be capable of being modularly scaled, allowing for a continuous steady state operation accommodating any slurry flow rate in a synchronous dynamic equilibrium process. Embodiments of the system 100 may employ separation and filtration of solid or liquids, rather than using methods that allow for solid settling to occur for initial solids-water separation (primary dewatering), resulting in more effective suspended solids separation. Using separation and filtration rather than settling techniques may eliminate or reduce HRT, resulting in a significant reduction in operational footprint and weight of system 100 as opposed to currently available technologies described above. Embodiments of system 100 may confine sludge in an enclosed compartment to cyclically compress and compact sludge into cake with low moisture content, which significantly reduces secondary and tertiary dewatering HRT.

Embodiments of the system 100 may employ a "componentized modular scaling" rather than dimensional scaling. Modular scaling of system 100 may allow system 100 to economically scale to any contaminated or non-contaminated slurry flow rate. Embodiments of the components and modules that may be present in system 100 may include a dynamic filtration clarifier 101 (DFC), a nested-filter dewatering cell 115 (NDC), a metered volume controller 121 (MVC) and/or a compression filter press 125 (CFP). Embodiments of the componentized modular system 100 may have multiple possible configurations that address various site specific and material specific requirements. Any of the system 100's individual modules, components, sub-systems, or any combination of modules, components or sub-systems, can efficiently and effectively operate separately or collectively. Higher efficiency and effectiveness may be achieved when leveraging combinations of the modules, components and sub-systems describe below. Any combination of modules, components and subsystems described herein may be combined in conjunction with other technologies or methodologies, including, but not limited to, settling clarifiers, belt filter presses, plate and frame filter presses, dewatering cells, geo-textile bags, increasing the efficiencies and effectiveness of these older technologies and methodologies.

Embodiments of each component and/or module described herein may be capable of functioning as a stand-alone unit, operating individually and independent of other components and modules, and therefore may have independent value and be integrated into other systems known in the art. The modular systems illustrated in the figures are merely examples of modular systems that may be configured by a user. The configurations of the modular systems described herein should not be limited to the specific configuration and location of components or modules depicted. Modules described herein may be connected to one another and integrated into separation systems in any particular order or formation as understood by a person skilled in the art. Embodiments of the modules and/or component of system 100 may be oriented in a vertically stacked position, one on top of another, reducing overall footprint and employing gravity as a conveyor between modules and components, thus increasing efficiency and reducing expenses, manpower and energy requirements.

Embodiments of system 100 may receive contaminated or non-contaminated slurries entering the system as an influent 107. The slurry entering the system 100 as an influent 107 through conduit 207, may be a conditioned slurry or the slurry may be unconditioned (hereinafter, referred to interchangeably as simply a "slurry"). As the slurry flows through the system 100, each module 101, 115, 121, 125 may incrementally separate and release a plurality of suspended solids, water or other liquids present in the slurry (such as oil or other petroleum distillates). Each module 101, 115, 121, 125 or components of the modules 101, 115, 121, 125 of system 100 may sequentially and incrementally reduce the liquid or water present in slurry. As water, liquid or moisture is incrementally reduced a sludge may result having an increasing viscosity and a decreasing moisture content that may be less than the slurry entering the system 100 as the influent 107.

The greater the amount of water, liquid or reduction of the moisture content of the slurry and sludge that is achieved by each upstream module, the less processing may be performed by each downstream module. This reduction may reduce the overall stress on each downstream module, and increase the efficiency of each downstream component or module 101, 115, 121, 125 described herein. For example, for each incremental increased amount of free water that can be released by the DFC 101 module (upstream module), the less water that the NDC 115 (downstream module) may need to further separate from the slurry. Similarly, the more interstitial or capillary water the NDC 115 (upstream module) may separate from the slurry or sludge that passes into the NDC 115, the less interstitial water the CFP 125 (downstream module) may need to separate as well. Incrementally sequencing the separation of water or liquid from the slurry or sludge provides for a faster, more effective and more efficient overall system processing.

Figure 2:
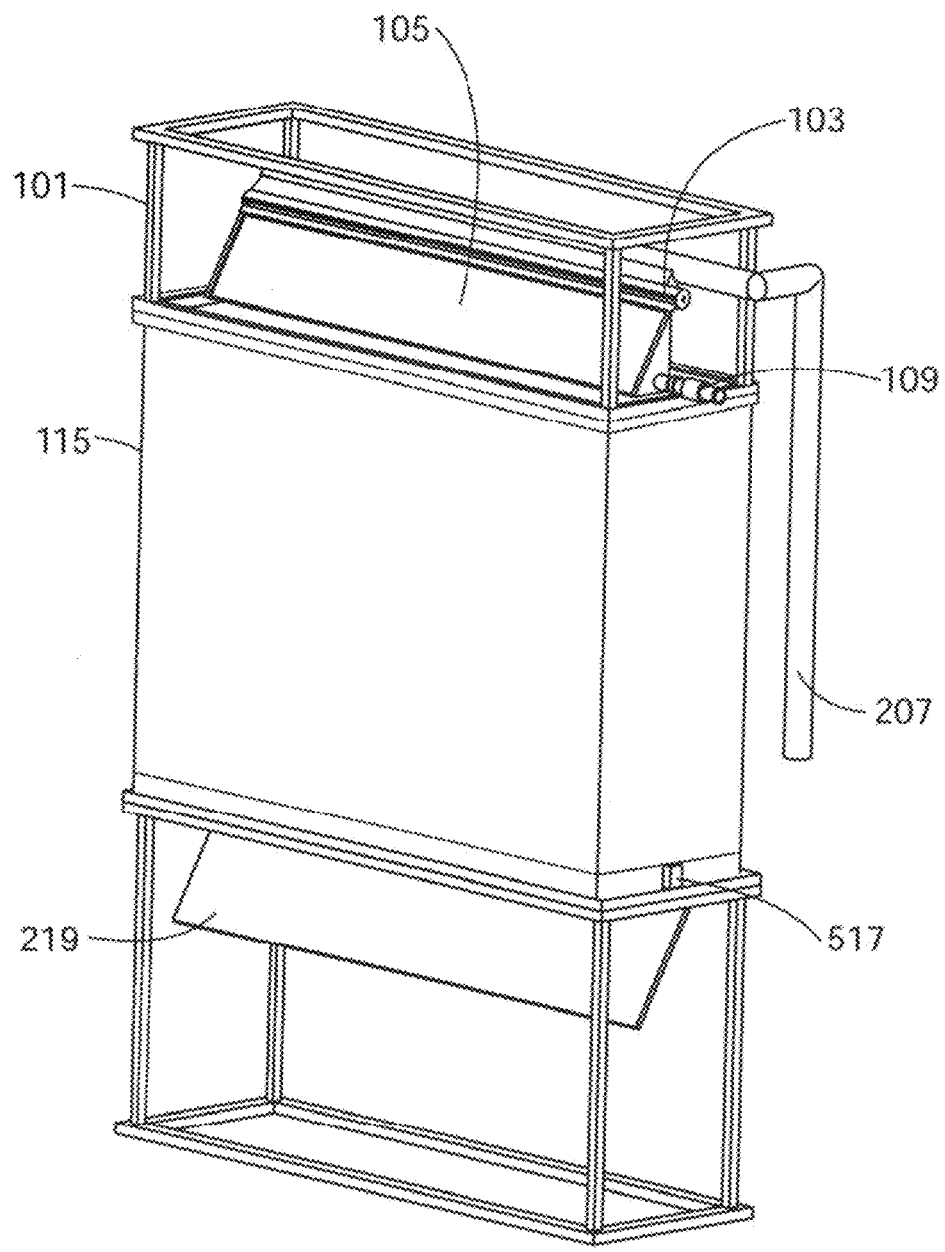
FIG. 2 depicts an isometric view of an embodiment of a dynamic filtration clarifier connected to a nested filter dewatering cell of a separation system.

Embodiments of the system 100 may include a DFC 101 comprising ULF 103 and MSF 105 components, as well as a NDC 115 module, as shown in FIG. 2, operating as one system or module on a singular footprint, without pumps or other conveying mechanisms. The ULF 103 component may distribute the conditioned slurry evenly and uniformly onto the MSF 105. Embodiments of the MSF 105 component may be a multiple layered self-cleaning filter media, enabling more efficient primary dewatering by separating flocs or suspended solids in slurry from the primary or free water in slurry. With or without the NDC 115, the dewatered sludge 113 exiting from the MSF 105 may have a higher viscosity than sludge pumped from a settling clarifier. However, after the sludge received from MSF 105 passes through the NDC 115, the viscosity of the sludge may be further increased as additional water or liquid is removed and filtered. In the exemplary embodiments discussed herein, the separated flocs (which may now be considered sludge due to the release of free water), may gravitationally flow down through the system 100 from the MSF 105 to the NDC 115. In alternative embodiments, instead of flowing downward gravitationally between the MSF 105 and the NDC 115, the separated flocs and/or sludge may be vibrated across the MSF 105 or other filter media, subsequently allowing the primary dewatered sludge 113, including the flocs to fall off the end of MSF 113 and into the NDC 115.

Embodiments of the entire system 100 may be entirely enclosed in some instances, allowing for operation in adverse, inclement or extreme conditions and an enclosed filtering system 100 may eliminate a need for additional spill containment equipment. The enclosed embodiment of system 100 may be fitted with an appropriate venting and filtration systems to capture any noxious vapors, odors or other undesirable airborne materials that may be produced while the system 100 is in use.

Embodiments of system 100 may be compact and mobile. In some embodiments, multiple separation and filtrations systems 100 may be transported by a single light duty vehicle, such as a pickup truck, Cross-over or sport utility vehicle (SUV) as shown in embodiment 1000 of FIG. 10, described below. The bed of a pick-up truck has dimensions ranging from 54½ inches for the inside box width to 56¾ for the inside box length for a Chevrolet S10 from 2001-2004 to 100 inches by 80 inches for the inside box length by the inside box width for a Ford Super-Duty Truck from 2008-2010. SUVs can have a carrying capacity from 63.3 for a Mitsubishi Outlander to 130.8 cubic feet for a 2016 Ford Expedition EL. Trucks and SUVs are also classified by their weight carrying capacity. Class 1 includes SUVs and Pickup trucks with a weight carry capacity of 6000 pounds or less. Class 2 includes Full size pickups for a weight carry capacity of 6,001 pounds to 10,000 pounds. Class 3 includes Heavy Duty pickup trucks with a weight carry capacity of 10,001 pounds to 14,000 pounds. Trailers hauled by SUVs, Crossovers and trucks have various weights ranging from around 3500 pounds to around 23,000 pounds for a super heavy duty truck.

In other embodiments, the system 100 may be mounted on a barge, a boat or air lifted to remote locations. In some embodiments of system 100, a programmable logic controller (PLC) may be used as a centralized control mechanism of the system 100, to control each of the modules and components of the system 100. Embodiments of system 100 may further comprise one or more cameras, sensors or video recording equipment positioned at various strategic points of system 100 which may allow for remote monitoring by a user of system 100. Cellular or satellite services may further be connected to a LAN, Wi-Fi communication network or computer network to allow for remote communication between one or more users and system 100. The combination of cameras, cellular or satellite service, LAN or Wi-Fi in conjunction with the PLC may allow for remote management and control of the system 100, as well as enabling an operator to manage multiple filtration systems 100 simultaneously.

Dynamic Filtration Clarifier Module

Embodiments of DFC 101, such as the DFC 101 portrayed in FIGS. 1-2 may achieve primary dewatering of solid-liquid slurries and initial separation of liquids present in a liquid-liquid slurry. Embodiments of the DFC 101 may be more efficient, more effective, faster, smaller, lighter, mobile and a less expensive alternative to the settling clarifiers. The DFC 101 may dewater slurries entering the DFC 101 as an influent 107 and gravitationally evacuate the separated slurry as a sludge having a reduced moisture content. Embodiments of the DFC 101 may effectively perform primary dewatering without using mechanically moving parts. Moreover, the DFC 101 may modularly scale in size to accept any slurry flow processing rate, while further delivering clearer and cleaner effluent 111 from the outlet 109 having less suspended solids than the influent 107 entering the DFC 101. The sludge obtained from the DFC 101 may comprise a lower moisture content resulting in a sludge that is easier to manage by downstream modules, making downstream dewatering less intensive than typical settling clarifiers.

Figure 10:
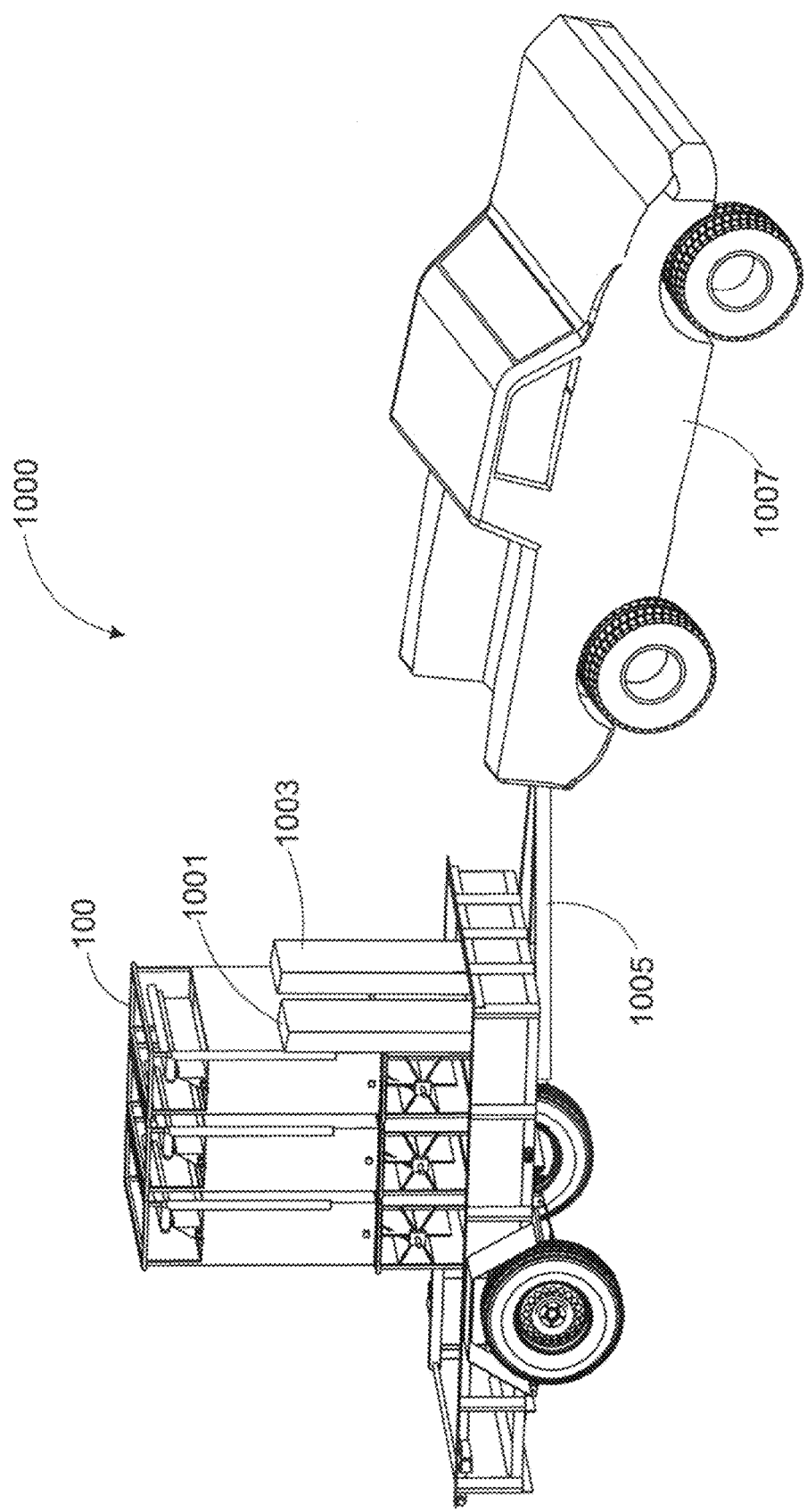
FIG. 10 depicts an embodiment of a mobile emergency separation and filtration system.

Referring to the drawings of FIGS. 1-2, a slurry may be pumped from a slurry source or a conditioning system (similar to the conditioning system depicted in system 1000 of FIG. 10), such as a polymer injection system, into inlet conduit 207 of the DFC 101 as influent 107. Entering through inlet conduit 207, the influent 107 may be received by a uniform laminar flow (ULF) component 103 of the DFC 101 module connected to inlet conduit 207. Embodiments of the ULF 103 may operate in a manner that manages the flow of the slurry entering the DFC 101 allowing for the slurry to be evenly and uniformly distributed over a multi-layer self-cleaning filter (MSF) 105 during the primary dewatering phase.

Due to the nature of a slurry or conditioned slurry, typically not having a laminar flow, it may be beneficial to create a laminar-like flow for more even distribution and placement of the slurry over filter media 407 to encourage a maximum amount of free water to be released from flocs within the slurry. The integration of a ULF 103 into the DFC 101 may produce a more even and uniform laminar flow by continuously sectioning, compartmentalizing and distributing the slurry influent 107 entering the DFC 101. The ULF 103 may transform a turbulent slurry flow into a smoother, streamlined uniform laminar flow, allowing for a more efficient, effective and consistent dewatering. Due to the random and unpredictable nature of an influent 107 slurry flow entering the ULF 103, the even and uniform placement of the slurry achieved by the ULF 103, may not efficiently or effectively be accomplished by other mechanisms such as weirs or other similar technologies, especially for placement of the slurry onto an inclined or horizontal filter media 407 of a MSF 105.

Figure 3A:
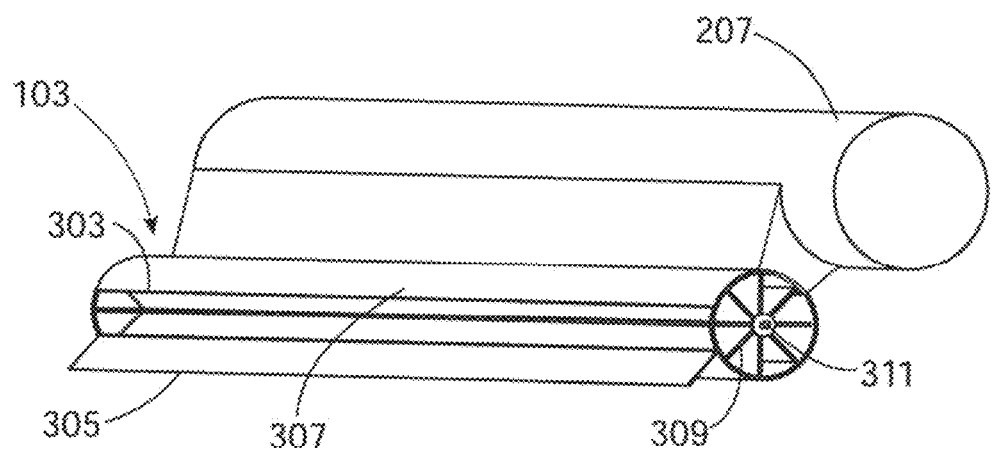
FIG. 3a depicts an embodiment of a uniform laminar flow device of the dynamic filtration clarifier of FIG. 2.
Figure 3B:
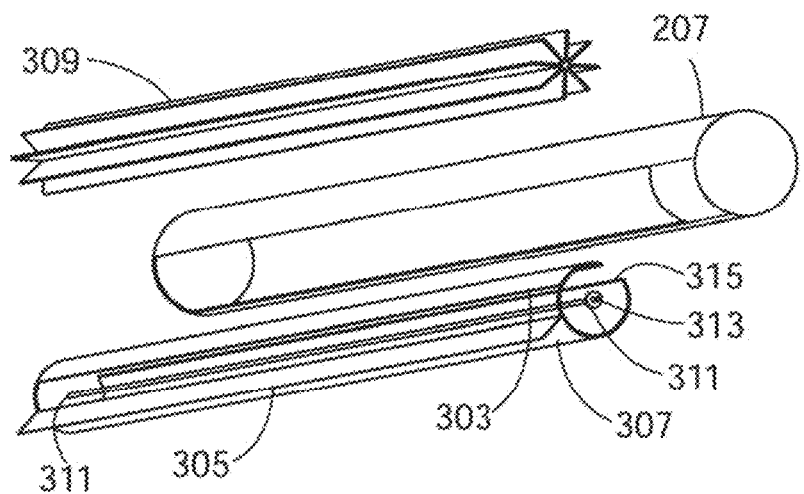
Figure 4A:
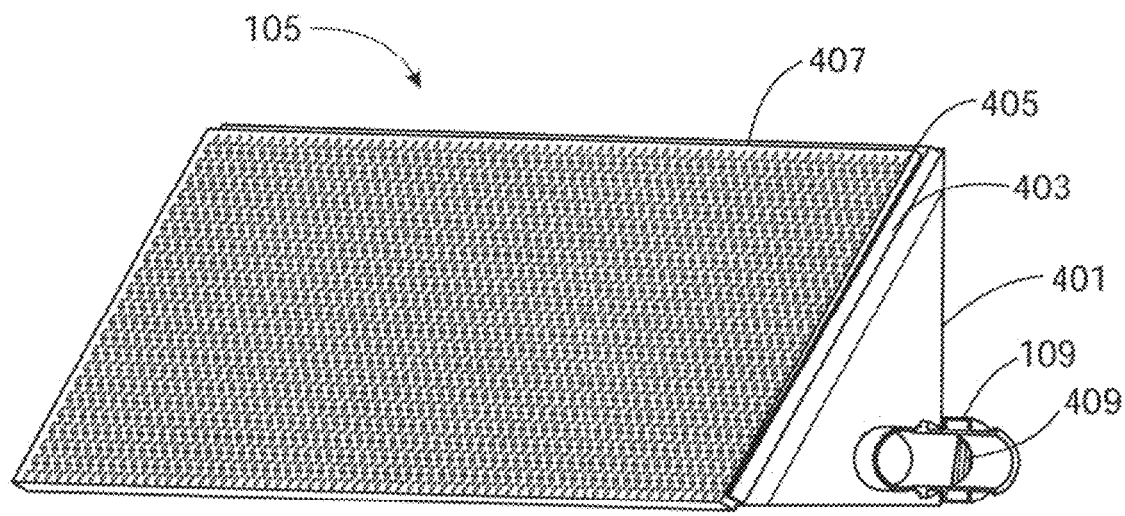
FIG. 4a depicts an isometric view of an embodiment of a multi-layer self-cleaning filter.
Figure 4B:
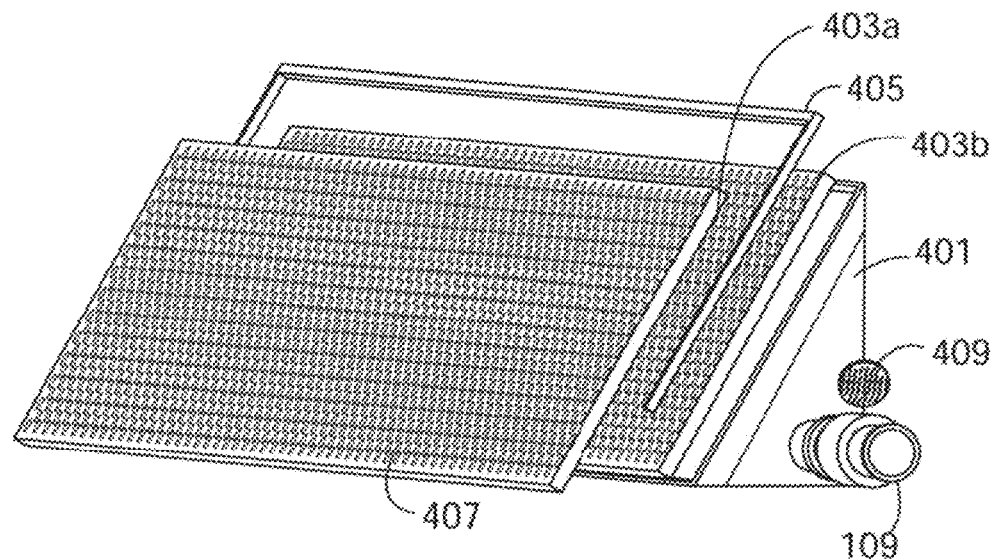

Embodiments of ULF 103 may be in the form of a cylinder or tube-like shape and may be enclosed on both ends as shown in FIG. 2-3b. The ULF 103 may be any appropriate diameter and length and the ULF 103 may be situated at any angle between vertical and horizontal (for example, 0° to 180°). In the exemplary embodiment depicted in the figures, a horizontally angled ULF 103 is shown. Embodiments of the ULF 103 may have a slotted inlet opening 315 connected to conduit 207 receiving an influent 107 from the source of the slurry.

The slotted inlet 315 may traverse the ULF 103 lengthwise, horizontally on an upper portion of the cylindrical housing 307 of the ULF 103 and a slotted outlet opening 303, which may traverse lengthwise horizontally on a lower portion of the cylinder of the ULF 103. The slotted inlet opening 315 and the slotted outlet opening 303 may be less than 180 degrees opposed from each other in some embodiments whereas in alternative embodiments, the opening 315 and the outlet may be more than 180 degrees opposite of one another. In some embodiments of the ULF 103 a discharge flow plate 305 may be attached to the lower edge of the outlet slot 303. In the exemplary embodiments, the discharge flow plate 305 may extend the length of the outlet slot 303. The outlet discharge plate 305 may remain positioned at an appropriate or desired angle between 0 degrees and 90 degrees to the outlet slot 303 and direct the flow of influent onto the filter media 407 of the MSF 105.

In some embodiments of the system 100, the ULF 103 may comprise an axle 311 having a diameter and extending length relative to the size and shape of the ULF's 103 cylindrical body. The axle 311 may be centrally positioned and horizontally extending through one or more holes positioned at the distal ends of the ULF 103 receiving the axle 311 there through. Embodiments of ULF 103 may further include one or more pillow blocks 313 or other desired mechanisms which may be attached to one or both ends of the axle 311. In some embodiments, a device capable of rotating the axle 311, either mechanically such as a motor or by the hands of a user, may be attached to one or both ends of the axle 311.

Embodiments of ULF 103 may comprise one or more blades 309 or finlike projections protruding radially from the axle 311. In some embodiments, the blades 309 may be an even number of opposing positioned blades attached to the axle 311. The length of the blades 309 may be equal to an interior length of the ULF's cylindrical housing 307 and approximately a requisite dimension to enable rotational clearance of the blades 309 within the cylinder of the ULF 103. The radial distance the blades 309 may protrude from the axle 311 may be any desired measurement but in the exemplary embodiment the blades 309 may protrude at approximately the radius of the cylinder, but the blades may extend slightly less in length in order to be an appropriate dimension to enable rotational clearance within the cylinder. The blades 309 may be positioned along the axle in a straight, helical or other appropriate pattern.

Embodiments of the ULF 103 may comprise a cylinder or tube which may be enclosed on both ends. The cylinder or tube may house the rotating axle 311 having one or more blades 309 protruding from the axle 311. The blades 309 may in some embodiments, extend the length of the cylinder. The cylinder may comprise an upper horizontal inlet having an opening 315, a lower horizontal outlet slot 303 and a discharge plate 305 positioned on the lower edge of the outlet slot 303. The opposing locations of the inlet 315 and outlet slots 303 may be less than 180 degrees apart in some embodiments. Moreover, the position of the inlet 315 and outlet slot 303 coupled with the weight and velocity of slurry, may enable gravity to sufficiently and continuously rotate the bladed axle 311 without additional force needing to be applied. In an alternative embodiment of ULF 103, a mechanism may be employed, such as a motor or hand crank to rotate the axle 311.

The slurry may enter the cylinder of ULF 103 through the inlet slot 315 and the slurry may be positioned onto a rotating blade 309. A space created between the rotating blades 309 may form a compartment to section the slurry. As the blades 309 rotate downward, a centrifugal force operating through the force of gravity may push the compartment formed by the blades 309 containing the slurry towards the outer edge of the following blade 309 thereby consolidating and compressing flocs against the inner wall of the cylinder, forcing the flocs to extend more evenly and uniformly over the length of the following rotating blade 309. The confinement of the flocs in the space formed between the rotating blades 309 coupled with the compression force against the wall of the cylinder, may provide a conducive environment for smaller flocs and colloids to agglomerate with larger flocs, resulting in more effective and efficient initial primary dewatering.

As the floc laden blade 309 rotates toward the outlet slot 303, the flocs may be evacuated onto the discharge plate 305 in an even, sweeping, motion. Subsequently, the sweeping motion of the blades 309 discharging the flocs of the slurry onto the discharge plate 305 followed by flowing the slurry on to the MSF 105 receiving the slurry on the filter media 407 as the slurry flows off the discharge plate 305 in a uniform and consistent elongated mass of flocs uniformly flowing in a consistent laminar like flow down or across the filter media 407 of MSF 105. The uniform laminar flow encourages more effective primary water release from flocs by mitigating channeling or clumping on filter media 407, preventing the buildup of flocs or other solid objects that may cause clogging which can be disruptive to the slurry's flow down or across filter media 407. The laminar flow may reduce the occurrence of filter blinding, shortening filter media maintenance and/or reducing the number of replacement cycles.

The blinding or clogging of any portion of filter media 407 for any period of time may render filter media 407 less effective and efficient. The filtering of uniformly shaped spherical objects present in the slurry or sludge may require a filter media 407 with porosity openings smaller than the spheres being filtered. However, it may be rare for slurry or sludge to contain only uniformly shaped spherical objects. Slurries and sludge entering separation system 100 may normally include irregularly shaped objects, especially solids with sharp edges or protrusions which can penetrate pores in filter media, resulting in clogging and blinding. This is especially the case with wedge wire screens or similar slotted types of filter media 407. In an effort to clear the filter media 407 of solid objects that may be caught or jammed in the filter media 407 water or compressed air may be sprayed over the filter media 407 of MSF 105 in an effort to dislodge jammed solids.

Embodiments of MSF 105 may include one or more layers of filter media 403, 407. Embodiments of the one or more of the filter mediums present in MSF 105 may be flexible in structure. Embodiments of MSF 105 may further comprise a frame 405 to house the filter media 407. The frame 405 may be geometric shape such as parabolic, round or rectangular. Embodiments of the frame 405 may include one or more layers of filter media 403, 407 affixed to interior edges of the frame 405. Embodiments of the frame 405 may further comprise one or more orifices or holes throughout the frame to facilitate the introduction of compressed air or forced blown air from a source of compressed air, such as a compressed air tank. In some embodiments, the frame 405 may include one or more channels or grooves within the edges of the frame. The channel or channels within the frame 405 may allow for the introduction of compressed or forced air to enable the channeled frame to operate as an "air knife" for breaking up solid flocs of the slurry and removing jams within the filter media 407.

In some embodiments of the MSF 105, a filtrate drain pan 401 may be attached to the frame 405. A slurry or conditioned slurry exiting the ULF 103 may flow onto a horizontal or inclined filter media 407 attached to frame 405. Embodiments of the filter media 407 depending on the size of the porosity of filter media 407 needed. For example, the filter media 407 attached to the drain pain 401 may be exchanged with filter media 407 of differing porosity sizes assuring that the porosity or aperture size of filter media 407 is smaller than the smallest flocs of the slurry, in order to enhance filtering and permit the efficient filtering of various sized flocs, and other solids, resulting in clearer effluent 111 exiting the MSF 105. As noted above, single or multiple layers of filter media 407, 403 may be employed to filter difficult to settle, suspended solids or flocs, such as those that remain indefinitely suspended, float or become re-suspended.

Embodiments of the MSF 105 may achieve primary dewatering by separating flocs or suspended solids in the slurry from primary or free water present in the slurry. As the slurry or conditioned slurry flows over filter media 407, gravity causes free water to immediately release and separate from the flocs, filtrating the water through filter media 407, trapping flocs on filter media 407. Free water filtrated through filter media 407 may be captured in the drain pan 401 attached to the back of the frame assembly 405 and then discharged as effluent 111 from the outlet 109. The effluent 111 of the released free water may exit the MSF 105 from outlet 109 and may be discharged from the MSF 105 back to a waterway source. Moreover, if it is desired by the user of the system 100, the MSF effluent 111 may be sent to one or more additional downstream processing technologies or additional modules for further remediation and dewatering. The remaining flocs filtered by the filter media 407, may now be considered sludge and exit the MSF 105 as the sludge falls off the edge of the filtered media 407 as primary dewatered sludge 113.

Embodiments of MSF 105 may continuously clear the filter media 407 of flocs or other objects, which may become lodged, wedged or stuck in the pores of filter media 407. In some embodiments, the removal of solid flocs may be accomplished by attaching the filter media 407 to a frame 405 in such a manner as to permit a desired amount of "slack" or flex, thereby allowing the filter media 407 to have movement or to oscillate and then recoil. The slack in the filter media 407 in conjunction with the weight of the sludge, or other solids on the filter media 407, may cause the filter media 407 to oscillate, bend or sag, then recoil. The oscillating and recoiling movement may dislodge and then eject flocs, sludge or other solids in a trampoline like effect, resulting in the elimination or reduction of clogging or blinding of the filter media 407.

In some embodiments of the system, the MSF 105 may include a combination of one or more channeled frames 405 and/or one or more layers of filter media 403, 407. One or more frame assemblies may be connected lengthwise or widthwise to form a larger frame assembly. The frame assembly 405 may be adjustable to reflect any desired angle. For instance, the frame assembly may position the filter media 403, 407 vertically, horizontal or any angle in between. The angle may be changed or adjusted in order to match slurry flow rate and particles in slurry seeking be dewatered. Channels and holes may be placed along the frame 405 to provide the ability for the frame 405 to receive an air flow from an air compressor, blower or other mechanism. The air flow can be blown over filter media 403, 407, resulting in the frame formation of an "air knife". The air knife may be situated in such a way as to enable air to be blown from multiple directions towards the inward portion of filter media 403, 407 screen assembly. Embodiments of the air knife may be directed over or under both sides of filter media 403, 407, over one or more layers of filter media 403, 407, or between one or more layers of filter media 403, 407. The air movement may enhance filter media oscillation and further encourage the flow of sludge to exit toward the outlet of the MSF 105.

In addition to clearing filter media 403, 407 of embedded objects, oscillation and air flow, collectively or individually may break the surface tension of water adhering to the sludge, flocs or other solids, further enabling additional surface water to release from flocs and solids, enhancing the amount of filtrate passing through all layers of filter media 403, 407. As the filtrate of water or other liquid passes through the outlet 109 of the MSF 105 as effluent 111, the filtrate may further pass through an additional outlet filtration media 409 providing an additional filter for any smaller solids that may have inadvertently passed through the plurality of filter media 403, 407 layers. The small solids captured may be prevented from being released with the rest of the filtrated water or liquid passing there through.

The filtered flocs (now sludge), may gravitationally flow down the inclined filter media 407 in a tumbling or rolling motion and/or be vibrated across horizontal filter media. The sludge may be gravitationally evacuated by falling off the end of the filter media 407 frame 405. In some embodiments, the sludge exiting the MSF 105 may then enter into the NDC 115, or be evacuated or conveyed to alternative downstream technologies, methodologies or mechanisms for further dewatering.

In an alternative embodiment of MSF 105, the frame assembly 405 may be round, or another appropriate shape, permitting the placement of the MSF 105 within piping or tubing. One or more layers of filter media 403, 407 may be positioned at an angle to the flow where the top of the assembly is angled away from the bottom of the assembly in the direction of the flow. As particles are filtered by the filter media 407, they may be forced up the filter media by the flow. The velocity and pulsation of the flow of the slurry may oscillate the filter media to free solid particles from the water or other liquids present in the slurry. Air may be introduced on the filter media 407 to enhance release of lodged particles and provide further ancillary benefit of aerating the flow of slurry. The frame assembly 405 may be detachable or removable, enabling filtered particles to be discarded without disrupting the flow. The flow of the slurry may be diverted or switched to an alternate inline filter assembly to facilitate a "hot swap" of one or more filter mediums.

Nested-Filter Dewatering Cell Module

The NDC 115 may perform a secondary dewatering function by enabling the removal of interstitial water from the primary dewatered sludge 113 received from the MSF 105. The interstitial water being removed may also be referred to by some people skilled in the art, as capillary water. Embodiments of the NDC 115 may be constructed from any suitable or desired material that is appropriate for providing structural support to and allow for the NDC 115 system module to properly function as described herein. The NDC 115 may release the interstitial water from the sludge 113, filter out the interstitial water and then discharge the interstitial water as an NDC effluent 117 via the NDC outlet 517. Embodiments of NDC 115 may accomplish the removal of interstitial water by the confinement and compaction of sludge inside one or more nested filters 507 separated by partition walls 505. The NDC 115 may use the weight and accumulated lift of the sludge's mass entering the NDC 115 to perform the separation and release of the interstitial water. Embodiments of the NDC 115 may be a more efficient, more effective, faster, smaller, lighter, mobile and less expensive alternative to other dewatering cells and geo-textile bags.

Figure 5A:
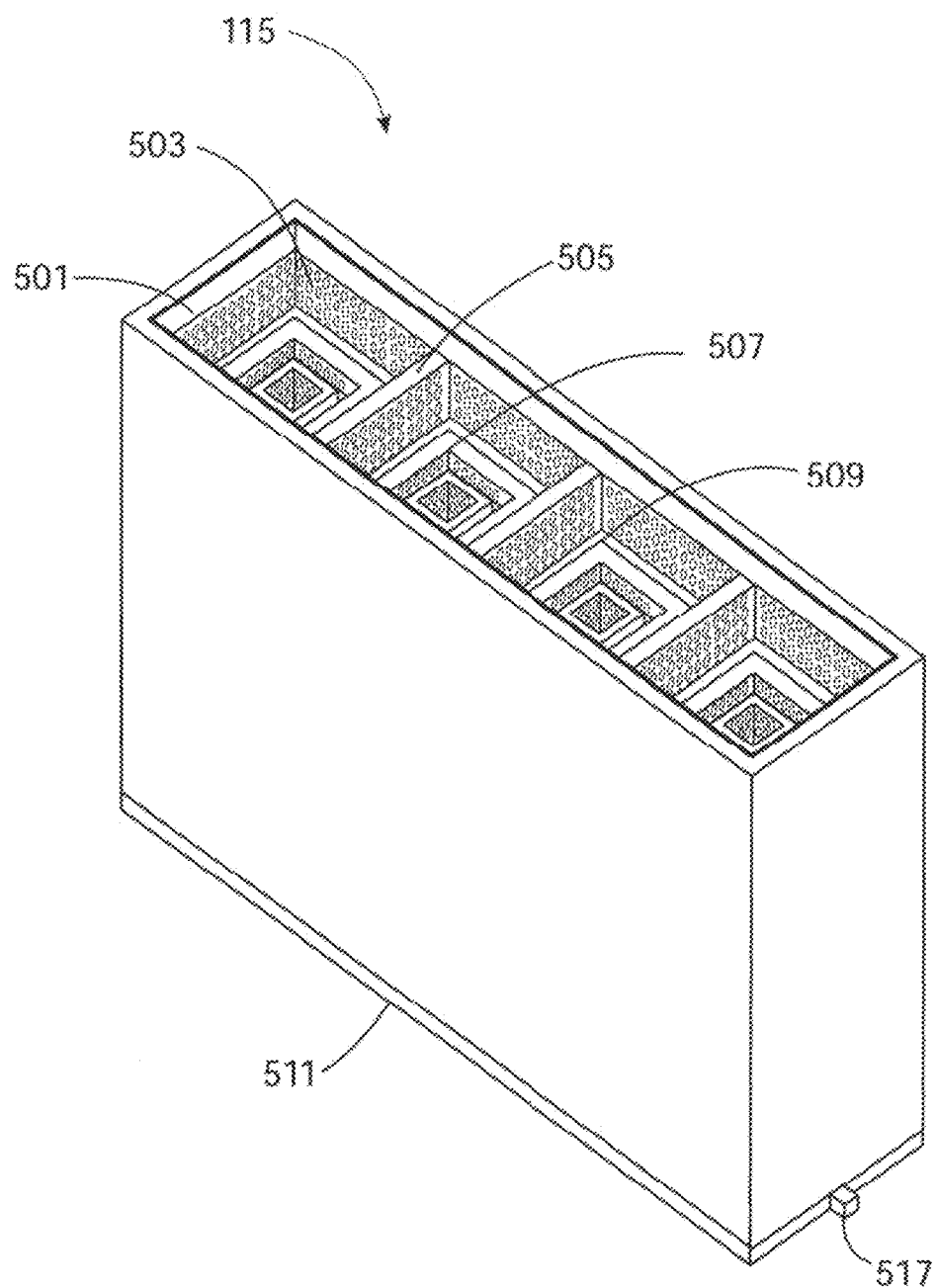
FIG. 5a depicts an isometric view of an embodiment of a nested-filter dewatering cell.

Embodiments of the NDC may be comprise of one or more cells 501. A cell 501 of NDC 115 may be any shape desired. In the exemplary embodiment of the drawings, a rectangular or square shape is depicted, however, the shape of the cells 501 could round, triangular, pentagonal, hexagonal, rhomboid or any other multi-sided polygon shape. Embodiments of the cell 501 may include one or more exterior walls attached to each other and one or more partitioning wall separating each cell 501 of the NDC 115. As shown in the exemplary embodiment depicted in FIG. 5a, four exterior walls may be used to form a perimeter confining the NDC 115. However, in some alternative shapes may be constructed with more than four exterior walls or less than four exterior walls as desired. Alternative geometric shapes of cell 501 may be round, oval, square or multi-sided polygons. Embodiments of each cell 501 may be is positioned horizontally, vertically or any position between vertical and horizontal.

Embodiments of cell 501 may include one or more evacuation outlets 510, portals or other desired evacuation mechanisms positioned at the bottom of the cell 501. As an alternative, one or more evacuation outlets, portals or other desired evacuation mechanisms may be positioned at the lower end of one or more side walls.

Embodiments of each cell 501 may include a frame having a plurality of vertical and horizontal connected bars or slats to assist with forming the shape of the cell. Embodiments of the frame may be attached to one or more interior surfaces of the cell's interior wall 503. Embodiments of the interior cell wall 503 may be covered with filter media and attached to the frame on interior facing sides of the frame. Embodiments of each cell's 501 frame may also be connected to the partition walls 505 constructed of or covered by filter media as well.

Embodiments of partition walls 505 may be covered with filter media on one or both sides of the partition walls 505. The partition walls 505 may be constructed in such a way as to create a space or void between the interior surface of the cell's walls and the filter media. In some embodiments, one or more partition walls 505 may be positioned at desired points within the cell 501. In some embodiments of NFC 115, one or more additional cells 501 with filter media covering both sides of the frame may be appropriately sized to fit within the space created by the partitions in a nesting fashion as shown in FIG. 5b.

Embodiments of cell 501 having solid side walls with a frame within the cell 501 attached to the interior walls 503 of the cell 501 may be covered with filter media. In particular, the filter media covering the interior walls of the cell 501 may be the same filter media as the MSF 105 filter media 407. Embodiments of the cell 501 frame may create an unobstructed space or void between the filter media and side walls 503 allowing for the discharge of filtrated water or other liquids from the sludge entering the NDC 115. In some embodiments of NDC 115, one or more filter media covered framed partition walls 505 may be positioned within the cell 501 to create one or more smaller partitioned cells. One or more smaller cells having sides covered with filter media, and a geometric shape being similar to the partitioned cells, may be positioned within one or more partitioned cells in a nesting fashion to create nested cells. The height of the partitioned cells and the nested cells may be less than the height of the outside cell to allow for sludge entering the cell to cascade from one cell to another cell in order to fill all cells, thus creating an even lift of sludge in all cells.

Figure 5B:
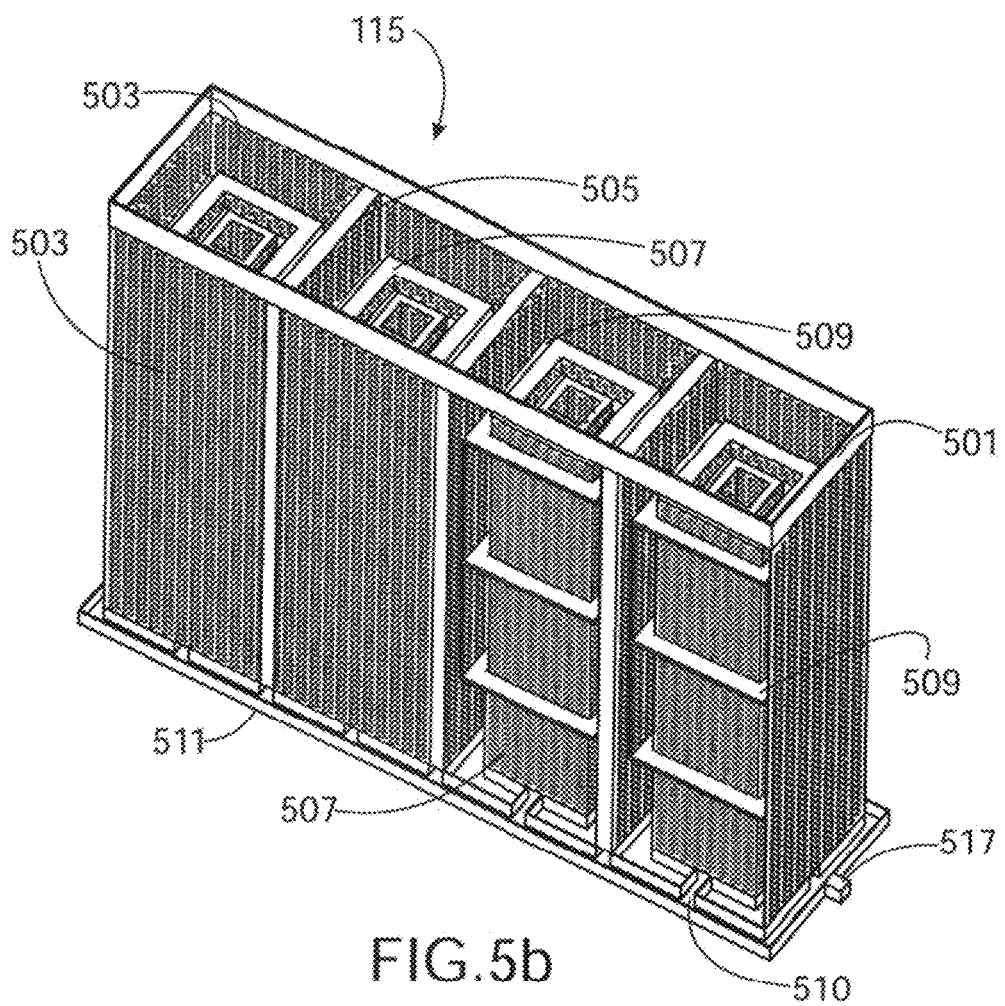
Figure 5C:
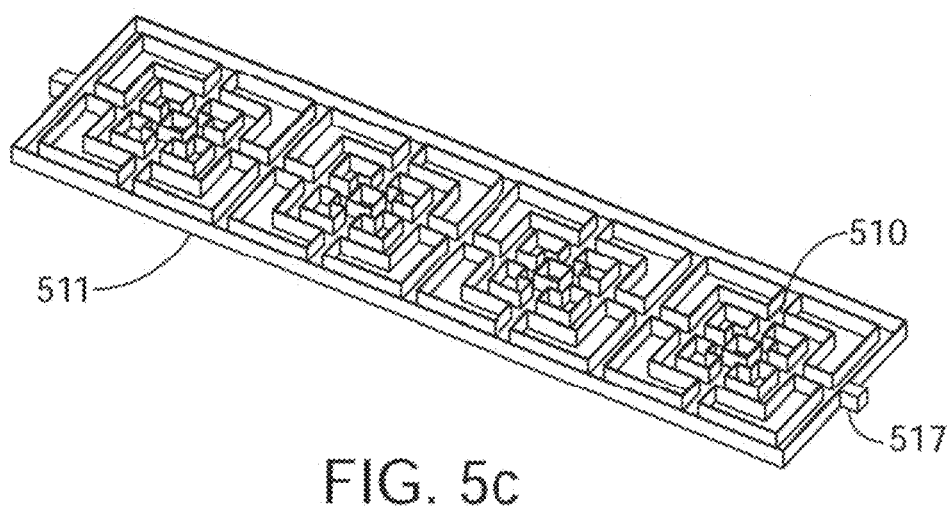
FIG. 5c depicts an embodiment of a gutter drain of a nested-filter dewatering cell.
Figure 6:
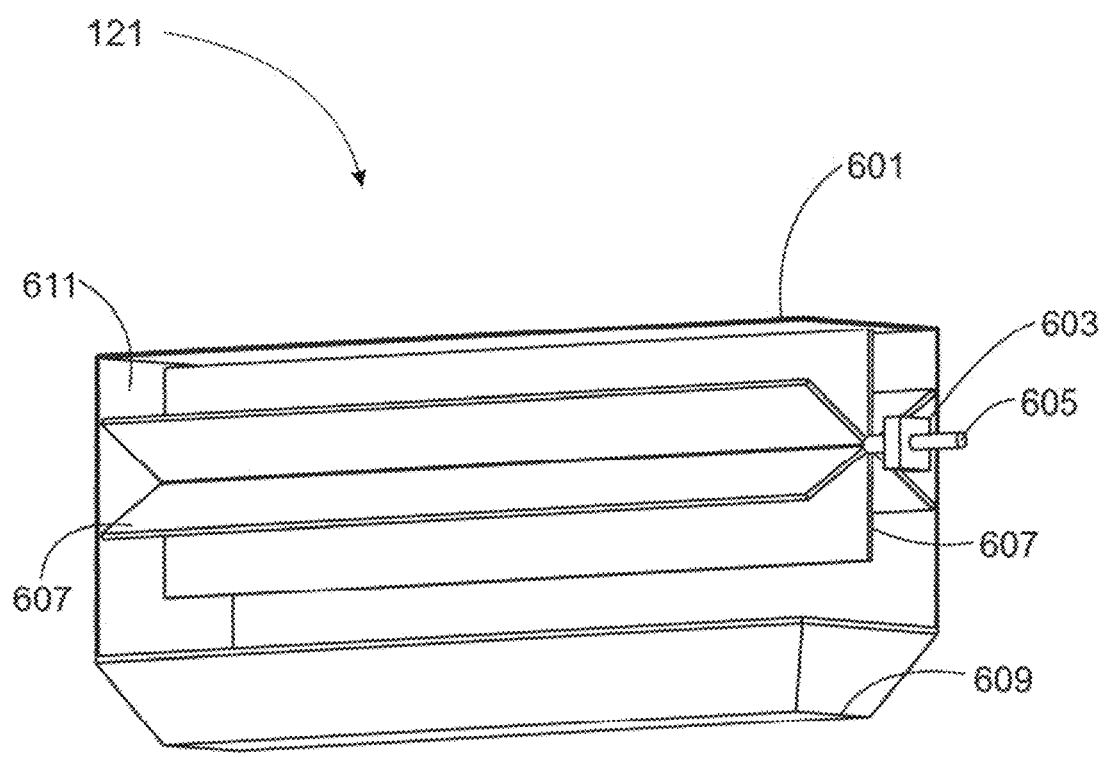
FIG. 6 depicts a partial cut-away view of an embodiment of a metered volume controller of a separation system.
Figure 7A:
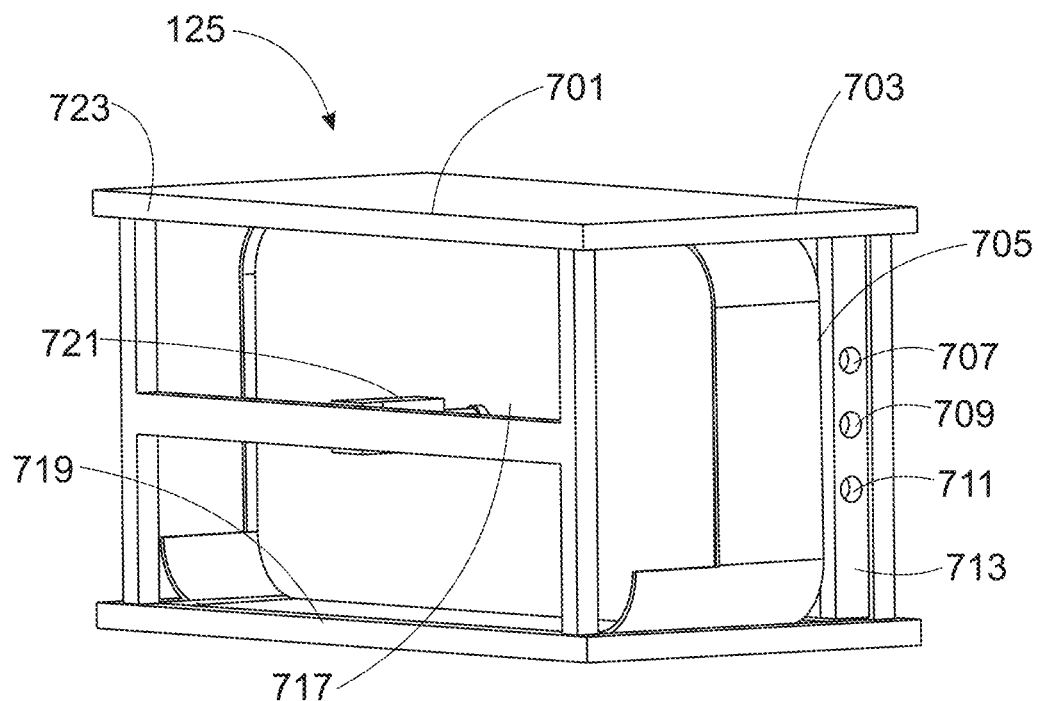
FIG. 7a depicts an isometric view of an embodiment of a compression filter press of a separation system.
Figure 7B:
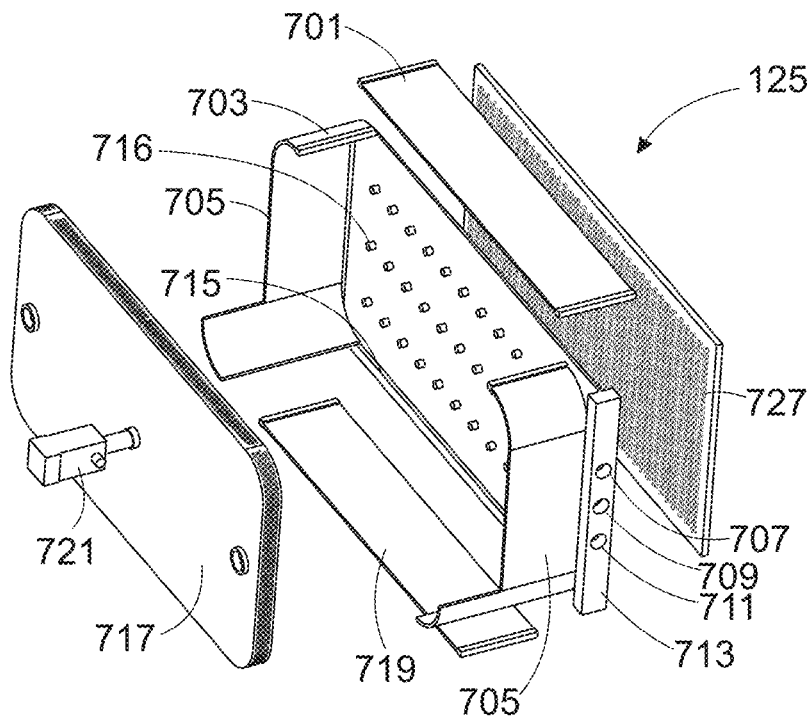
Figure 7E:
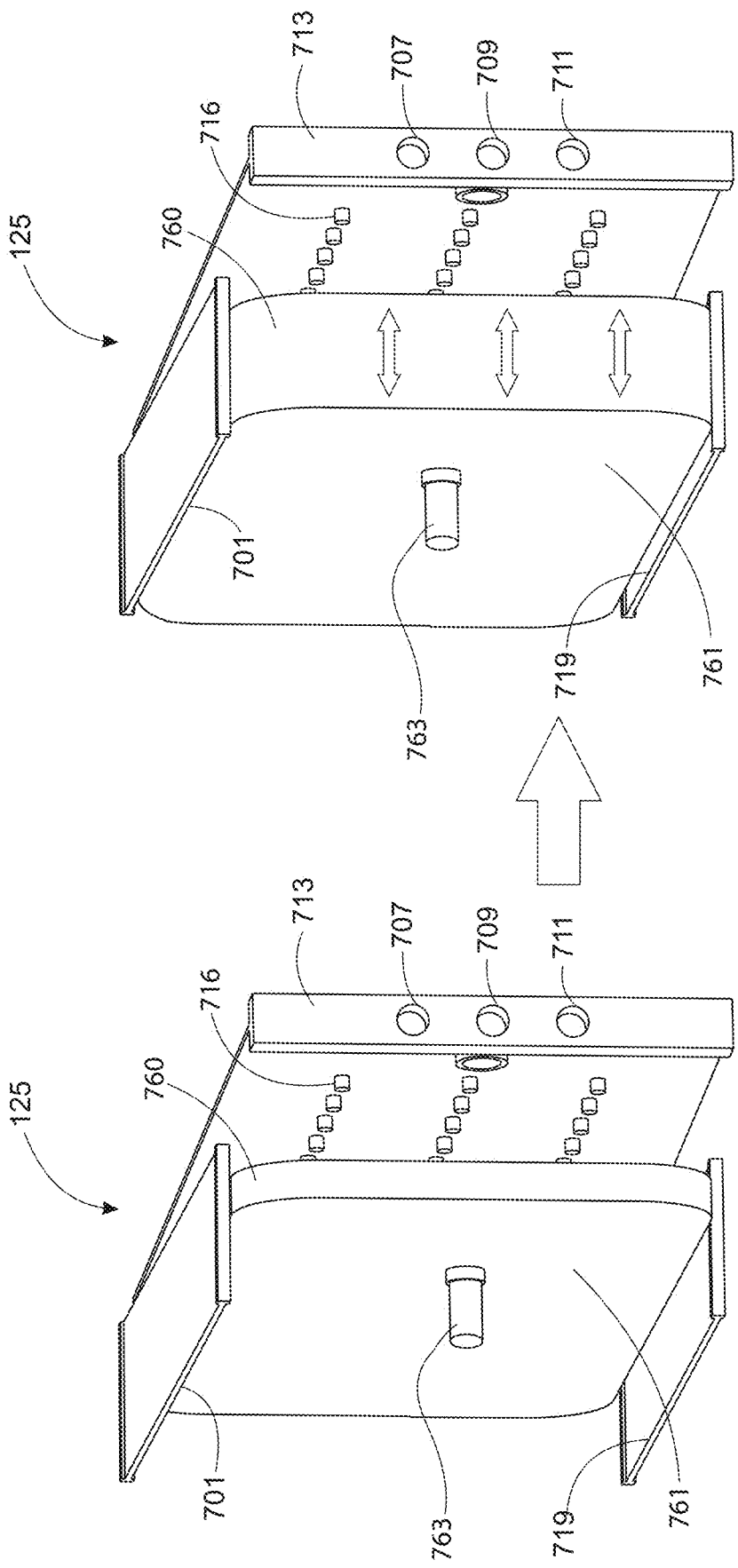
FIG. 7e depicts an alternative embodiment of a compression filter press with a dynamic fluidized press plate.

As depicted in FIG. 5b-5c, embodiments of the NDC 115 may further comprise a gutter drain 511 attached or positioned on the posterior surface of the cells of the NDC 115. The gutter drain 511 may be constructed of enclosed, open or channeled interconnected conduits or tubes. In some embodiments the gutter's conduits or tubes may have a center square or rectangular shaped tube as shown in FIG. 5c of this application. Embodiments of the gutter drain 511 may be connected to the bottom of the space created by the filter media of the cell walls 503 of the NDC 115 as well as the interior space of partitions 505 and nested filters 507. If, the embodiment of the drain 511 is an enclosed square or rectangular shaped tube having an open center tube, the drain 511 may have one or more orifices on the top or side of the cell 501 facing the space between filter media 503 and the exterior cell wall. One or more effluent discharge drain outlets 510 may be connected to the gutter 511 and positioned at one or more appropriate points along the base of each cell 501. Embodiments of the interconnected gutter 511 and drain outlets 510 may feed the separated liquid or water along the gutter assembly 511 and feed the filtrated water or liquid away from the remaining sludge and out through NDC outlet 517. The gutter assembly may be attached at the lower end of cell 501 as well as the partition walls 505 and the enclosed the space created between filter media 503 and the cell walls between the partitions and nested filters 507.

In some embodiments, the NDC 115 may include one or more directional plates 509 having a sizing dimension less than the opening created by the filter media covered walls 503. Embodiments of the directional plate or plates 509 may be positioned within each cell 501 either horizontally or vertically between one or more opposing filter media covered walls 503 or partition walls 505. The directional plate 509 may have an appropriate slope in the direction heading towards the filter media covered walls 503. In some embodiments of the NDC 115, one or more sections of the cell 501 may include open wire mesh constructed out of a firm material having dimensions less than the opening created by opposing filter media covered walls 503. The wire mesh may be positioned within the cell 501 in a horizontal position between one or more opposing filter media covered walls 503. In some embodiments of NDC 115, one or more orifices or portals may be present within cell 501 and positioned throughout each cell, allowing for the introduction of a vacuum and/or compressed air.

The one or more directional plates 509 situated between one or more filter media covered walls 503 may have the directional plate 509 sloping towards filter media covered walls 503. The directional plate 509 may be stationary or static, or alternatively situated on an axle to enable mechanical rotation. One or more layers of wire mesh may be inserted between one or more opposing filter media covered walls 503. The open space at the bottom of all filter media covered cell walls 503, partitioned walls 505 and nested filters 507 may be attached to the gutter drain assembly 511. Evacuation portals, doors, or other desired methods of sludge evacuation, such as an MVC, screw conveyor or auger, may be attached to the bottom of the cell, or the lower portions of the side walls of cell 501.

At the onset of operation, embodiments of the NDC's 115 evacuation portals or other mechanisms for removal of sludge from the NDC 115 may be in a closed position. The slurry or primary dewatered sludge 113, such as from the DFC's 101 MSF 105, may be fed or placed into the NDC 115 through the top of the cell 501. The differing height between the cell 501, the partitioned cells and the nested cells permits the slurry or sludge to evenly fill all cells 501 by cascading from one section to the other as each cell 501 or nested filters of the cell receives with sludge or slurry.

In some embodiments the secondary dewatering may be achieved using compression, consolidation and compaction techniques which may be performed on the sludge 113 by the confinement of the sludge 113 into a plurality of nested filters 507 using the weight and/or the accumulated lift of sludge's 113 mass to perform the compaction. The sludge 113 entering the NDC 115 may be allowed to build up in order to consolidate and compact between all filter media covered walls 503. The closer the proximity of filter media covered walls 503, the shorter the distance interstitial or free water has to travel to be filtrated and discharged. As the lift of the sludge accumulates, compression created by the weight of the accumulating sludge and compaction created by the proximity of the filter media covered walls 503, may break the capillary pore water pressure or tension, thus releasing interstitial water inside of and adhering to capillary walls of the sludge or slurry. In some embodiments, a vacuum and/or compressed air may be introduced into the cells 501 of the NDC 115 from to further improve the removal of interstitial water.

Filtrated water from the sludge or slurry may filtrate through the filter media positioned along the filter media covered walls 503, partitioned walls 505 and nested filter 507, subsequently collecting in the gutter assembly 511, and thus discharged from the gutter assembly outlet as effluent 117. The introduction of a vacuum and/or compressed air to the NDC 115 may be beneficial and may be expressed on the NDC 115 to further enhance dewatering. However, when applying a vacuum, special care may be taken to ensure that the amount of vacuum applied does not collapse the capillaries of the filter media. Prolonged compression or vacuum on a lift or mass of sludge in a static position without movement or reconsolidation, may collapse capillaries, contract the mass and create a void between filter media or vacuum source. Such a prolonged compression by the vacuum or compressed air may encourage the formation of an outer crust to form on the sludge mass. Crusting and capillary collapse may block, cease or impede the release of interstitial water, and therefore, may render the core of the mass disproportionately saturated and unevenly dewatered. Examples of crusting may be a common problem in static dewatering technologies such as geo-textile bags and static positioned dewatering cells.

Once a desired amount of lift of the sludge 113 has accumulated, evacuation mechanisms of the NDC 115 may be opened to a point which permits the amount of sludge being evacuated from the cell 501 as secondary dewatered sludge 119, to equal the amount of sludge entering the cells 501 of NDC 115, thereby achieving a state of dynamic equilibrium operation. The ability to gravitationally evacuate sludge from the NDC 115 may eliminate the need for tipping or excavating mechanisms for evacuation of the sludge required by other dewatering cells. The opening of evacuation portals permits and encourages sludge movement, and thus sludge repositioning and reconsolidation, thereby encouraging additional capillary formation and ultimately resulting in additional interstitial water release.

As the sludge moves down the cell 501, directional plates 509 encourages the sludge mass, and importantly the center or core of the sludge mass, to flow towards walls and partitions having filter media 503, 505, 507 thereby repositioning and reconsolidating the sludge mass and further shortening the distance interstitial water must travel to be filtrated. The presence of a wire mesh assembly may "slice" the sludge mass into smaller portions, exposing and/or creating new capillaries for interstitial water movement and release. The continuous movement of the sludge down the cell 501, facilitated by the partially opened evacuation portals, in conjunction with the plates 509 and wire mesh assemblies, continuously repositions and reconsolidates sludge.

In some embodiments, the movement of the sludge, especially when under pressure, may enhance interstitial water release, capillarity, and filtration and reduce capillary collapsing or blocking, while encouraging the formation of new capillaries as the sludge continuously repositions and reconsolidates. The introduction of air, especially compressed air, may dilate capillaries, having a drying or dehydrating effect on the sludge mass while also assisting in keeping the filter media of the NDC 115 from clogging or blinding. The continuous introduction of additional sludge into the cell 501 fills voids and cracks created by water release and/or vacuum that contracts the sludge, lifting and pulling the sludge away from filter media and vacuum sources, ultimately inhibiting or diminishing the effectiveness of expressing vacuum on sludge. The embodiments of the NDC 115 as described, separately, collectively and/or incrementally mitigates sludge contraction and crusting, as well as capillary collapse, thereby encouraging more uniform, effective and efficient sludge dewatering. In alternative embodiments, the NDC 115 may be operated in a manner that provides for the total evacuation of the cell 501 at any desired time.

In some alternative embodiments of the NDC 115, the NDC 115 may be equipped with a dynamic fluidized press plate 761 which is discussed in greater below. The fluidized press plate 761 may be constructed to include a sealed bladder 760 and a port 763 allowing for the fluidized press plate 761 to be filled. As the sludge 113 fills the cells 501 of the NDC 115, the bladder 760 of the fluidized press plate 761 may be filled, causing the bladder 760 to expand, increasing the pressure inside the cells 501 of the NDC 115. As the bladder 760 expands, the fluidized press plate 761 may increase the pressure inside each cell 501 of the NDC 115, compact the sludge 113 delivered to the NDC 115 and push the released water 113 through the filter media 503 lining the walls of the NDC 115, resulting in the release of interstitial fluid from the sludge which may be collected by the gutter 511 and evacuated from the NDC 115 via the NDC outlet 517.

Metered Volume Controller Module

As the evacuated secondary dewatered sludge 119 exits the NDC 115, for example via exit or outlet 219, the sludge may be deposited into a metered volume controller (MVC) 121 or discarded, depending on the configuration of the system 100. For example, at this point of separation and filtration using system 100, the sludge may have sufficiently reduced moisture content and may be considered a cake. The cake may be gravitationally evacuated for disposal, concluding dewatering or separation operations. If sufficient dewatering of sludge is not yet achieved, sludge may be gravitationally fed to the MVC 121.

Embodiments of the MVC 121 may be employed by system 100 as the sludge or solids evacuation and discharge mechanism. The MVC 121 may measure the precise amounts of sludge or solids for gravitational placement into the compression filter press (CFP) 125 or any other alternative dewatering technology. The MVC 121 may be fabricated from any suitable or desired material that is appropriate and capable of structurally supporting the features of the MVC 121 and its functions as described in the current application. Embodiments of an MVC 121 may include an MVC cell 611 which may have two opposing side walls and two opposing end walls. The end walls of the MVC 611 may be equipped with one or more appropriate sized orifices or holes to receive an MVC axle 605. The MVC axle 605 may be any appropriate length and diameter and may be positioned within the holes present of each of the end walls of MVC 121. In the exemplary embodiment, the MVC axle 605 may be centrally positioned horizontally extending through the holes in the end walls. One or more pillow blocks or other appropriate mechanisms may be attached to one or both ends of the MVC axle 605.

In some embodiments of the MVC 121, a mechanism to rotate the axle, such as a motor 603 or hand crank, may be attached to one or both ends of the MVC axle 605. The motor 603 may be a high torque-low RPM type motor or any other motor that may be sufficient for rotating the MVC axle 605. In some embodiments, a variable frequency drive or other appropriate mechanism may be employed to control the rotational speed of the MVC axle 605. Embodiments of the MVC 121 may further comprise one or more opposing blades 607 protruding from and attached to the MVC axle 605. The length of the blades 607 may be equal to the interior length of the MVC cell 611, minus a desired dimension to allow for rotational clearance of the blades 607 within the MVC cell 611 as the MVC blades 607 and MVC axle 605 rotate. Embodiments of the MVC blades 607 may have an overall width dimension between the side walls of the cell 611 less an appropriate dimension to enable rotational clearance within the MVC cell 611. The blades 607 may be positioned on the MVC axle 605 in a straight, helical or other appropriate or desired pattern.

The MVC 121 may measure a desired amount of sludge, or other volume of solids, which may be periodically or continuously evacuated from, or be delivered to, a vessel at any desired volume and evacuation rate. The space or cavity created between the blades 607 provides a measurable volume, which can be discharged at a measurable rate determined by the number of revolutions of the rotating axle 611. The ability to measure a precise volume of sludge and the rate the sludge is delivered may be important to downstream and upstream modules of the system, such as the NDC 115 and CFP 125, as well as to the overall processing rate of system 100 and the synchronous dynamic equilibrium operation thereof. For example, the volume of sludge delivered to the CFP 125 by MVC 121 may directly impact the cake thickness that the CFP 125 processes and discharges. This may be particularly true when comparing the same volume of differing types of sludge having varying compositions and moisture content. Sludge with higher moisture content may require a greater volume delivered to the CFP 125 than a corresponding volume of sludge with a lesser moisture content.

Embodiments of the MVC 121 may operate in cycles. At the beginning and end of a cycle, the bladed axle 605 may be positioned in such a manner that each of the opposing blades 607 may rest at a horizontal position, thereby forming a barrier blocking or impeding the release of sludge or other solid materials from the MVC outlet 609 of MVC 121. Sludge or other solid material may be gravitationally placed into the inlet 601 at the top of the MVC cell 611.

Gravity may force sludge into one or more cavities formed by the space between the blades 607, thereby capturing and confining a measurable amount of sludge within in the cavity of the MVC cell 611. As the bladed axle 605 is rotated, the measured amount of sludge or other material falls away from the bladed axle 605 and is gravitationally evacuated from the cell 605 as a secondary dewatered sludge 123. If the MVC 121 is used in conjunction with the CFP 125, the measured amount of sludge may accumulate at the bottom of the MVC until a moveable inlet portal 701 of the CFP 125 is opened.

Compression Filter Press Module

The CFP 125 may achieve secondary and tertiary dewatering of the sludge entering the CFP 125, reducing the moisture/liquid content of the sludge to form a cake by compressing and compacting sludge into cake having an appropriate or desired thickness. The resulting cake may be evacuated from the CFP 125 and made suitable for transport, stockpiling, beneficial reuse or disposal. The CFP 125 compresses sludge into cake within an enclosed dynamic cell. In some embodiments, a vacuum and compressed air also may be introduced into the CFP 125 cell when appropriate or desired. Using the embodiments of the CFP 125 as described, dewatering and filtration of the sludge may be more efficient, more effective, faster, smaller, lighter, mobile, less expensive, and less energy dependent and a less manpower intensive alternative to belt filter presses, plate and frame filter presses, rotary presses, centrifuges, dewatering cells and geo-textile bags. The CFP 125 may also modularly scale to meet any sludge processing rate.

Embodiments of CFP 125 may include a cell having two opposing fixed side walls 705 and one or both opposing end walls 717 being movable by pressure. Embodiments of the cell may be positioned at any angle between vertical and horizontal. In the exemplary embodiment of FIGS. 7a-7d, the CFP 125 is depicted as having a vertical cell. Embodiments of the moveable end walls 717 may be compressed through the use of pressure and may also be referred to as a movable press wall 717. Embodiments of the CFP 125 may further comprise a frame 723 supporting the fixed side walls 705. A track, rail or other appropriate guide 703 may be attached to the frame 723 to support one or both movable press walls 717. Embodiments of the CFP 125 may include a moveable inlet portal 701 situated at the top of the cell and a moveable outlet portal 719 situated at the bottom of the cell. Embodiments of the frame may act as a spacing device positioned between one or both movable press walls 717 and one or both side walls 705. As the frame encloses there may be unification between the movable press wall 717. In some embodiments of the CFP 125, filter media 727 may be placed over the movable press walls 717 creating a void or space between walls and the filter media 727. One or both filter media covered walls 717 may have rigid rim-like or ridge-like protrusions in a desired pattern and positioning, such as a waffle iron shape for example. In some embodiments, the CFP 125 may further include one or more filtrate drain portals 715 or orifices which may be situated at the bottom of the spacing between the walls and the filter media covered walls. In some embodiments, one or more vacuum portals 707 may be situated in either one or both walls, or within the space created between the walls and the filter media covered walls.

Moreover, the CFP 125 may also comprise one or more compressed air portals 709 which may be situated in either one or both side walls 707, or within the space created between the walls 705, 717, 701, 719 and the filter media 727. In some embodiments of the CFP 125, the CFP may include one or more injection nozzles 716 configured to deliver compressed air, a rinsing/washing solution and/or a cake remediation substance. An injection manifold 713 comprising an injection port 711, piping or tubing may be used to connect a plurality of nozzles 716 with substances injected into the manifold 713 being delivered to the cake within the cell of the CFP 125 via the end wall formed by the manifold 713.

In some embodiments of the CFP 125, a moving mechanism 721 may be attached to one or both moveable walls 717. Embodiments of the moving mechanism may be a hydraulic or pneumatic piston, worm drive or screw drive system. The CFP 125 may operate in a sequential cycled process. FIG. 8a-8c describes the sequential process of pressing the sludge 750 into an intermediate cake 751a and a final cake 751b which may be ejected from the CFP 125 through moving outlet portal 719. A cycle may begin with both the inlet 701 and outlet 719 portals being in a closed position. The opposing movable press wall 717 may be positioned apart by an appropriate and desired distance. When the inlet portal 701 is opened and a desired measured amount of sludge 750, (such as sludge delivered by the MVC 121), gravitationally falls into the cellular space formed between the separated walls 705, 717. The inlet portal 701 may be closed, thereby creating an enclosed cell. One or both opposing moveable walls 705, 717 having a filter media 727 covering said walls may then be pressed or contracted towards each other. The compression may be performed hydraulically, pneumatically, using a screw or worm drive or by any other appropriate mechanical mechanism 721. The contracting walls compact, consolidate and compresses the sludge 750 within the enclosed cell of the CFP 125, forcing the sludge 750 to fill the entire cavity of the enclosed cell, as shown incrementally via FIGS. 8b and 8c. An intermediate cake 751a is formed upon the initial compression shown in FIG. 8b. As additional pressure is expressed and increased on the contracting wall 705, 717, the sludge 750 may be further compressed and compacted into a final cake 751b. The resulting pressure may break the capillary pore water pressure or tension, thus releasing interstitial water and forcing the interstitial water to move in the direction noted by arrow 752, towards filter media 727. The interstitial water released from the cake may then be filtrated and discharged through the filtrate drain portals 715 or orifices positioned within the walls or at the bottom of the space created between filter media 727 and the walls 705, 717.

In some embodiments, expressing a vacuum on the sludge may enhance capillarity, capillary wicking, allowing for additional interstitial water release and filtrate extraction. Expressing compressed air or blown air may dilate the capillaries of the sludge 750 and further dehydrate the sludge 750, providing blowback to clear residual sludge or cake particle residue that might adhere to filter media 727. As shown in FIG. 8c, the movable press walls 705, 717 may then be retracted, encouraging the compressed sludge 750, now in the form of a cake 751b, to fall away from filter media 727 as a sheet of cake and release to the bottom of the cell towards the outlet 719. The sheet of cake may fracture into pieces as it falls away from filter media 727 and further break apart into smaller chunked pieces as the sheet of cake 751b impacts the floor of the cell formed by the interior surface of outlet portal 719. The broken open fractured chunked pieces of cake 751b may expose the core of cake, which is where the most difficult area to extract interstitial water may reside. As shown in FIG. 8b and FIG. 8C, one or more cycles of the CFP 125 may be performed repeatedly by compressing the walls 705, 717, applying vacuum and/or compressed air until the desired level of cake moisture content or thickness is achieved.

Once a desired the level of cake moisture content is achieved, the outlet portal 719, positioned at the bottom of the cell, may be opened allowing the cake to gravitationally fall through the outlet portal 719 and be evacuated from the CFP 125. In alternative embodiments, alternative forms of evacuation may be employed, such as screw conveyors or augers. In some embodiments, the cake may be further washed or rinsed or in some alternative embodiments, one or more desired cake remediation substances may be introduced into the CFP 125 cycle described in FIGS. 8a to 8c at any appropriate time before, during or after a CFP cycle, depending on the results desired to be achieved.

In an alternative embodiment, the CFP 125 may include a dynamically fluidized press plate 761 situated within the interior wall of the CFP 125. The dynamic fluidized press plate 761 may be constructed as a sealed bladder 760 comprising any suitable material sufficiently sturdy enough to handle the pressures that may result from compressing the sludge 750. The dynamically fluidized press plate 761 may be an expandable material that may seal the cell of the CFP 125 by forming a seal along the side walls 705, the interior surface of the inlet portal 701 and the interior surface of the outlet portal 719. Once the moveable wall 717 is contracted and in contact with sludge in the cavity cell, any compressible gas, but preferably any non-compressible fluid (such as water) may be is forced into dynamic fluidized press plate 761 through a fill port 763. As pressure is increased by filling the bladder 760 of the fluidized press plate 761, the moveable press wall 717, the side walls 705, the closed inlet portal 701 and the closed outlet portal 719 may form a sturdy and confined enclosure providing resistance to the increasing pressure, leaving only the filter media covered wall 727 as the path of least (or no) resistance for water to be forced from sludge and through filter media covered wall 727. This pressing by the dynamic fluidized press plate 761 allows for more pressure to be equally exerted over the area of sludge mass versus a solid press plate 717. The dynamic fluidized press plate 761 may also provide a seal for the cell of press chamber, confining the sludge as the dynamic fluidized press plate 761 expands from being filled.

Spill Remediation System

The reduction of operational weight and footprint size enables multiple systems 100 to be quickly deployed and transportable by a single light duty pickup or SUV vehicle 1007, barge mounted operation, or easily airlifted to remote or isolated locations, and to quickly deploy and respond to emergencies and disasters, which is not practical, if not impossible, by competing technologies.

The effectiveness and efficiency of the system 100 and processes thereof, coupled with reduced fabrication costs and operational expenses, may allow for waterway and other dewatering projects to move forward that may have been previously slowed or halted due to budgetary constraints. Operations requiring dewatering, such as fracking operations, oil sands operations, mining operations, CAFO and paper mills, will be able to eliminate toxic settling ponds as well as the associated risks of a pond breach. By employing the system 100 and process for financial reasons, which may be a primary driver for business, rather than regulatory or environmental pressure, the system may prevent sludge and tailings pond breaches and the associated environmental impact and remediation costs. Since the system 100 may be mobile, the system may be more cost effective to deploy over an erected settling or detention ponds for operations. Settling ponds and detention ponds may require site preparation and excavation, then constructing the settling pond, lining the settling pond, and providing site oversight and maintenance. The accumulated sedimented sludge may require sufficient dewatering into a transportable condition for disposal. At the end of site operations, the settling pond must be decommissioned and the site remediation.

Figure 9:
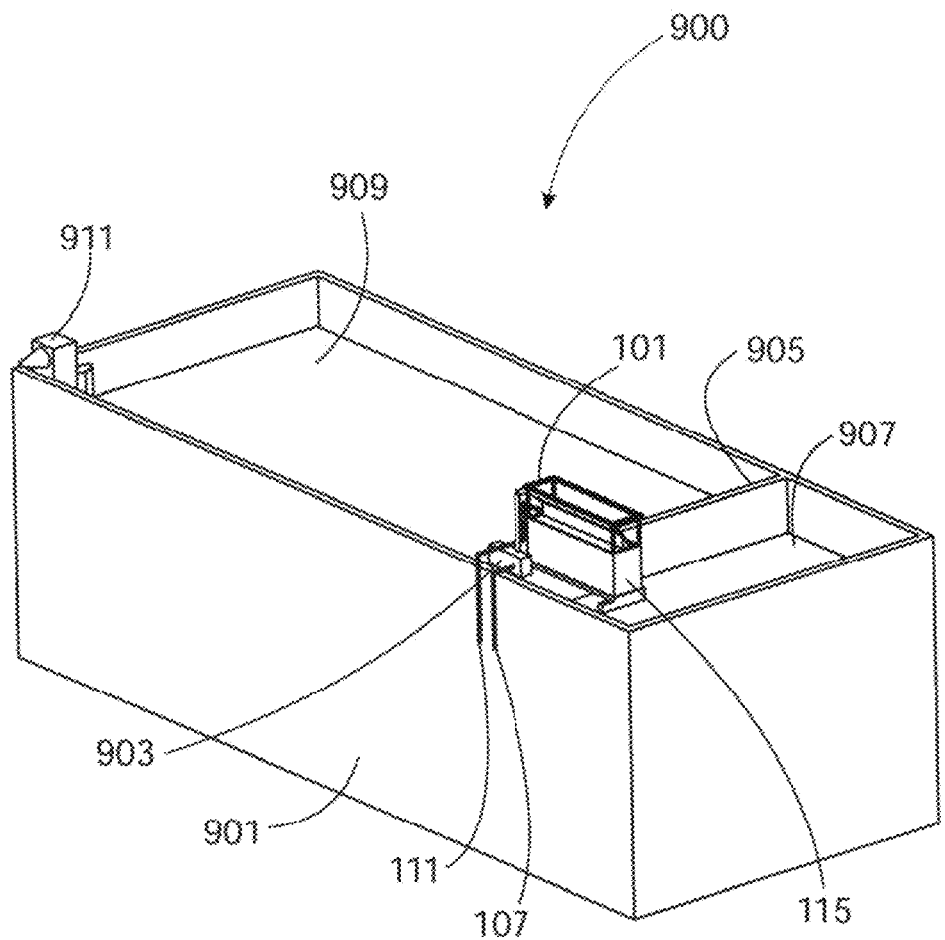
FIG. 9 depicts an isometric view of an embodiment of a spill remediation system.

Embodiments of system 100 and process thereof may be applied and integrated with spill remediation systems to quickly respond to, contain and remediate waterway oil, toxic material spills, or provide solutions for emergency preparedness to prevent waterway related disasters, emergencies. Spill containment and cleanup integrating the described system 100, may be applied in situations such as floods, oil spills and other toxic spills, and tailings ponds breaches. FIG. 9 depicts an embodiment of a spill remediation system 900 integrating one or more of the components or modules of system 100 described above. The system 900 includes a DFC 101 and a NDC 115 contained within a sorbent supply storage container 901. The equipment of system 900 may be compact enough to be easily fitted directly onto oil tankers or other ships and may be a permanent or semi-permanent system. The system 900 may also be barge mounted, trucked or air lifted to remote areas.

The spill containment and remediation system 900 may be used for treating oil spills or toxic spills of hazardous materials. The system be provided with a pelletized or granulated substances or other sorbent material 909, being dispersed over the spill area. The dispersion can be accomplished by employing spray or air cannons 911, or other mechanisms that can quickly and effectively disperse sorbent materials 909 over a spill area. The appropriate substances can include oleophilic-hydrophobic sorbents for oil spills or alternative sorbents, either absorbents or adsorbents, selected to meet the criteria of other toxic or noxious waterway spills having the characteristics known by those skilled in the art for the particular purpose of remediation. Once the sorbent materials 909 are dispersed over the spill area, the sorbents may adsorb or absorb the spilled material. The sorbents containing the spill material and/or water in close proximity may form a slurry.

The slurry formed by the mixing of the sorbent, spilled material and/or water may be pumped via pump 903 to the DFC 101. The influent 107 of slurry containing the sorbent material and water is pumped into the DFC 101 through the ULF 103, which positions the slurry over the filter media of MSF 105, for solid-liquid separation, in a scenario wherein the sorbent material is solid and water. The MSF 105 or other filter media may be treated or coated with a super-oleophobic material to prevent oil or other substance from building up and blinding the filter media 407. The free water may be released and separated from the sorbents. The water may then be filtrated through the filter media 407 and captured on the drain pan 401 connected to the frame 405 housing the filter media 407 where the collected water may then be discharged back to the waterway or source where the water previously resided.

The filtered sorbent materials 909 may gravitationally flow down the filter media 407 and into the NDC 115 for further separation of additional surface water retrieval, or alternatively deposited directly into a ship's cargo hold, other container for disposal or downstream asset recovery. The sorbent storage container 901 may also act as an area for placement of the recovered oil laden sorbent material 907. The container 901 may be is fitted with a movable partition 905 positioned within the container 901. As sorbent material 909 is withdrawn for dispersion, the partition 905 may move in the direction of the sorbent material 909, thereby creating a void or space for the recovered material 907 may be stored. The sorbent materials 909 withdrawn from the spill slurry and processed by the system 100 may be placed into the open space 907 in the storage container 901. The partition 905 may continue to shift positions as more sorbent 909 is dispersed creating more space for recovered sorbent material in the container 901. Oil laden sorbent material 907 may be further processed downstream to extract the oil for asset recovery.

Mobile Response System

Referring to FIG. 10, depicting an embodiment of mobile response system 1000 integrating the one or more components or modules of system 100, the mobile response system 1000 may be designed to quickly mobilize, contain, remediate or, provide solutions for emergency preparedness to prevent waterway related disasters, emergencies, and spill containment and cleanup including floods, oil spills, toxic chemical spills, and tailing pond breaches, which may threaten lives, property, the environment and financial loss.

The mobile response system 100 may be comprised of one or more components and modules from system 100, including but not limited to the DFC 101, NDC 115, MVC 121 and CFP 125. Embodiments of the mobile response system 1000 may further include a slurry conditioning system 1001, having a polymer injection or feed system receiving conditioning reagents from the reagent supply reservoir 1003. Embodiments of system 1000 may also be comprised of a suction pumping system capable of distributing the conditioning reagents to the slurry being inputted into the system 1000. Due to the system's modular design, equipment, components and modules can be quickly configured and deployed to meet specific requirements or stored ready to respond at strategic logistical positions for immediate deployment. Mobile systems 1000, such as the system depicted in FIG. 10 may be capable of processing more than 2,000 GPM and may be fitted on trailers 1005 and towed by a light duty vehicle 1007 such as a truck or SUV.

The mobile response system 1000 may be deployed downstream to an area of an anticipated river flood crest or shorelines for anticipated high tide. Sediment material from the waterway may be either dredged or pumped to the system 1000. Taking the sediment from the waterway may have an ancillary effect of deepening the waterway, allowing for additional volume of water flow, therefore somewhat mitigating flood cresting. The pumped or dredged slurry may be conditioned or fed directly into the DFC 101 of system 100 and the filtrated free water may be discharged back to the waterway.

Depending on the constituency factors of the waterway, the resulting sludge can either be deposited into the onboard NDC 115, with the resulting sludge being fed and placed into geo-textile bags or directly fed to geo-textile bags, bypassing the NDC. The geo-bags may then be sufficiently filled and stacked to create a desired barrier height along the waterway banks or shoreline. Due to the compact size and weight of the system 1000 and its modular design, a system can be hovered above the geo-textile bags on a movable platform to enable moving the system from one bag to another in order to efficiently and effectively gravitationally fill the bags in lieu of pumping the dewatered sludge from the system. Placing primary dewatered sludge from the DFC 101 or secondary dewatered sludge from the NDC 115 into bags immediately may form a stable environment within the geo-textile bags, forming a barrier with sufficient integrity and stability. Alternatively, the sludge can be further processed by the NDC 115 and the CFP 125, forming a cake. The resulting cake can then be positioned and stacked with a sufficient angle of repose and integrity to create a barrier or seawall as well. These processes and systems not only provides the ability for quick response, but also solutions that mitigate loss of lives, damage to the environment, property damage, rebuilding costs and disruption to commerce.

Unexpected Advantages of the Separation System

Four of the main bottlenecks in the dewatering process that MAY inhibit efficiency, increase operational footprint, increase manpower requirements and limit easy transport, mobilization, deployment or operation may be due to 1) the HRT and operational footprint required for settling clarification for effective and efficient primary dewatering; 2) the HRT and operational footprint required to sufficiently dewater sludge for economical transport, disposal or beneficial reuse for effective and efficient secondary and tertiary dewatering; 3) the equipment, energy and operational footprint required to convey sludge between technologies; and 4) the manpower to operate individual technologies and systems. The empty weight, operational weight and footprint required by any one of the first three bottlenecks, much less all three collectively, may severely impact or negates the ability to easily deploy and respond to emergencies and disasters, as well as significantly impact the operational expense, operational weight, footprint and manpower necessary for performing operations requiring dewatering. The system 100 and process described in this application solves all four bottlenecks by separating suspended solids from water, separating additional water contained within the resulting sludge and pressing the sludge into low moisture content cake on a single compact and mobile footprint. The DFC's 101 employment of the MSF 105, NDC 115, MVC 121, CFP 125 or other filtration technology, eliminates the HRT required by settling clarifiers. The DFC 101 is not dependent on a variable or inconsistent settling rate of suspended solids or conditioned flocs (as required for clarification systems) due to the size, specific gravity, or whether the solids may float or stay indefinitely suspended as determined by Stokes Law (equation 10.1), the Ferguson-Clark equation (equation 10.2), and particle order of size for settling shown below:

---
Equation 10.1: Stoke's Law for settling solids
(Stokes 1851)
---

$$V = \frac{g\left(\frac{\rho_1}{\rho} - 1\right)d^2}{18\upsilon}$$

where:
V = settling velocity of the solid
g = acceleration of gravity
$\rho_1$ = mass density of the solid
$\rho$ = mass density of the fluid
d = diameter of the solid (assuming spherical)
$\upsilon$ = kinematic viscosity of the fluid ---
Equation 10.2: Ferguson and Church equation for settling solids
(Ferguson and Church 2004).
---

$$V = \frac{gRd^2}{18\upsilon + (0.75CgRd^3)^{1/2}}$$

where:
V = settling velocity of the solid
g = acceleration of gravity
d = diameter of the solid (assuming spherical)
$\upsilon$ = kinematic viscosity of the fluid
R = specific gravity of the particle in water
(1.65 for silica sand)
C = a constant equal to 0.4 for spheres and 1 for typical sand grains

TABLE 2

Effects of Decreasing Size & SG of Spheres on Settling

| Particle Diameter | | Order of Size | Time Required to Settle One Foot SG = 2.65 | Time Required to Settle One Foot SG = 1.2 |
|---|---|---|---|---|
| mm | microns | | | |
| 10 | 10,000 | Gravel | 0.4 seconds | 1.2 seconds |
| 1 | 1,000 | Coarse Sand | 3.0 seconds | 9 seconds |
| 0.1 | 100 | Fine Sand | 34 seconds | 5 minutes |
| 0.01 | 10 | Silt | 56 minutes | 8 hours |
| 0.001 | 1 | Bacteria | 4 days | 32 days |
| 0.0001 | 0.1 | Colloidal | 1 year | 9 years |
| 0.00001 | 0.01 | Colloidal | >50 years | >50 years |
| 0.000001 | 0.001 | Colloidal | >50 years | >50 years |

Instead, the DFC 101, NDC 115 and MVC 121 of system 100 may utilize the constant and consistent force of gravity for free or primary water to immediately release fluid and separate the flocs or other solid particles, thereby completing primary dewatering, secondary dewatering while reducing or eliminating HRT.

The system 100 described in the current application may operate in an unexpected manner when compared with settling clarifies used by those in the art. A typical lamella settling clarifier processing a 500 GPM slurry flow having 10% suspended solids by volume and a specific gravity of 1.5 requiring 15 minutes of HRT, may necessitate a vessel sturdy enough to hold approximately 7,500 gallons of slurry plus sediment or settled suspended solids. The vessel would have an empty weight of about approximately 37,000 pounds and an operational weight of 102,678 pounds on a 245.5 square foot footprint. Since primary water in system 100 is instantly (or nearly instantly) released from the solids (or flocs) by gravity and filtration, the DFC 101 may only occupy one linear foot width of two foot long filter media, and no HRT, for each 50 to 80 GPM of slurry flow, enabling the DFC 101 and NDC 115 to operate on a 24 square foot footprint, with an empty weight of merely 1,331 pounds, and an operational weight of 2,874 pounds. Overall permitting the employment of lighter, less expensive fabricating materials, along with reducing the associated structural engineering and construction requirements, and related costs. Therefore, a greater than 80% reduction in footprint size, empty weight and operational weight is unexpectedly realized when compared with lamella settling clarifiers requiring HRT of 15 minutes or greater for comparable flow rates. The percent reduction of operational footprint size and weight increases as HRT requirements increase. Furthermore, the DFC's 101 ability to fit or exchange differing MSF porosity size in order to filter smaller, lighter, floating or indefinitely suspended solids or flocs, eliminates the need for downstream polishers which are often necessary for settling clarifiers.

Second, the system's 100 NDC 115 and CFP 125 modules enable compression, repositioning and reconsolidation of sludge in an enclosed dynamic cell. The use of compression, repositioning and reconsolidation permits and encourages additional capillary formation, while mitigating capillary collapse in sludge, which may be useful for efficient interstitial water release and secondary and/or tertiary dewatering. The ability to exert substantial pressure on the sludge is achievable by plate and frame filter presses or the dynamic fluidized filter presses disclosed herein, due to the enclosed cavity design.

Unlike the CFP 125 of the present disclosure, belt filter presses have limitations on the amount of pressure that can be exerted on sludge. The opposing belts in a belt filter press are not enclosed on the sides of the belts and excessive pressure will squeeze the sludge out of the sides of the belts as water, having minimal compressibility, pushes sludge towards areas with less pressure (the sides of the belts), therefore limiting the pressure which may be exerted on the sludge, and thus hindering the dewatering results. Geotextile bags and dewatering cells are limited to the weight of the sludge mass lift in order to exert pressure on sludge, which decreases as water is discharged. The CFP's 125 only pressure limitations are not any limitation on the CFP itself, but rather how much pressure is available to be exerted by a source of pressure on the sludge and how much pressure the sludge can withstand before shearing the polymer chain. This enables the CFP 125 to operate at faster rates with better results, including reduced cake moisture content due to the CFP's 125 ability to exert significantly greater pressure on sludge for a shorter period of time as well as periodically and cyclically repositioning the sludge within an enclosed cell for additional pressings.

The ability of the CFP 125 to reposition cake is not achievable by other technologies and methodologies, such as dewatering cells, geo-textile bags and belt filter presses. The ability to reposition the cake 751a, 751b substantially increases the ability to more completely and uniformly dewaters and dehydrates the entire cake 751a, 751b mass faster, including the core of the cake. Dewatering and dehydrating the core of the cake 751a, 751b helps to prevent in blinding of the filter media. The prolonged exertion of pressure on a cake in a static position used by methods known by those skilled in the art may embed cake particles into pores of filter media. The more pressure that is exerted, the more embedded the solid particles may become. The ability of the CFP 125 of system 100 to release pressure on the cake 751a, 751b by the retraction of press walls 705, 717 and to reposition cake 751a, 751b on different areas of filter media 727 significantly mitigates filter media blinding. This is also a result of the ability of filter media to recoil as pressure on the cake mass is released. The combination of cake movement as pressure is released and filter media recoil, releases pressure on particles which may become stuck or embedded in pores of filter media. As pressure is released, cake 751a, 751b may move away from filter media 727 and smaller particles that become stuck in the pores of filter media 727 will often attach to larger cake particles and be extracted from the pores of the filter media 727 along with larger particles. The expression of compressed air is a further enhancement to backflow and clear filter media.

The CFP 125 as described herein may also exert significantly greater pressure for a shorter period of time to achieve better results of uniformly reduced cake moisture content than plate and frame filter presses and belt filter presses. Increases in pressure under a shorter period of time may be achieved by the combination of pressure being expressed in an enclosed cavity, and periodically repositioning the sludge mass. The design of the CFP 125 enables compressing sludge into a cake of any desired thickness with uniformly reduced moisture content throughout the entirety of cake in reduced time. Uniformly reduced moisture content is achieved by exerting a high pressure on sludge in an enclosed dynamically sized cell and periodically or cyclically repositioning the cake enabling reconsolidation of the cake by periodically or cyclically contracting and retracting the press wall or walls.

Dynamic adjustments of the cell space within the CFP 125 results in efficiencies not achievable by rotary presses, plate and frame filter presses, belt filter presses, centrifuges, dewatering cells or geo-textile bags. This efficiency enables the system to process and discharge sludge at a rate equal to the amount of sludge entering the system, known as dynamic equilibrium, by eliminating HRT required by geo-textile bag and dewatering cells. For example, a 30 cubic yard dewatering cell typically requires 24 hours or longer to sufficiently dewater sludge to form cake that can pass a Paint Filter Test, thus a vessel sturdy enough to hold sludge during the dewatering HRT is required. The vessel would typically have an empty weight of about 6,760 pounds, plus the weight of 30 cubic yards of sludge with a SG of 1.5, or about 75,811 pounds, resulting in an operational weight of about 82,571 and a foot print of 170 square feet. Geo-textile bags can hold about 3.75 cubic yards of comparable sludge per linear foot in a 45 foot circumference bag. Therefore, in order to process a comparable 30 cubic yards of sludge for 24 hours of HRT (even though a geo-textile bag's HRT is considerably longer), would require an 8 foot long bag having a 45 foot circumference, that would weigh about 534 pounds, resulting in an operational weight of 76,345 pounds on a 180 square foot footprint. In order to continuously process slurry for 24 hours, the HRT typically required for dewatering cells, would require the operational weight and footprint of both dewatering cells and bags to be increased by a factor of 12 (Chart 4), or 909,727 pounds and 900,251 pounds respectively.

The system's 100 ability to more efficiently dewater and dehydrate sludge into cake than rotary presses, centrifuges, plate and frame presses, and belt filter presses, reduces the operational weight and footprint. The MVC 121 and CFP 125 may have a combined empty weight of 1,880 pounds, a combined operational weight of 2,565 pounds and a 24 square foot footprint. A rotary press capable of processing 500 GPM flow rate of the aforementioned slurry, would require an empty weight of 29,162 pounds and an operational weight of 41,162 pounds on a 382.2 square foot footprint. Belt filter press operation capable of processing 500 GPM flow rate of the aforementioned slurry, would require two or more belt filter presses having a combined empty weight of 70,000 pounds and a combined operational weight of 75,710 pounds on a 291.2 square foot footprint.

Likewise, a plate and frame filter press capable of processing 500 GPM flow rate of the aforementioned slurry, would have an empty weight of 313,518 pounds and an operational weight of 362,906 pounds on a 1,015.8 square foot footprint. When the MVC and CFP are juxtaposed to rotary presses, belt filter presses and plate and frame filter presses, there is a greater than 80% reduction in empty weight, operational weight and footprint requirements. The reduction in empty weight and operational weight permits the employment of lighter and less expensive fabricating materials, along with reducing the associated structural engineering and construction requirements, and related costs.

The system's 100 ability to combine primary, secondary and tertiary dewatering on a singular vertically stacked footprint enables gravitational conveyance of sludge between each of the modules, which eliminates the need for pumping, mechanical tipping or mechanical excavating, along with the associated manpower, energy, resources, ancillary equipment and related expenses. This is due in part to the systems 100 employment of the NDC 115, which reduces moisture content within the sludge which is not achievable by settling clarifiers due to their design of sedimented sludge accumulating in a water covered environment, coupled with the formation of sludge blankets trapping interstitial water. The resulting sludge accumulated in a settling clarifier is a saturated and water laden slurry with low viscosity, and therefore not easily transportable or conveyed to downstream dewatering technologies by means other than pumping. The reduced moisture content and higher viscosity of sludge processed by the NDC 115, due to its nested-filter and gutter drain design, enables gravitational discharge and conveyance of resulting sludge, thereby eliminating pumping, mechanical tipping or mechanical excavating, and the associated manpower, resources, ancillary equipment and related expenses. All currently known dewatering cells and boxes employ an open sub-floor design to capture and discharge filtrated water, thereby not allowing for sludge to be gravitationally evacuated through the bottom of the cell, and therefore require tipping or excavation of the sludge for evacuation of sludge.

The DFC 101 and NDC 115 may have a combined operational footprint of 2,874 pounds and 24 square feet. The MVC 121 and CFP 125 have a combined operational footprint of 2,565 pounds and 24 square feet. The ability to combine all modules onto a singular operational footprint, results in an operational weight of 5,439 pounds on a singular 24 square feet footprint. Preferably the modules have a combined weight of less than 6,000 pounds. Two modules would have a combined weight of less than 12,000 pounds and three modules would have a combined weight of less than 18,000 pounds. A pickup truck or SUV would be able to haul three modules with a combined weight of 18,000 pounds if it has the ability to pull 20,000 pounds. Preferably the modules combined would have a weight of less than 25,000 pounds, more preferably would have a weight of less than 23,000 pounds, more preferably would have a weight of less than 20,000 pounds. A single dewatering unit comprising multiple modules would preferably have a weight of less than 10,000 pounds, more preferably would have a weight of less than 7500 pounds and more preferably has a weight of less than 6,000 pounds. The foot print of multiple modules preferably has a combined foot print of less than 100 square feet, preferably has a foot print of less than 75 square feet and preferably has a foot print of less than 50 square feet. A single dewatering unit comprising multiple modules preferably has a foot print of less than 40 square feet, more preferably has a foot print of less than 30 square feet and most preferably has a foot print of less than 25 square feet. Due to footprint size, empty weight, operational weight, fabrication materials and engineering requirements, the ability to merge any combination of the aforementioned technologies, such as the stacking of a settling clarifier onto a belt filter press, on a single compact and mobile footprint, is impractical (See Table 1 above). The system's 100 ability to unify primary, secondary and tertiary dewatering onto a single vertically stacked compact footprint, also eliminates the need for pumps, piping, power and conveying mechanisms within and between technologies, along with polishing technology and spill containment equipment, resulting in a reduction of manpower and operational attention.

Furthermore, due to the compact footprint and immediate proximity of the system, one operator can manage multiple systems simultaneously. Employing PLCs, cameras and communication systems, enables remote attention and management. The design of the entire system 100 eliminates HRT, enabling dynamic equilibrium operation, due to the ability of all modules and components to dewater and discharge processed water and sludge at the same rate as the slurry is received by the system 100. Dynamic equilibrium operation is accomplished by eliminating the HRT required by settling clarifiers, dewatering cells and geo-textile bags. Dynamic operation cannot be accomplished by previously known technologies without dimensional scaling by dewatering cells due to their sub-floor design, or by geo-textile bags, as they must be cut open, once a static, natural attenuation dewatering process is completed in order for sludge to be evacuated, or by plate and frame filter presses which operate in extended time batch operation.

Cylindrical Separation and Filtration System

Figure 11:
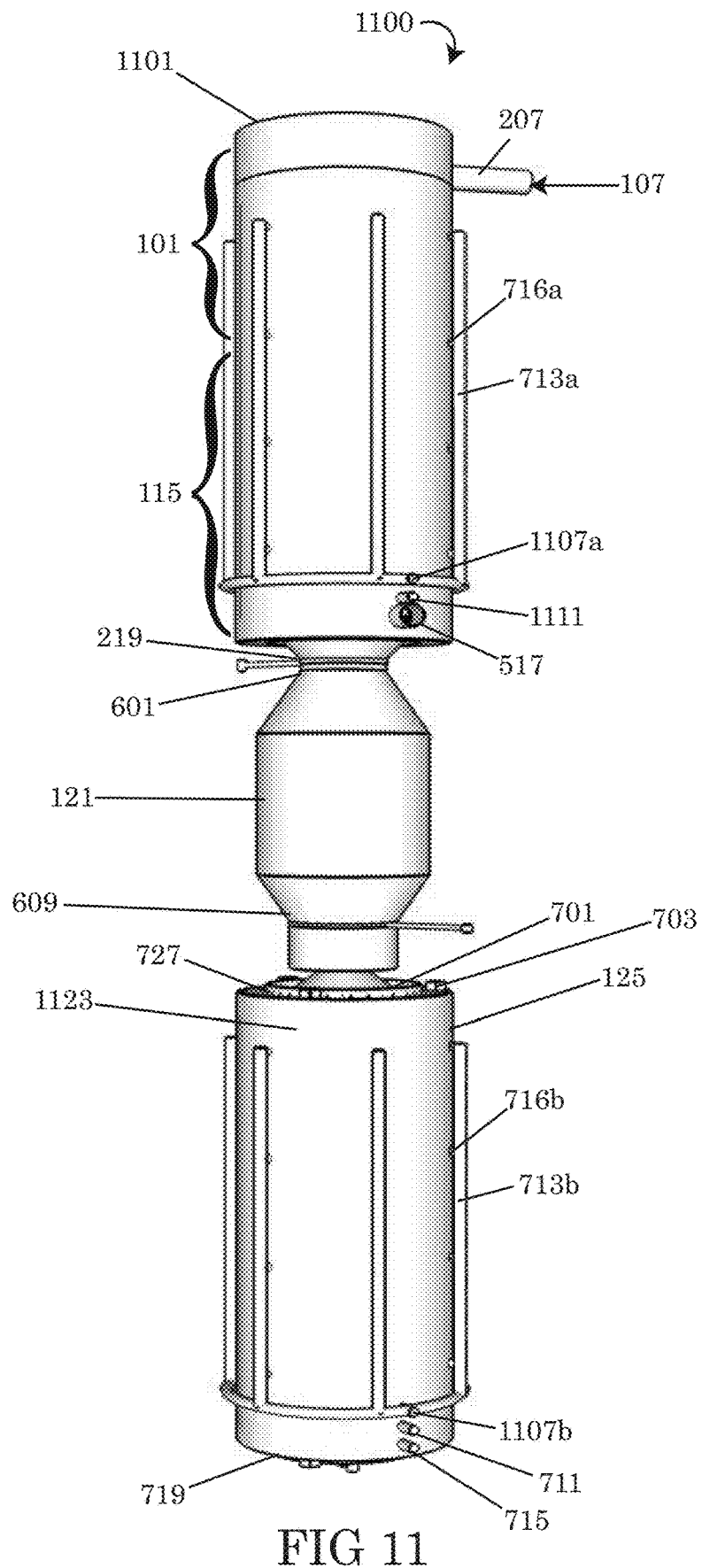
FIG. 11 depicts an alternative embodiment of a separation system having a cylindrical configuration.

Referring to the drawings, FIG. 11 depicts an example of an alternative embodiment 1100 of the separation and filtration system 100. The system 1100 may operate in a similar manner as the system 100 described above. System 1100 may include one or more components in common with system 100. The embodiments of system 100 may appear different from the analogous components of system 1100 however each of the components in common may perform similar tasks during the separation, filtration and dewatering process. For example, system 1100 may include components such as a dynamic filtration clarifier (DFC) 101 which may comprise an MSF 105 and/or a ULF 103. The system may further additional components including, but not limited to a NDC 115, MVC 121 and/or a CFP 125 which may operate in a manner that may be analogous to the operation of the components of system 100 described above.

Embodiments of system 1100 may be fabricated into a sleeker, rounded or cylindrical appearance, as shown in FIG. 11, which may differ from system 100 as shown in FIGS. 1-10 above. Additionally, the shape may further include variations on the rounded or cylindrical appearance, including any number of polygon shapes. For instance, the shape may be pentagonal, hexagonal, heptagonal, octagonal, nonagonal, decagonal, etc. Hereinafter, this application may refer to the shape of the system 1100 as rounded or cylindrical, however, any features and components discussed herein could be applied to any other polygon shape of the system 1100.

The cylindrical design of system 1100 may offer many advantages over the design of system 100. For example, modules of components and/or components within each module of the cylindrical system 1100 may be more easily added and exchanged, perform under lower overall energy requirements, include less moving parts, have increased dewatering efficiency and safely withstand much higher pressures within the system 1100 than system 100. Improvements made by the cylindrical system 1100 over the system 100 may be due to the less complex and simpler design of system 1100, allowing for easier fabrication, operation and maintenance. The system 1100 may also be more easily modular, efficient and scale the number of cylinders in the system 1100 at any time by a user. For example a system 1100 having a footprint as small as 8'×8' may have any number of cylindrical units ranging between 1-100 units, and in some instances 1-10, 10-20, 20-40 or 40 to 65 units. The system 1100 may have uniform cylindrical units of the same size and dimensions in some instances, whereas in alternative embodiments, the cylindrical units within the system may be various diameters and lengths.

Embodiments of the cylindrical shaped units shown in FIG. 11 may also be an improved over system 100 due to the presence of fewer moving parts and mechanisms, resulting in less chances of failure and lower maintenance requirements. The system 1100 may be more safely used under pressure due to the pressures being confined in and supported by concentric rings/layers of components which may distribute the pressure along a greater surface area of the cylindrical shaped housing, allowing for a greater increase in pressure to be exerted and thus more throughput than system 100. Embodiments of the system 1100 may be smaller, lighter and less expensive to transport and fabricate, while the cylindrical form may be easier to pull out and replace the filter media 727 from the CFP 125 within minutes.

Embodiments of system 1100 may include a DFC 101 similar to the DFC 101 of system 100 described above. embodiments of the DFC 101 may be shaped into a cylindrical shape or drum, having an interior cavity within the cylinder performing a primary dewatering step. The housing of the cylinder of the DSF 101 may be constructed from any hardened or rigid material known to a person skilled in the art of making a cylinder. For example, the cylinder may be a metal or metal alloy such as aluminum, steel, iron, nickel, copper, etc. In other embodiments, the cylinder may be constructed from a hardened plastic or resin, such as high density plastics known in the art. For example, polyethylene, HDPE, polypropylene, polyvinyl chloride or polyethylene terephthalate.

In some embodiments of system 1100, the cylinder having a DFC 101 may be a combination cylinder 1100 comprising a DFC 101 and a NDC 115 housed within the same cylinder 1101 as shown in FIG. 11. Whereas in alternative embodiments of system 1100, the DFC 101 and NDC 115 may be separate cylinders connected to one another in sequence similar to system 100, wherein the sludge exiting the cylinder DFC 101 flows from the outlet of the DFC 101 into one or more cells 501 of the NDC 115. For example, in an exemplary embodiment shown in FIG. 11, an influent 107 (such as a conditioned or unconditioned slurry) may enter the system 1100 via conduit 207, in a similar manner to the way an influent may enter system 100. In some embodiments of system 1100, the influent 107 entering the DFC 101 may be distributed evenly and uniformly along a MSF 105 in a controlled by a ULF 103 that may be housed within the DFC 101 or combination cylinder 1101. As the influent flows through ULF 103 onto the MSF 105 of the DFC 101, embodiments of the MSF 105 may perform the function of dewatering and separating flocs from the slurry entering as influent 107. Filtered media present within the cylindrical housing of the DFC 101 as the MSF 105, may use the force of gravity to perform the primary dewatering step. Separating the primary dewatered solids in the form of sludge from the separated water exiting the DFC 101 through a drain or outlet, as the slurry flows over the filtered media of MSF 105.

The primary dewatered sludge exiting the DFC 101 may use the force of gravity to flow into each of the cells 501 the NDC 115. The NDC 115 may be housed within the same cylinder 1101 in some embodiments of system 1100, whereas in alternative embodiments, the NDC 115 may be connected to the DFC 101 as separate modules comprising separate housings linked or connected together, providing a seamless flow of the sludge 113 from the outlet of the DFC 101 to the cells 501 of the NDC 115.

Similar to the function of the NDC 115 in system 100, the NDC 115 of system 1100 may perform a secondary dewatering function by enabling the removal of interstitial water from the primary dewatered sludge 113 received from the MSF 105 of DFC 101. The NDC 115 may release the interstitial water from the sludge 113, filter out the interstitial water and then discharge the interstitial water as an NDC effluent 117 via the NDC outlet 517. Embodiments of NDC 115 in system 1100 may accomplish the removal of interstitial water by the confinement and compaction of sludge inside the nested filters 507 separated by partition walls 505. The NDC 115 may use the weight and accumulated lift of the sludge's mass entering the NDC 115 to perform the separation and release of the interstitial water. Embodiments of the NDC 115 may include a gutter or drain 511 positioned in a manner to collect the interstitial water that is separated and removed via outlet 517 as shown in FIG. 11.

In some embodiments, the NDC 115 may include one or more directional plates 509 having a sizing dimension less than the opening created by the filter media covered walls 503. Embodiments of the directional plate or plates 509 may be positioned within each cell 501 either horizontally or vertically between one or more opposing filter media covered walls 503 or partition walls 505. The directional plate 509 may have an appropriate slope in the direction heading towards the filter media covered walls 503. In some embodiments of the NDC 115, one or more sections of the cell 501 may include open wire mesh constructed out of a firm material having dimensions less than the opening created by opposing filter media covered walls 503. The wire mesh may be positioned within the cell 501 in a horizontal position between one or more opposing filter media covered walls 503. The one or more directional plates 509 situated between one or more filter media covered walls 503 may have the directional plate 509 sloping towards filter media covered walls 503. At the onset of operation, embodiments of the NDC's 115 evacuation portals or other mechanisms for removal of sludge from the NDC 115 may be in a closed position. The slurry or primary dewatered sludge 113, such as from the DFC's 101 MSF 105, may be fed or placed into the NDC 115 through the top of the cell 501. The differing height between the cell 501, the partitioned cells and the nested cells permits the slurry or sludge to evenly fill all cells 501 by cascading from one section to the other as each cell 501 or nested filters of the cell receives with sludge or slurry.

In some embodiments the secondary dewatering may be achieved using compression, consolidation and compaction techniques which may be performed on the sludge 113 by the confinement of the sludge 113 into a plurality of nested filters 507 using the weight and/or the accumulated lift of sludge's 113 mass to perform the compaction within the cylinder 1100 using the force of gravity. The sludge 113 entering the NDC 115 may be allowed to build up in order to consolidate and compact between all filter media covered walls 503. The closer the proximity of filter media covered walls 503, the shorter the distance interstitial or free water has to travel to be filtrated and discharged. As the lift of the sludge accumulates, compression created by the weight of the accumulating sludge and compaction created by the proximity of the filter media covered walls 503, may break the capillary pore water pressure or tension, thus releasing interstitial water inside of and adhering to capillary walls of the sludge or slurry. I As the sludge moves down the cell 501, directional plates 509 encourages the sludge mass, and importantly the center or core of the sludge mass, to flow towards walls and partitions having filter media 503, 505, 507 thereby repositioning and reconsolidating the sludge mass and further shortening the distance interstitial water must travel to be filtrated. The presence of a wire mesh assembly may "slice" the sludge mass into smaller portions, exposing and/or creating new capillaries for interstitial water movement and release. The continuous movement of the sludge down the cell 501, facilitated by the partially opened evacuation portals, in conjunction with the plates 509 and wire mesh assemblies, continuously repositions and reconsolidates sludge.

In some embodiments of the system 1100, a manifold system 713*a* may be added to the housing of the DFC 101, NDC 115 or the combination cylinder 1101 in order to facilitate the introduction of liquids, gasses or a vacuum into the interior cavity of the cylinders housing the DFC 101 and/or NDC 115. The manifold 713*a* may comprise one or more conduits connecting a plurality of injection nozzles 716*a*, similar to the manifold system 713 and injection nozzles 716 that may be present in the CFP 125 of the system 100. Each injection nozzle 716*a* may allow for a liquid or gas to be delivered to the DFC 101 (including the filtered media of the MSF 105) and the NDC 115. For example, pressurized fluid or compressed air may be used to remove or clean the filtered media of the MSF 105. Each injection nozzle 716*a* connected to the manifold 713*a*, may pass through the exterior housing of the DFC 101 and provide a portal to the interior cavity formed by the housing of the cylinder 1100, NDC 115 or DFC 101.

Embodiments of the manifold 713*a* may include a plurality of injection points 1107*a*, 1111 which may allow for the injection of a fluid or gas into the interior cavity of the cylinders. For example, a gas such as air, oxygen, nitrogen, argon or other type of gas may distributed to the appropriate cylinder 1100 through the manifold 713*a* via a supply source connected to the portal 1107*a*. In some embodiments, the portal 1107*a* may also be used as a vacuum portal, whereby instead of supplying a stream of gas to each of the injection nozzles 716*a* via the manifold, a vacuum may be created. Under the vacuum conditions, the vacuum created using portal 1107*a* or a separate portal from the portal 1107*a* that is used for introducing gas into the DFC 101, may create a suction within the interior cavity of the DFC's housing.

The introduction of a vacuum and/or compressed air to the NDC 115 via the manifold 713*a* and injection nozzles 716*a*, may be beneficial to further enhance dewatering within the NDC 115. However, when applying a vacuum, special care may be taken to ensure that the amount of vacuum applied does not collapse the capillaries of the filter media. Prolonged compression or vacuum on a lift or mass of sludge in a static position without movement or reconsolidation, may collapse capillaries, contract the mass and create a void between filter media or vacuum source. Such a prolonged compression by the vacuum or compressed air may encourage the formation of an outer crust to form on the sludge mass. Crusting and capillary collapse may block, cease or impede the release of interstitial water, and therefore, may render the core of the mass disproportionately saturated and unevenly dewatered. Examples of crusting may be a common problem in static dewatering technologies such as geo-textile bags and static positioned dewatering cells.

The introduction of air, especially compressed air, may dilate capillaries, having a drying or dehydrating effect on the sludge mass within the cylinder 1100, while also assisting in keeping the filter media of the NDC 115 from clogging or blinding. The continuous introduction of additional sludge into the cell 501 from the DFC 101, fills voids and cracks created by water release and/or vacuum that contracts the sludge, lifting and pulling the sludge away from filter media and vacuum sources, ultimately inhibiting or diminishing the effectiveness of expressing vacuum on sludge. The embodiments of the NDC 115 as described, separately, collectively and/or incrementally mitigates sludge contraction and crusting, as well as capillary collapse, thereby encouraging more uniform, effective and efficient sludge dewatering as the sludge moves using the force of gravity through the cylinder 1100.

In some embodiments of system 1100, the manifold 713*a* may further include additional injections ports which may supply a fluid to each of the injection nozzles 716*a* using a fluid injection portal 1111 connected to a fluid supply source. The fluid supply source may include any liquid that may be used for rinsing or removing solid flocs or particles from the filtered media. For example, in some embodiments, the fluid injection port 1111 may be connected to a supply of water which may be delivered to each of the nozzles 716*a* of the manifold 713*a*. The fluid being delivered may be provided at a sufficient pressure to spray the interior cavity or filtered media present in the DFC 101's housing, the MSF 105's filtered media or assist with preventing caking or drying during interstitial water removal while the sludge is positioned within the NDC 1100.

In some alternative embodiments of system 1100, the NDC 115 may further include one or more expandable bladders 760 positioned within the cells 501 of the NDC 115. The bladders 760 may be cylindrical and fit concentrically within each cylindrically shaped cell 501 of the NDC. The expandable bladders 760 may include a fill port 763 connected to one or more injection nozzles 716*a* of the manifold 713*a*. The expandable bladders 760 may be expanded with a gas or liquid entering via the fill port 763. As the expandable bladder 760 expands, the sludge inside the cells 501 of the NDC 115 may be pressed against the filtered media of the filter media 503 lined walls, the partitioned walls 505, and the nested filters 507 causing the sludge to release additional water through the filtered media. Once separation of the solid sludge particles from the water has completed, the introduction of the fluid or gas into the expandable bladders 760 may cease and the pressure caused by the filled bladders 760 may be released.

Embodiments of the system 1100, may in some embodiments further comprise a metered volume controller 121. The MVC 121 module may be positioned between the outlet 219 of the combination cylinder 1100 or NDC 115. The inlet 601 of the MVC 121 may be adjacent and connected to the outlet 219 in some embodiments. As the dewatered sludge exits the NDC 115, the sludge may gravitationally flow into the inlet 601 of the MVC 121. The MVC 121 may measure or control the amounts of sludge or solids being gravitationally placed into the compression filter press (CFP) 125 or any other alternative dewatering technology. Embodiments of the cylindrical MVC 121 shown in FIG. 11 may include an MVC cell 611 comprising the interior cavity of the MVC 121, surrounded by the cylindrical walls of the MVC 121.

Embodiments of the MVC 121 may be designed differently from the embodiments of MVC 121 integrated into system 100. In embodiment 1100, the MVC 121 may avoid the use of moving parts to control the flow of sludge from the NDC 115 into the CFP 125. Instead, the MVC 121 may utilize a unique cylinder shape, diameters of the MVC inlet 601, outlet 609 and one or more chamfered surfaces to control the flow rate of the sludge as the sludge enters and exits the MVC 121. The sludge may be gravitationally evacuated from the cell 605 as a secondary dewatered sludge 123. If the MVC 121 is used in conjunction with the CFP 125, the measured amount of sludge may accumulate at the bottom of the MVC's 121 cylindrical body forming the MVC's housing, until a moveable inlet portal 701 of the CFP 125 is opened and ready to receive the dewatered sludge 123.

Figure 12:
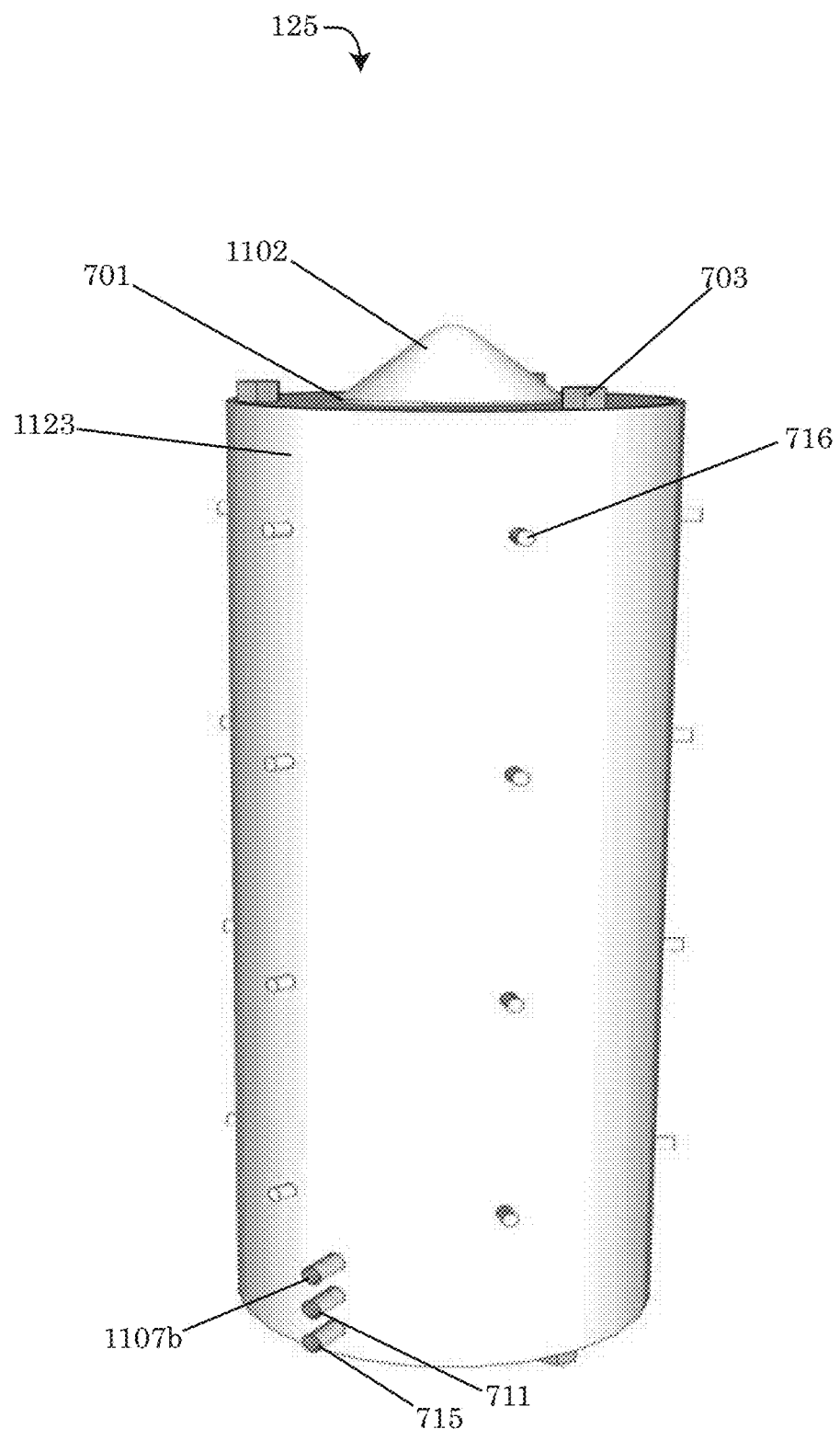
FIG. 12 depicts an alternative embodiment of a compression filter press (CFP) in a closed, pressurized configuration.

Embodiments of system 1100 may include a CFP 125 as shown in FIGS. 11-17, having a cylindrical shape comprising a cylinder housing 1123. The CFP 125 may perform a similar function to the CFP 125 of embodiment 100, namely compressing sludge entering the CFP 125 into a final cake 751*b* which has substantially or entirely removed the water content from the sludge. In system 1100, the CFP 125 may include a sealable inlet 701 capable of being placed into an open configuration and closed configuration. While in the open configuration, the CFP 125 shown in FIG. 15*a*, the sludge 750 entering the CFP 125 (from the NDC 115 or MVC 121) may enter the cavity of the CFP 125. Conversely, while the CFP 125 is placed in the closed configuration, as shown in FIG. 12, the CFP 125 may be pressurized and/or prevent the introduction of additional sludge 750 into the sealable inlet 701.

In some embodiments, the sealable inlet 701 may include a chamfered flow device 1102. The chamfered flow device 1102 may control the direction of the sludge 750 into the inlet 701 while in the open configuration. The chamfered flow device 1102 may be responsible for guiding the sludge into the appropriate position inside the CFP 125. For example, in the exemplary embodiment, the interior cavity of the CFP 125 may be a series of concentric rings forming layers of components. In the exemplary embodiment, the sludge being dewatered may be desired to be positioned in void space of the concentric ring between the filtered media 727 and an expandable bladder 760, as shown in FIG. 16*a*.

Similar to the exterior housing of the combination cylinder 1101, NDC 115 or DFC 101 in system 1100, the embodiments of the CFP 125 may be equipped with a manifold 713*b*. The manifold 713*b* may be connected to a plurality of injection nozzles 716*b* positioned along the housing 1123 of the CFP 125. The manifold 713*b* may act as a conduit transporting fluid or gas from a supply source into the interior cavity of the CFP 125. For example, the one or more injection ports 1107*b*, 711 may connect the gas or fluid source to the manifold 713*b*. Similar to the manifold of the CFP 125 of system 100, a fluid supply source (such as a water supply) may connect to the injection port 711 whereas a gas such as compressed air, nitrogen, argon, etc. may be introduced via an air portal 709 or a combination air and vacuum portal 1109*b*. Moreover, in some embodiments of the CFP 125, a separate vacuum portal may be connected to the manifold 713*b*.

Figure 13:
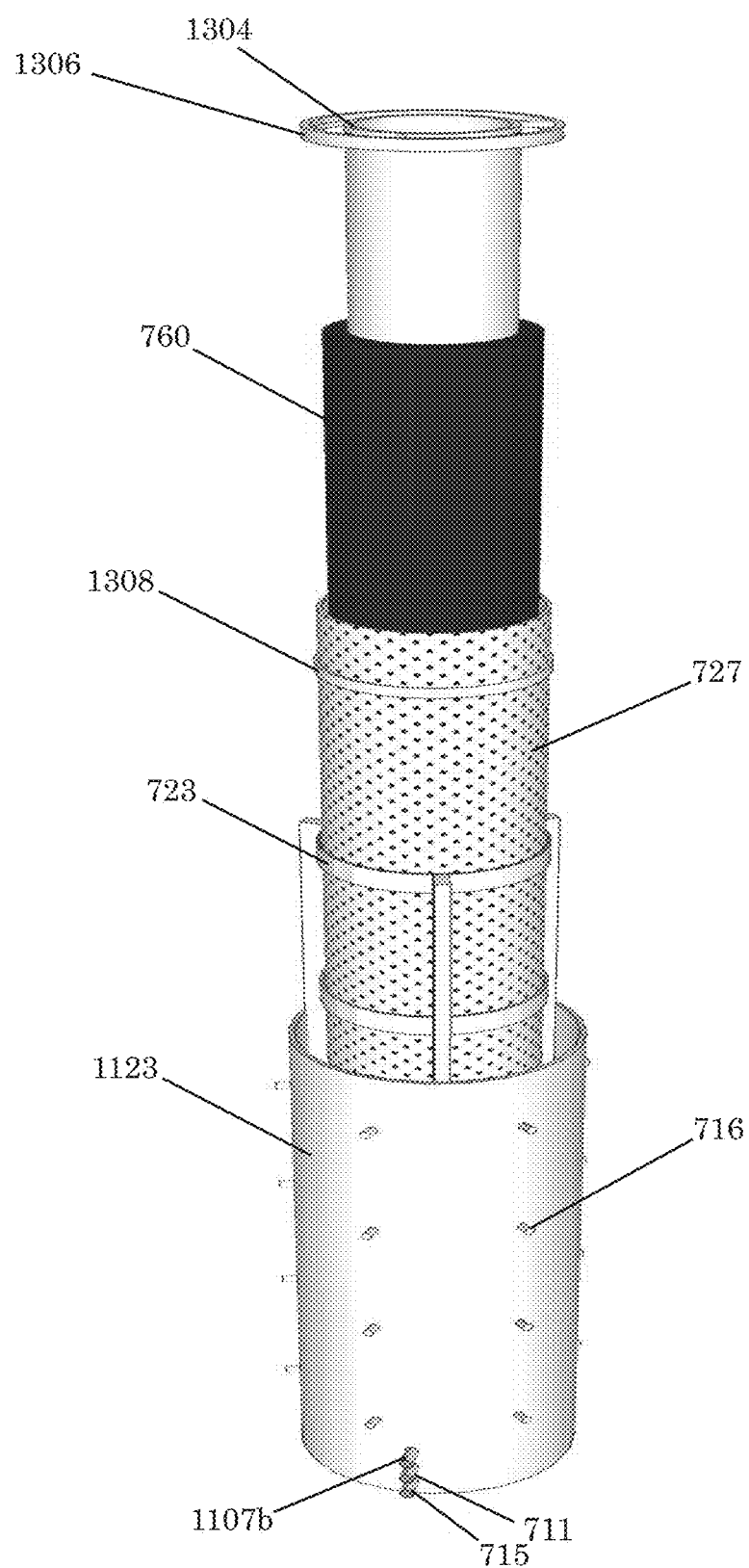
FIG. 13 depicts an exploded view of the compression filter press of FIG. 12

Referring back to the drawings, FIG. 13 provides an exploded view of each of the components that may be positioned within the interior cavity of the CFP 125 housing 1123. As demonstrated by the drawing of FIG. 13, each of the layers of components within the housing 1123 may be positioned in a series of concentric rings, nesting within one another. At the core of the CFP 125, a support tube 1304 may be positioned within the CFP 125. The support tube 1304 may pass hold each layer placed over the tube in the CFP 125 in place. In some embodiments, the support tube 1304 may include a spacing brace 1306. Embodiments of the spacing brace 1306 may be perimeter of hardened material encircling an inner perimeter of the support tube 1304. The spacing brace 1306 may have a sufficient diameter greater than the interior tube of support tube 1304, but less than a diameter of the cylindrical housing 1123. Embodiments of the spacing brace 1306 may be sized to abut against the interior walls of the housing 1123 while retaining each of the additional components 760, 1308, 723, 727 within the interior cavity of the housing 1123.

In the next layer within the concentric ring of layers, an expandable bladder 760 may positioned over the interior tube of the support tube 1304 as shown in FIG. 13. The expandable bladder 760 may act as a liner holding a pressurized media, such as water or another fluid or gas, filling the expandable bladder 760. As the pressurized media fills the expandable bladder 760, the bladder 760 may expand outward toward the interior surface of the housing 1123. Sludge 750 deposited between the bladder 760 layer and the filtered media 727 layer, may be pressed by the expanded bladder 760 against the filter media layer 727, releasing water within the sludge 750 through the orifices of the filter media 727 layer and into a drain 715 exiting the CFP 125. The materials for constructing the bladder 760 may be any material sufficient to withstand the pressures of the medium fill in the bladder 760 and the pressure on the bladder caused by the impact of the sludge 750 and/or resistance by the filter media 727. Examples of suitable bladder materials may include polyurethane, vinyl, urethane or Kevlar® (polyparaphenylene terephthalamide) materials.

Embodiments of the bladder 760 may be initially pressurized and filled with a pressurized media such as water or other fluids being delivered to a fill port 763 via an injection nozzle 716*b* in some embodiments. In other embodiments, a gas such as compressed air may be used to fill the bladder 760. However, it should be noted that fluid filled bladders 760 may be less likely to pop or explode with a sudden burst of pressure, in a manner that a gaseous filled bladder may burst from over pressurization from being over-filled. Although a compressible gas may be used, in the exemplary embodiment, non-compressible liquids may be employed (such as water) that will not burst under pressure. A liquid filled bladder may release pressure inside the bladder from a loss of less than 1 cm$^3$ of fluid within the bladder 760.

Figure 16B:
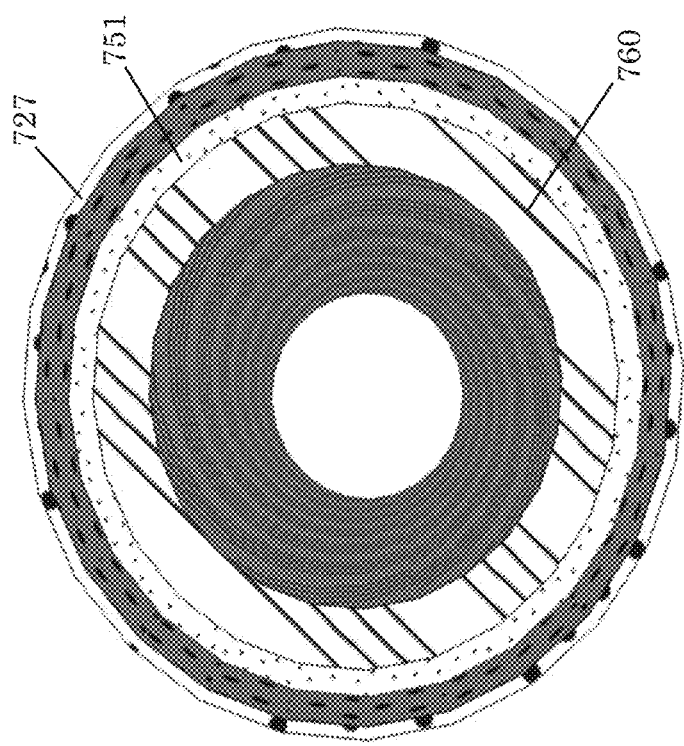
FIG. 16b depicts a top sectional view of the compression filter press of FIG. 16a in a pressurized configuration.
Figure 16A:
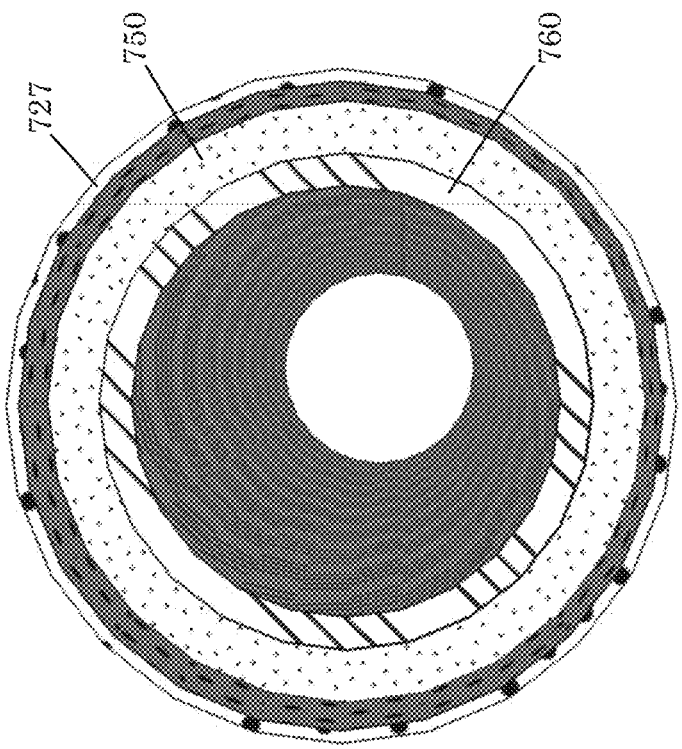
FIG. 16a depicts a top sectional view of an embodiment of a compression filter press in an unpressurized configuration.

FIGS. 16*a*-16*b* depicts the pressurization of the bladder 760. As the bladder 760 expands and the bladder 760 conforms to the shape of the cylinder's area confining the bladder 760, namely, the filter media 727, inner support tube 1304 and the sludge 750. During pressurization, the bladder 760 may expand by exerting an amount of force on the sludge positioned between the bladder 760 layer and the filter media layer 727, equal to the amount of water from the sludge 750 being filtered through the filter media 727. Thus achieving a mass balance between the amount of fluid entering the bladder 760 and the amount of fluid escaping from the solid particles of the sludge through the filter media 727 and carried away from the CFP 125 via drain 715.

Embodiments of the filtered media 727 layer may be positioned as a concentric ring over the bladder 760 layer. A void space between the filter media 727 layer and the bladder 760 layer may be present to receive an amount of sludge entering the CFP 125 for the additional removal of water from the solid particles of the sludge. Embodiments of the filtered media 727 layer may be provided in a tube shaped cartridge that may easily be replaced by sliding the cartridge over the bladder 760 positioned over the support tube 1304. Embodiments of the filter media 727 may be constructed out of sintered wire mesh having various porosities as desired by the user of the system 1100, for example, a 5-layered sintered wire mesh constructed out of stainless steel wires (i.e. SS316L wire). The size of the pores within the filter media 727 may vary from sizes less than 1 micron, less than 10 microns, less than 50 microns, less than 100 microns less than 200 microns, less than 250 microns and even porosities greater than or equal to 250 microns. For example, a porosity greater than 300 microns, 500 microns, etc.

In some embodiments of the CFP 125, a frame 723 may be added as a brace layer over the filtered media 727 layer. Embodiments of the frame 723 acting as the brace layer may provide additional support allowing for the CFP 125 to withstand additional pressure from the expansion of the bladder 760. The frame 723 of the brace layer may be constructed to concentrically wrap around one or more sections of the filtered media 727 layer. One or more support columns may run vertically along the length of the cylinder's housing 1123, acting as one or more support ribs. As the bladder 760 expands, the added strength of the frame 723 in the brace layer may prevent malformation of the filtered media layer 727 or the bladder from directly impacting against the interior surface of the housing 1123. Moreover, the columns of the frame 723 may provide additional force against the expansion of the bladder by using the interior surface of the housing 1123 for support, allowing for increased pressures inside the bladder 760 to be achieved and thus remove additional amounts of water from the sludge 750.

Figure 15B:
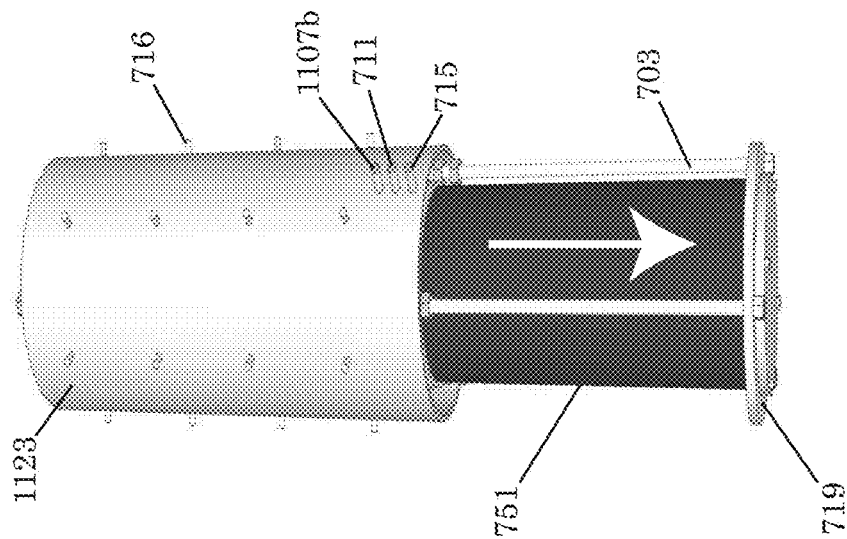
FIG. 15b depicts an embodiment of a compression filter press in a released configuration, releasing a compressed cake.
Figure 15A:
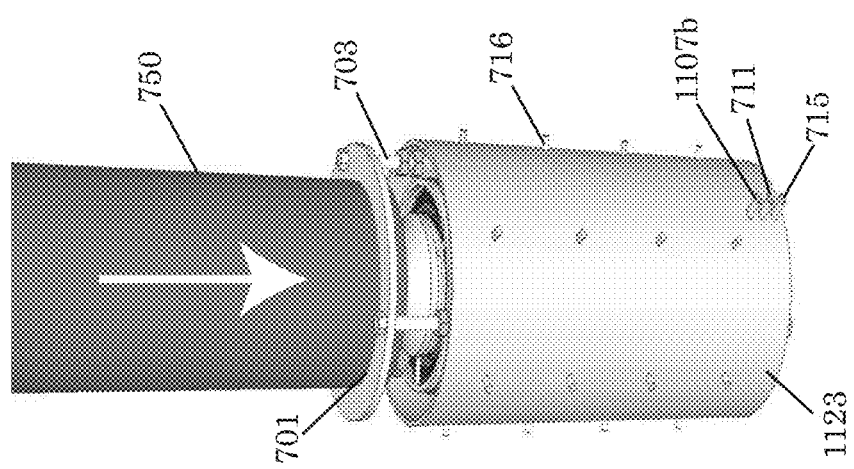
FIG. 15a depicts an embodiment of a compression filter press in an open configuration receiving sludge.

Embodiments of system 1100 may further include a guide rail system 703 for opening, releasing and sealing the CFP 125 during operations. As shown in FIGS. 15*a*-15*b*, telescopic, pneumatic or hydraulic guide rails be integrated into the housing 1123 of the CFP 125. The guide rails may be positioned along the perimeter of the housing 1123 in some embodiments. In alternative embodiments, the guide rail system 703 may be positioned between the brace layer of frame 723 and the interior surface of the housing 1123. The guide rail system 703 may allow for the inlet 701 or a cover to the inlet 701 to raise and lower along the guide rails of the guide rail system 703 creating a closable inlet. As the inlet 701 or inlet cover is raised up, the interior space of the housing is exposed, allowing for sludge 750 to flow past the cover into the inlet 701 and down into the housing 1123, filling the space between the bladder 760 layer and the filtered media 727 layer. Once filled, the inlet 701 or inlet cover may lower along the guide rails closing the inlet 701, sealing the CFP 125. The CFP may remain closed while the CFP 125 is pressurized by filling the bladder 760 as described above. Alternatively, in some embodiments, knife gate valves (not pictured) may be employed to horizontally slide open and close the inlet 701 and/or outlet 719 to allow sludge to enter and exit the CFP.

Once the separation of the water from the sludge 750 is completed, the resulting solid cake 751 may be removed from the housing 1123 of the CFP. The outlet 719 or an outlet cover may be lowered along the guide rail system 703. As the outlet 719 is lowered, the cake 751 may be removed from the interior space of the housing 1123 via the flow of gravity. Compressed air or fluid may be administered in some embodiments via the fluid injection nozzles 716 to remove any additional solid particles that may be left behind inside the layer between the filtered media 727 and the bladder 760. Once cake 751 and remaining cake particles have been evacuated from the interior of the housing 1123, the guide rail system 703 may contract the outlet 719 back toward the housing, firmly seating the outlet 719 against the housing, sealing the outlet 719 from releasing any incoming sludge 750 or cake 751 until the outlet 719 is re-released.

In some embodiments of the system 1100, the guide rail system 703 may include a scraper 1308 which may be a circular shape and positioned perpendicular to each of the rails forming the circumference of the guide rail system 703 as shown in FIGS. 14*a*-14*b*. The scraper 1308 may be connected to the guide rails and form a tight perimeter around the filtered media layer 727. As the outlet 719 is lowered into the released configuration in order to release the cake 751 from the CFP 125, the scraper 1308 may contact the filtered media 727 and scrape the exterior surface of the filtered media 727 and move the particles downward in the direction of the outlet 719, clearing the filtered media from any sludge or solid cake that may have been left behind after dewatering the sludge 750 inside the CFP 125. Conversely, while the CFP 125 is sealed, the scraper 1308 may vibrate or oscillate up and down the filtered media 727 layer in conjunction with the introduction of water or forced air through the injection nozzles 716*b* of the manifold 713*b*. Alternatively, the scraper may be rotated within the cylinder by any means such as a geared mechanism (not pictured) attached to the top and/or bottom of the scraper ring with one or more vertical scrapers attached to the scraper ring.

Figure 18:
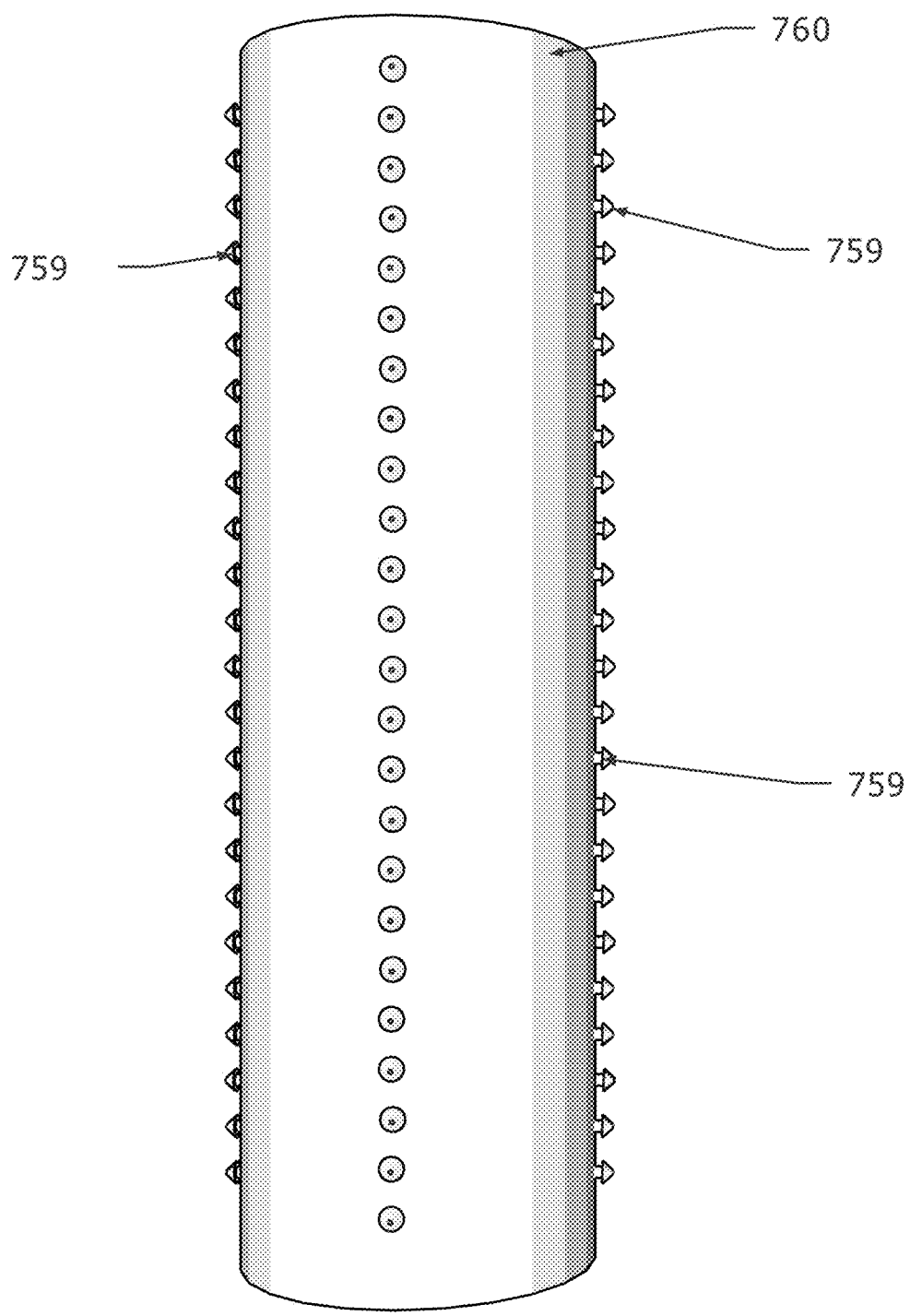
FIG. 18 depicts an embodiment of a bladder according to embodiments of the present invention.

In alternative embodiments of the CFP 125, one or more options for cleaning the filter media 727 layer or removing the cake 751 may be employed instead of or in addition to the scraper 1308. For example, in some embodiments, the filter media 727 layer may be cleaned and the cake may be removed by forcing air through the manifold 713 and into the injection nozzles 716 directed toward the filter media 727 layer. In other embodiments, instead of forcing air through the injection nozzles 716, one or more of the injection nozzle 716 may designed as high-pressure, low volume (HPLV) sprayers and may deliver water or other fluid as a high pressure spray to the surface of the filter media 727. Additional mechanisms for efficiently removing the cake 751 from the filter media 727 and the interior of the housing 1123, may include slicers or disrupters positioned around or near the outlet 719, hooks 759 positioned along the bladder 760 (as shown in FIG. 18) and/or using a drape cloth filter to further catch and remove the cake 751. In some embodiments, the scraper 1308 may be a vertical scraper blade positioned along the exterior surface of the filter media 727. The vertical scraper blades may independently rotate around the exterior surface of the filter media 727 layer, removing any cake 751 that may be present.

In some embodiments of system 1100, the system 1100 may include a pressurization system 1700. The pressurization system 1700 may be any type of system suitable for delivering a pressurized gas or liquid media to the system 1100. For example, the pressurization system 1700 may include a hydraulic system, a pneumatic system or pump system in some embodiments (hereinafter, the pressurization system 1700 may be referred to as a "hydraulic system 1700" but should be understood to be describing the features of any type of pressurization system). However, for this discussion a hydraulic system will be used. The hydraulic system 1700 may connect to one or more bladders 760*a*, 760*b* . . . 760*n* and control the separation and filtration of sludge 750 being dewatered inside the CFP 125. The hydraulic system 1700 may perform the operation of pressurizing one or more bladder 760 layers in one or more systems 100, 1100. The hydraulic system 1700 may allow for easily scalability depending on the dewatering, filtration and separation requirements by connecting to the bladders 760 and manifolds 716*a*, 716*b* of numerous dewatering systems 100, 1100.

Figure 17:
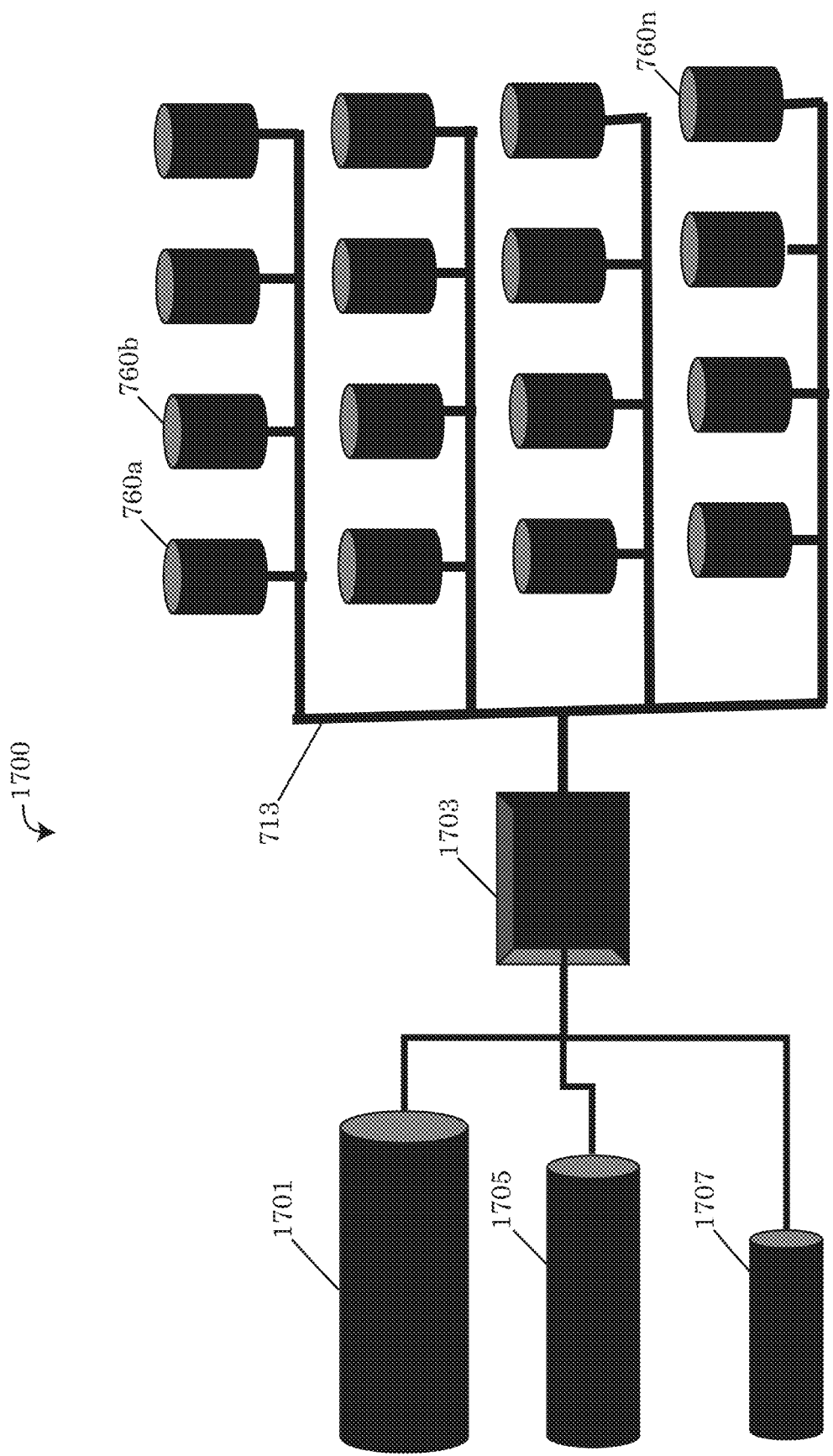
FIG. 17 depicts an embodiment of pressurization system connected to a plurality of separation systems.

As shown in FIG. 17, the hydraulic system may include a plurality of conduits connecting the manifolds 716*a*, 716*b* of the separation system 100, 1100 to one or more pressurizing components 1701, 1703, 1705, 1707 responsible for distributing gaseous or fluid media to the systems 100, 1100 as described above. In some embodiments of the hydraulic system 1700, the hydraulic system 1700 may comprise a hydraulic accumulator 1701. The accumulator 1701 may be responsible for the initial pressurization of the bladder 760 layer to an initial pre-determined pressure, which may be scaled up or down according to the needs of the system. In the exemplary embodiment, the accumulator 1701 may initially pressurize the bladder 760 layer to up to approximately 750 psi. During the initial pressurization of the bladder 760, the bladder 760 expands, pressing the sludge 750 against the filtered media 727 layer. The water stored within the sludge 750 filtrates through the filter media and is discharged from the CFP 125 through the drain 715.

An accumulator 1701 may be employed to initially charge and fill the bladders 760 with fluid (water in the exemplary embodiment). The accumulator 1701 may be specifically used to deliver the large volume of fluid and not necessarily provide the pressure for dewatering. Although in some embodiments, the pressure exerted by the accumulator 1701 may be sufficient. An accumulator's press plate may generally be larger in size than the hydraulic cylinder's press plate and therefore the pressure of the accumulator may be less than the pressure of the hydraulic cylinder powering the hydraulics of the system 1700.

In some embodiments of the hydraulic system 1700, may further comprise an intensifier 1705 which may be responsible for further increasing the levels of pressure inside the CFP 125 and the bladder 760. The intensifier 1705 may be employed to further pressurize the bladder 760 until a desired cake 751 thickness and moisture content is achieved. Using the example above, wherein the accumulator may pressurize the bladder up to 750 psi, the intensifier may further increase the pressure inside the bladder 760 up to 6750 psi by adding up to an additional 6000 psi of gaseous of fluid pressure (depending on whether a compressible gas or non-compressible fluid is being supplied).

Embodiments of the hydraulic system 1700 may also include a pulsator 1707 as shown in FIG. 17. Embodiments of the pulsator may further increase the amount of pressure delivered to the bladder 760. For example, the pulsator may employ an additional 12,000 psi to the bladder 760 through pulsations or pressure causing the bladder 760 to "massage" the sludge within the CFP 125, further enhancing the movement of fluid or gas into the bladder 760 via the injection nozzles 716 or manifold 713. In most embodiments including a intensifier 1705 and/or a pulsator 1707, the press plates of the intensifier 1705 and the pulsator 1707 may be equal to or less than the press plates of the hydraulic cylinders pressurizing the system 1700. Therefore, the pressures exerted by the intensifier 1705 and pulsator 1707 delivered to the bladder 760 may be greater than the pressures of the hydraulic cylinder's pressing the intensifier 1705 or the pulsator 1707.

In order to control and maintain the pressures within the hydraulic system 1700, the accumulator 1701, intensifier 1705 and/or the pulsator 1707 may be connected to a switch valve 1703 which may be responsible for controlling the gas or fluid delivered through the conduits to each bladder 760 connected in the hydraulic system 1700. The switch valve 1703 may lock in the maximum desired pressure of the hydraulic system 1700 for each phase of pressurization. For example, the hydraulic system may engage the accumulator 1701 during the initial pressurization phase. Once the accumulator 1701 reaches the maximum or desired pressure, the switch valve 1703 may lock the pressure to each of the bladders 760. Subsequently, after locking the pressure, the intensifier 1705 may be engaged. Once the intensifier 1705 reaches the desired or maximum pressure, the switch valve may lock in the intensifier's 1705 pressure and engage the pulsator 1707.

As noted above, any combination of pressures, volumes and numbers of bladders 760, accumulators 1701, intensifiers 1705 and pulsators 1707 can be implemented and scaled to achieve the desired level of separation, filtration and dewatering. The pressures achieved by the hydraulic system 1700 may vary depending on the size and number of the components in the hydraulic system 1700, the available provided by the hydraulic cylinder powering the hydraulic system 1700, as well as the suitability of the bladders 760 to withstand the desired pressure levels.

The force of the hydraulic system 1700 on the bladders 760 may be calculated by the equation Force=Pressure (psi)*area of the hydraulic cylinder press plates. The force is push force of the hydraulic cylinder being used within the hydraulic system 1700 to push the press plate of the accumulator 1701, intensifier 1705 and/or pulsator 1707. The push force of the hydraulic cylinder may be equal to the pressure on the liquid transmitted through the hydraulic system and presses the bladder against the sludge 750.

For example, a six inch bore (diameter) hydraulic cylinder operating at 3000 psi delivers a push force of 84,823 pounds. The calculation may be made using the formula of the press plate's area equal to $\pi r^2$, wherein the push force (F)=$\pi*3^2*3000$ psi. Solving for F=84,823 pounds of push force. Likewise, an accumulator with a 12 inch diameter press plate would deliver 750 psi when connected to the 3000 psi hydraulic cylinder. Knowing that P=F/A, P=84,823/$\pi*6^2$, thus P=750 psi on the fluid being delivered to the bladders 760 connected to the accumulator 1701.

Moreover, using the same 6 inch hydraulic cylinder from the example above, a intensifier 1705 having a 4 inch press plate would be capable of delivering 6,750 psi of pressure to the fluid being delivered to a bladder 760. Knowing that P=F/A and F=84,823 pounds of force, P=84,823/$\pi*2^2$=6,750 psi. Likewise, a pulsator having a 3 inch press plate would be able to deliver 12,000 psi to each of the bladders 760 within the hydraulic system 1700. P=84,823/$\pi*1.5^2$=12,000 psi. It should be noted that these examples of bore diameters in the hydraulic cylinder, accumulator 1701, intensifier 1705 and pulsator 1707 are merely examples, any combination of hydraulic cylinder bore size and pressure may be coupled with any size accumulator, intensifier and/or pulsator in order to provide a customized level of pressure appropriate for each of the bladders 760 within the filtration system 1100.

Embodiments of the system 1100 may be modularly scaled in a quick and easy fashion by group together and connecting additional systems 1100 together to a centralized hydraulic system 1700. Each cylindrical system 1100 may have as little as an 8" diameter and a 24" long filter media (any cylinder diameter and length may be employed, even less than 1" if desired) 727 layer may process at least 1.25 cubic yards of sludge per hour at a rate of one cycle per minute. In the exemplary embodiments disclosed in this application, two or more cycles per minute through the cylindrical system 1100 may be expected. The processing rates of sludge per hour may be increased or decreased as the diameter and length of the cylinders used in the cylindrical system 1100 for the DFC 101, NDC 115, MVC 121 and CFP 125 are increased or decreased. Additionally, as the number of cycles per minute of sludge is processed through the system 1100 increases, additional amounts of cubic yards of sludge may be processed per hour, increasing the overall efficiency of the dewatering system 1100.

For example, a system 1100 comprising nine cylindrical units, each having a diameter of 8" diameter by 24" long filter media 727 layer, may process 22.5 cubic yards of sludge per hour at a rate of 2 cycles per minute. In another scaling example, the system 1100 may be scaled up to sixty-four cylindrical units which may be capable of processing 160 cubic yards of sludge per hour, all while group of cylindrical units are connected to a single hydraulic system 1700.

Furthermore, embodiments of the system 1100 being scaled up to meet the filtering and separation needs of a user, may retain a relatively small footprint for the amount of sludge that may be processed by the system. For example, a system 1100 comprising a group of nine cylindrical units as described above may have a footprint of merely 3.25'×3.25' (10.5625 ft²) yet have the processing power of at least 22.5 cubic yards per hour of sludge. In another example, the cylindrical system described above having a configuration with sixty-four cylindrical units may comprise a footprint of merely 8'×8'(64 ft²). In the exemplary embodiment, the system 1100 may have a total footprint that is less than 12'×12' (144 ft²), process an influent slurry at a rate of at least 400 gallons per minute (GPM) and the system may have a total weight of less than 3,000 pounds.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

The invention claimed is:

1. A compression filter press (CFP) for use with a pressurization system having an incompressible fluid, said compression filter press comprising:
   an impermeable sealable housing having a plurality of layers within one another, wherein the housing includes a closeable inlet;
   a first layer of the plurality of layers comprising a sealed liner, wherein said sealed liner expands by receiving pressurized incompressible fluid pressurized by the pressurization system, the sealed liner having a first side and a second side, wherein the sealed liner is supported by a center support such that that the center support directly contacts the first side of the sealed liner along the entire length of the sealed liner;

a second layer of the plurality of layers comprising a filtered media layer, wherein a slurry is initially received between the second side of the sealed liner and the filtered media layer through the closeable inlet such that the slurry contacts the sealed liner when the slurry initially enters the CFP; and a third layer of the plurality of layers comprising a brace layer, wherein the brace layer directly contacts the filtered media layer and the interior of a wall of the impermeable housing and provides support to the filtered media layer to withstand the pressure from the expansion of the sealed liner such that the filtered media layer is not deformed by the pressure from the expansion of the sealed liner is applied.

2. The CFP of claim 1 further comprising:
wherein the plurality of layers are positioned as concentric layers;
wherein the impermeable housing has one or more injection nozzles, wherein the one or more injection nozzles pass through the impermeable housing into an interior of the housing adjacent to at least one of the concentric layers;
a manifold connected to each of the one or more injection nozzles; and
an injection port connected to the manifold configured to deliver at least one of a liquid or a gas to the one or more injection nozzles via the manifold.

3. The CFP of claim 2, wherein the impermeable housing of the CFP is a cylindrical shape.

4. A compression filter press (CFP) comprising:
a housing having a plurality of layers within one another, the plurality of layers being contained within the housing, wherein the housing includes a closeable inlet;
a first layer of the plurality of layers comprising sealed liner;
a second layer of the plurality of layers comprising a filtered media layer;
wherein the housing includes an outlet; and
a guide rail system connected to the closable inlet and the outlet, wherein the guide rail system passes through an interior cavity of the housing, and the closable inlet and outlet move along the guide rail system to open, seal and release contents that enter the housing via the closable inlet.

5. The CFP of claim 4, further comprising:
a scraper, connected to the guide rail system is positioned concentrically around the filtered media layer.

6. The CFP of claim 1, wherein a brace layer is positioned between the housing and the filtered media layer.

7. The CFP of claim 6, wherein the brace layer supports a force exerted by the sealed liner of ≥3000 psi.

8. A compression filter press (CFP) comprising:
an impermeable housing having a plurality of layers within one another, wherein the impermeable housing includes a closeable inlet;
a first layer of the plurality of layers comprising a sealed liner, the sealed liner having hooks positioned along the sealed liner;
a second layer of the plurality of layers comprising a filtered media layer;

wherein sludge, which has had a majority of the primary water removed from the sludge by a dynamic filtration clarifier (DFC), is received between the sealed liner and a first side of the filtered media layer and a vacuum is expressed between a wall of the impermeable housing and a second side of the filtered media layer such that a separated liquid of the sludge is pulled through the filtered media layer to the second side of the filtered media layer and a solid cake remains on the first side of the filtered media layer; and
wherein said sealed liner periodically or cyclically contracts or retracts to allow a process of repositioning and reconsolidation of the sludge and discharge of the sludge.

9. A compression filter press (CFP) comprising:
a housing having a plurality of layers within one another, wherein the housing includes a closeable inlet;
a first layer of the plurality of layers comprising a sealed liner, wherein said sealed liner receives pressurized incompressible fluid pressurized from a pressurization system;
a second layer of the plurality of layers comprising a filtered media layer, wherein said first layer and said second layer form an enclosed space; and
injection nozzles located in fixed locations on an impermeable outer wall of the housing for removing residual cake build up on the filtered media layer by forcing at least one of a gas at high pressure, a rinsing/washing solution, or a cake remediation substance onto the filtered media layer.

10. A compression filter press (CFP) comprising:
a housing having a plurality of layers within one another, the plurality of layers being contained within the housing, wherein the housing includes a closeable inlet;
a non-inflatable outlet door at the bottom of the housing;
a first layer of the plurality of layers comprising a sealed liner, wherein said sealed liner includes an inside, an outside and top and bottom, such that the sealed liner expands by receiving an incompressible fluid wherein the incompressible fluid is completely surrounded by an outside of said sealed liner;
a second layer of the plurality of layers comprising a filtered media layer; and
wherein said first layer and said second layer form an enclosed space; and
a third layer of the plurality of layers comprising a brace layer, wherein the brace layer directly contacts the filtered media layer and the interior of a wall of the impermeable housing and provides support directly to the filtered media layer to withstand the pressure from the expansion of the sealed liner such that the filtered media layer does not deform.

11. A compression filter press (CFP) for use with a pressurization system having an incompressible fluid, said pressurization system further including an intensifier, said compression filter press comprising:
a housing having a plurality of layers within one another, wherein the housing includes a closeable inlet;
a first layer of the plurality of layers comprising a sealed liner, wherein said sealed liner receives pressurized incompressible fluid pressurized from the intensifier of the pressurization system; and
a second layer of the plurality of layers comprising a filtered media layer;
wherein a predetermined volume of sludge is received between the sealed liner and a first side of the filtered media layer, wherein the predetermined volume is based on the moisture content of the sludge, and the sealed liner expands to push sludge against the first side of the filtered media layer and a vacuum is expressed between a wall of the housing and a second side of the filtered media such that a separated liquid of the sludge is pulled through the filtered media layer by the vacuum and a solid cake remains on the first side of the filtered media layer.

* * * * *

UNITED STATES PATENT AND TRADEMARK OFFICE
CERTIFICATE OF CORRECTION

PATENT NO. : 10,675,829 B2
APPLICATION NO. : 15/636830
DATED : June 9, 2020
INVENTOR(S) : Paul Vette Page 1 of 1

It is certified that error appears in the above-identified patent and that said Letters Patent is hereby corrected as shown below:

In the Claims

Column 43, Lines 12-20, delete:
"CFP; and
a third layer of the plurality of layers comprising a brace layer, wherein the brace layer directly contacts the filtered media layer and the interior of a wall of the impermeable housing and provides support to the filtered media layer to withstand the pressure from the expansion of the sealed liner such that the filtered media layer is not deformed by the pressure from the expansion of the sealed liner is applied."
And insert:
-- CFP. --

Signed and Sealed this
Eleventh Day of August, 2020

Andrei Iancu
*Director of the United States Patent and Trademark Office*